US012720112B2

(12) United States Patent
Wang et al.

(10) Patent No.: US 12,720,112 B2
(45) Date of Patent: Aug. 25, 2026

(54) USING SCALABILITY DIMENSION INFORMATION

(71) Applicants: Beijing Bytedance Network Technology Co., Ltd., Beijing (CN); Bytedance Inc., Los Angeles, CA (US)

(72) Inventors: Yang Wang, Beijing (CN); Ye-Kui Wang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/476,759

(22) Filed: Sep. 28, 2023

(65) Prior Publication Data

US 2024/0031608 A1 Jan. 25, 2024

Related U.S. Application Data

(63) Continuation of application No. PCT/CN2022/085030, filed on Apr. 2, 2022.

(30) Foreign Application Priority Data

Apr. 2, 2021 (WO) ................ PCT/CN2021/085292

(51) Int. Cl.
*H04N 19/70* (2014.01)
*H04N 19/184* (2014.01)
(Continued)

(52) U.S. Cl.
CPC ........... *H04N 19/70* (2014.11); *H04N 19/184* (2014.11); *H04N 19/34* (2014.11); *H04N 19/46* (2014.11)

(58) Field of Classification Search
None
See application file for complete search history.

(56) References Cited

U.S. PATENT DOCUMENTS 8,520,733 B2 * 8/2013 Hannuksela ......... H04N 19/107 375/240.01
10,178,397 B2 * 1/2019 Wang ..................... H04N 19/37
(Continued)

FOREIGN PATENT DOCUMENTS

CN 104798371 A 7/2015
CN 104919802 A 9/2015
(Continued)

OTHER PUBLICATIONS

Bross B., et al., "Versatile Video Coding (Draft 10)," Joint Video Experts Team (JVET) of ITU-T SG 16 WP 3 and ISO/IEC JTC 1/SC29/WG 11, 19th Meeting: by Teleconference, Jun. 22-Jul. 1, 2020, Document: JVET-S2001-v1, 532 Pages.
(Continued)

*Primary Examiner* — Mohammad J Rahman
(74) *Attorney, Agent, or Firm* — Conley Rose, P.C.

(57) ABSTRACT

A method of processing video data includes using a scalability dimension information (SDI) supplemental enhancement information (SEI) message to indicate which primary layers are associated with an auxiliary layer when auxiliary information is present in a bitstream, and converting between a video media file and the bitstream based on the SDI SEI message. A corresponding video coding apparatus and non-transitory computer readable medium are also disclosed.

20 Claims, 9 Drawing Sheets

(51) Int. Cl.
*H04N 19/34* (2014.01)
*H04N 19/46* (2014.01)

(56) References Cited

U.S. PATENT DOCUMENTS

| | | | | |
|---|---|---|---|---|
| 10,205,954 | B2 * | 2/2019 | Chen | H04N 19/33 |
| 10,554,981 | B2 * | 2/2020 | Ramasubramonian | H04N 19/172 |
| 11,838,345 | B2 * | 12/2023 | Oyman | H04L 65/765 |
| 12,088,847 | B2 * | 9/2024 | Hannuksela | H04N 13/194 |
| 2008/0019446 | A1 | 1/2008 | Hannuksela | |
| 2009/0097573 | A1 | 4/2009 | Choi | |
| 2015/0195571 | A1 | 7/2015 | Boyce | |
| 2015/0271529 | A1 | 9/2015 | Wang et al. | |
| 2015/0304665 | A1 * | 10/2015 | Hannuksela | H04N 19/30 375/240.02 |
| 2016/0080714 | A1 * | 3/2016 | Tsukagoshi | H04N 21/84 348/453 |
| 2016/0286226 | A1 * | 9/2016 | Ridge | H04N 19/30 |
| 2016/0286241 | A1 * | 9/2016 | Ridge | H04N 19/186 |
| 2017/0019673 | A1 * | 1/2017 | Tsukuba | H04N 19/30 |
| 2017/0332085 | A1 | 11/2017 | Ramasubramonian et al. | |
| 2018/0176617 | A1 * | 6/2018 | Wu | H04N 21/4346 |
| 2021/0120066 | A1 | 4/2021 | Oyman et al. | |
| 2022/0239949 | A1 * | 7/2022 | Hannuksela | H04N 19/105 |

FOREIGN PATENT DOCUMENTS

| | | | |
|---|---|---|---|
| CN | 105531999 | A | 4/2016 |
| CN | 105794212 | A | 7/2016 |
| CN | 106165426 | A | 11/2016 |
| CN | 106170982 | A | 11/2016 |
| EP | 2887672 | A1 | 6/2015 |
| EP | 3226561 | A1 | 10/2017 |
| JP | 2015177318 | A | 10/2015 |
| WO | 2018066562 | A1 | 4/2018 |
| WO | 2020228691 | A1 | 11/2020 |
| WO | 2021061024 | A1 | 4/2021 |

OTHER PUBLICATIONS

Ramasubramonian A, et al., "Regional nesting SEI message", Joint Collaborative Team on Video Coding of ISO/IEC JTC1/SC29/WG11 24th Meeting: Geneva, CH, May 25-Jun. 1, 2016, Document: JCTVC-X0062, 6 pages.

"Text of ISO/IEC 23002-7:2021/CDAM 1 Information technology—MPEG video technologies—Part 7: Versatile supplemental enhancement information messages for coded video bitstreams, Amendment 1: Additional SEI messages," ISO/IEC JTC 1/SC 29/WG 5, N0051, MPEG Joint Video Coding Team(s) with ITU-T SG 16 Convenorship: DE, Apr. 28, 2021, 32 pages.

"Information technology—MPEG video technologies—Part 7: Versatile supplemental enhancement information messages for coded video bitstreams, Amendment 1: Additional SEI messages," ISO/IEC JTC 1/SC 29 /WG 5 N 51, Text of ISO/IEC 23002-7:2021/CDAM 1, Apr. 28, 2021, 31 pages.

Document: JVET-U2006-vl, Boyce, J., et al., "Additional SEI messages for VSEI (Draft 2)", Joint Video Experts Team (JVET) of ITU-T SG 16 WP 3 and ISO/IEC JTC 1/SC 29 21st Meeting, by teleconference, Jan. 6-15, 2021, 20 pages.

Document: JVET-V0064-v1, Wang, Y.K., et al., "AHG9: On the MAI, DRI, and ACI SEI messages and their interactions with the SDI SEI message," Joint Video Experts Team (JVET) of ITU-T SG 16 WP 3 and 1S0/IEC JTC 1/SC 29 22nd Meeting, by teleconference, Apr. 20-28, 2021, 8 pages.

Document: JVET-P0190-v2, Wang, Y.K., et al., "AHG8/AHG17: Scalable nesting SEI message," Joint Video Experts Team (JVET) ofITU-T SG 16 WP 3 and 1S0/IEC JTC 1/SC 29/WG 11 16th Meeting: Geneva, CH, Oct. 1-11, 2019, 4 pages.

Document: Document: JCTVC-X0062, Ramasubramonian, A., et al., "Regional nesting SEI message," Joint Collaborative Team on Video Coding (JCT-VC) of ITU-T SG 16 WP 3 and 1S0/IEC JTC 1/SC 29/WG 11 24th Meeting: Geneva, CH, May 25-Jun. 1, 2016, 6 pages.

Extended European Search Report from European Patent Application No. 22779171.2 dated Jul. 2, 2024, 11 pages.

Extended European Search Report from European Patent Application No. 22779168.8 dated Jul. 3, 2024, 13 pages.

Notice of Reasons for Refusal for Japanese Application No. 2023-559809, mailed Nov. 26, 2024, 6 pages.

Notice of Reasons for Refusal for Japanese Application No. 2023-559811, mailed Nov. 26, 2024, 8 pages.

"Series H: Audiovisual and multimedia systems Infrastructure of audiovisual services—Coding of moving video High efficiency video coding," Rec. ITU-T H.265 | ISO/IEC 23008-2 (in force edition), Sep. 2023, 718 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

"Series H: Audiovisual and multimedia systems Infrastructure of audiovisual services—Coding of moving video Versatile video coding," Rec. ITU-T H.266 | ISO/IEC 23090-3, Sep. 2023, 538 pages.

"Series H: Audiovisual and Multimedia Systems Infrastructure of audiovisual services—Coding of moving video Versatile supplemental enhancement information messages for coded video bitstreams," Rec. ITU-T Rec. H.274 | ISO/IEC 23002-7, Aug. 2020, 86 pages.

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.

Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.

Document: JVET-T0070-v1, Wang, Y.K., et al., "AHG9/AHG8: Scalability dimension SEI message," Joint Video Experts Team (JVET) of ITU-T SG 16 WP 3 and ISO/IEC JTC 1/SC 29/WG 11 20th Meeting: by teleconference, Oct. 7-16, 2020, 3 pages.

Document: JVET-V0063-v1, Wang. Y.K., et al., "AHG9: On the scalability dimension information SEI message," Joint Video Experts Team (JVET) of ITU-T SG 16 WP 3 and ISO/IEC JTC 1/SC 29/WG 11 22nd Meeting: by teleconference, Apr. 20-28, 2021, 4 pages.

Document: JVET-X2006-v1, Boyce, J., et al., "Additional SEI messages for VSEI (Draft 5)," Joint Video Experts Team (JVET) of ITU-T SG 16 WP 3 and ISO/IEC JTC 1/SC 29 24th Meeting, by teleconference, Oct. 6-15, 2021, 30 pages.

Document: JVET-X2005-v1, Bossen, F., et al., "VVC operation range extensions (Draft 5)," Joint Video Experts Team (JVET) of ITU-T SG 16 WP 3 and ISO/IEC JTC 1/SC 29 24th Meeting, by teleconference, Oct. 6-15, 2021, 33 pages.

International Search Report from PCT Application No. PCT/CN2022/085030 dated Jul. 4, 2022, 9 pages.

International Search Report from PCT Application No. PCT/CN2022/084990 dated Jun. 15, 2022, 11 pages.

Decision of Refusal for Japanese Application No. 2023-559811, mailed Apr. 22, 2025, 06 pages.

Non Final Office Action for U.S. Appl. No. 18/476,650, mailed on Apr. 23, 2025, 35 pages.

Chinese Office Action from Chinese Patent Application No. 2022800267091 dated Apr. 22, 2026, 17 pages.

* cited by examiner

USING SCALABILITY DIMENSION INFORMATION

CROSS-REFERENCE TO RELATED APPLICATIONS

This application is a continuation of International Patent Application No. PCT/CN2022/085030, filed on Apr. 2, 2022, which claims the priority to and benefits of International Patent Application No. PCT/CN2021/085292, filed on Apr. 2, 2021. All the aforementioned patent applications are hereby incorporated by reference in their entireties.

TECHNICAL FIELD

The present disclosure is generally related to video coding and, in particular, to the use of supplemental enhancement information (SEI) messages to carry scalability dimension information in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques that utilize a scalability dimension information (SDI) supplemental enhancement information (SEI) message to identify which primary (or non-auxiliary) layers are associated with an auxiliary layer when auxiliary information is present in the bitstream.

A first aspect relates to a method of processing video data. The method includes using a scalability dimension information (SDI) supplemental enhancement information (SEI) message to indicate which primary layers are associated with an auxiliary layer when auxiliary information is present in a bitstream; and performing a conversion between a video media file and the bitstream based on the SDI SEI message.

Optionally, in any of the preceding aspects, another implementation of the aspect provides that one or more syntax elements in the SDI SEI message indicate which primary layers are associated with the auxiliary layer when the auxiliary information is present in the bitstream.

Optionally, in any of the preceding aspects, another implementation of the aspect provides that the auxiliary layer has a layer identifier (ID) designated sdi_aux_id[i], wherein the auxiliary layer identifier equal to zero indicates that the i-th layer in the bitstream does not contain auxiliary pictures, and wherein the auxiliary layer identifier greater than zero indicates a type of auxiliary pictures in an i-th layer in the bitstream.

Optionally, in any of the preceding aspects, another implementation of the aspect provides that layer indices are included in the SDI SEI message to indicate which primary layers are associated with the auxiliary layer when the auxiliary information is present in the bitstream.

Optionally, in any of the preceding aspects, another implementation of the aspect provides that one or more syntax elements in the SDI SEI message indicate whether the auxiliary layer is applied to one or more of the primary layers.

Optionally, in any of the preceding aspects, another implementation of the aspect provides that a syntax element in the SDI SEI message indicates whether the auxiliary layer is applied to a specific primary layer from the primary layers.

Optionally, in any of the preceding aspects, another implementation of the aspect provides that a syntax element in the SDI SEI message indicates whether the auxiliary layer is applied to one or more of the primary layers.

Optionally, in any of the preceding aspects, another implementation of the aspect provides that the auxiliary layer is one of a plurality of auxiliary layers in the bitstream, and wherein one or a group of syntax elements are included in the SDI SEI message to indicate which primary layers are associated with each auxiliary layer in the plurality of auxiliary layers when the auxiliary information is present in the bitstream.

Optionally, in any of the preceding aspects, another implementation of the aspect provides that an indication of a number of the primary layers associated with auxiliary pictures of the auxiliary layer is signaled in the bitstream.

Optionally, in any of the preceding aspects, another implementation of the aspect provides that the indication of the number of the primary layers is designated sdi_num_associated_primary_layers_minus1.

Optionally, in any of the preceding aspects, another implementation of the aspect provides that the sdi_num_associated_primary_layers_minus1 is signaled with an unsigned integer of six bits.

Optionally, in any of the preceding aspects, another implementation of the aspect provides that an indication of a number of the primary layers associated the auxiliary layer or associated with auxiliary pictures of the auxiliary layer is conditionally signaled in the bitstream.

Optionally, in any of the preceding aspects, another implementation of the aspect provides that the bitstream comprises a bitstream in scope, and wherein the conditional signaling comprises signaling the indication of the number of primary layers only when an i-th layer in the bitstream in scope contains the auxiliary pictures.

Optionally, in any of the preceding aspects, another implementation of the aspect provides that the i-th layer in the bitstream in scope contains the auxiliary pictures when a layer identifier (ID) designated sdi_aux_id[i] is greater than zero.

Optionally, in any of the preceding aspects, another implementation of the aspect provides that the bitstream comprises a bitstream in scope, and wherein the bitstream in scope is a sequence of access units (AUs) that consists, in decoding order, of an initial AU containing the SDI SEI message followed by zero or more subsequent AUs up to, but not including, any subsequent AU that contains another SDI SEI message.

Optionally, in any of the preceding aspects, another implementation of the aspect provides that the SDI SEI message includes an auxiliary identifier (ID) of each layer when the auxiliary information is present in the bitstream or when the bitstream comprises a bitstream in scope and the bitstream in scope is a multiview bitstream.

Optionally, in any of the preceding aspects, another implementation of the aspect provides that an i-th layer is referred to as a primary layer when a layer identifier (ID) designated sdi_aux_id[i] is equal to zero, otherwise the i-th layer is referred to as the auxiliary layer.

Optionally, in any of the preceding aspects, another implementation of the aspect provides that an i-th layer is referred to as an alpha auxiliary layer when a layer identifier (ID) designated sdi_aux_id[i] is equal to one, and wherein the i-th layer is referred to as a depth auxiliary layer when the layer ID designated sdi_aux_id[i] is equal to two.

Optionally, in any of the preceding aspects, another implementation of the aspect provides that the indication of which primary layers are associated with the auxiliary layer is derived instead of indicated in the bitstream.

Optionally, in any of the preceding aspects, another implementation of the aspect provides using an auxiliary supplemental enhancement information message to indicate which primary layers are associated with the auxiliary layer when auxiliary information is present in a bitstream.

Optionally, in any of the preceding aspects, another implementation of the aspect provides that the conversion comprises encoding the video media file into the bitstream.

Optionally, in any of the preceding aspects, another implementation of the aspect provides that the conversion comprises decoding the bitstream to obtain the video media file.

A second aspect relates to an apparatus for coding video data comprising a processor and a non-transitory memory with instructions thereon, wherein the instructions upon execution by the processor cause the processor to: use a scalability dimension information (SDI) supplemental enhancement information (SEI) message to indicate which primary layers are associated with an auxiliary layer when auxiliary information is present in a bitstream; and convert between a video media file and the bitstream based on the SDI SEI message.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to: use a scalability dimension information (SDI) supplemental enhancement information (SEI) message to indicate which primary layers are associated with an auxiliary layer when auxiliary information is present in a bitstream; and convert between a video media file and the bitstream based on the SDI SEI message.

A fourth aspect relates to a non-transitory computer-readable storage medium storing instructions that cause a processor to: use a scalability dimension information (SDI) supplemental enhancement information (SEI) message to indicate which primary layers are associated with an auxiliary layer when auxiliary information is present in a bitstream; and convert between a video media file and the bitstream based on the SDI SEI message.

A fifth aspect relates to a non-transitory computer-readable recording medium storing a bitstream of a video which is generated by a method performed by a video processing apparatus, wherein the method comprises: use a scalability dimension information (SDI) supplemental enhancement information (SEI) message to indicate which primary layers are associated with an auxiliary layer when auxiliary information is present in a bitstream; and convert between a video media file and the bitstream based on the SDI SEI message.

A sixth aspect relates to a method for storing bitstream of a video, comprising: using a scalability dimension information (SDI) supplemental enhancement information (SEI) message to indicate which primary layers are associated with an auxiliary layer when auxiliary information is present in a bitstream; generating the bitstream based on the the SDI SEI message; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
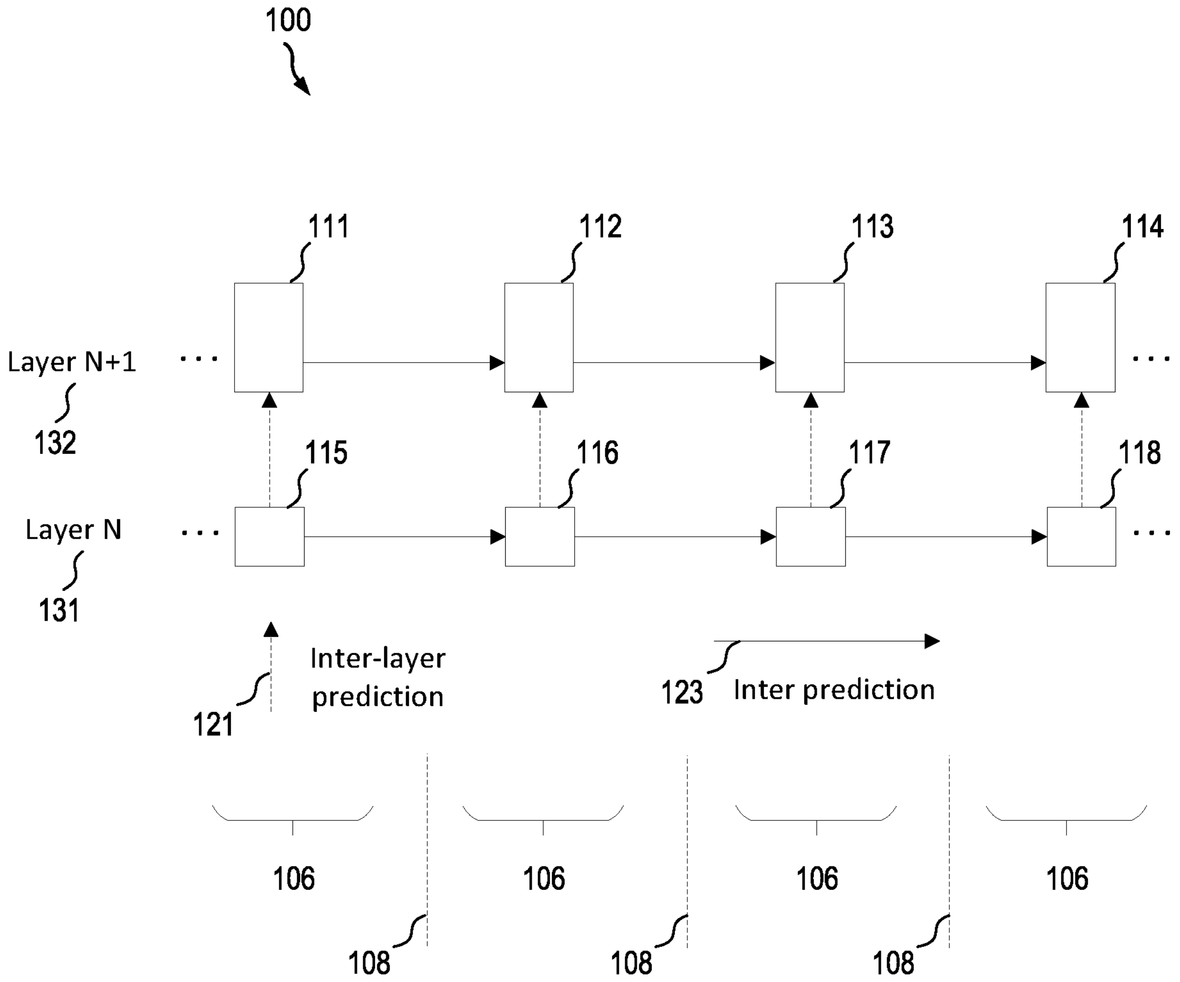
FIG. 1 illustrates an example of multi-layer coding for spatial scalability.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. See ITU-T and ISO/IEC, "High efficiency video coding", Rec. ITU-T H.265|ISO/IEC 23008-2 (in force edition). Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). See J. Chen, E. Alshina, G. J. Sullivan, J.-R. Ohm, J. Boyce, "Algorithm description of Joint Exploration Test Model 7 (JEM7)," JVET-G1001, August 2017. The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020. See Rec. ITU-T H.266|ISO/IEC 23090-3, "Versatile Video Coding", 2020.

The VVC standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media. See B. Bross, J. Chen, S. Liu, Y.-K. Wang (editors), "Versatile Video Coding (Draft 10)," JVET-S2001, Rec. ITU-T Rec. H.274|ISO/IEC 23002-7, "Versatile Supplemental Enhancement Information Messages for Coded Video Bitstreams", 2020, and J. Boyce, V. Drugeon, G. Sullivan, Y.-K. Wang (editors), "Versatile supplemental enhancement information messages for coded video bitstreams (Draft 5)," JVET-S2007.

The Essential Video Coding (EVC) standard (ISO/IEC 23094-1) is another video coding standard that has recently been developed by MPEG.

FIG. 1 is a schematic diagram illustrating an example of layer based prediction 100. Layer based prediction 100 is compatible with unidirectional inter-prediction and/or bidirectional inter-prediction, but is also performed between pictures in different layers.

Layer based prediction 100 is applied between pictures 111, 112, 113, and 114 and pictures 115, 116, 117, and 118 in different layers. In the example shown, pictures 111, 112, 113, and 114 are part of layer N+1 132 and pictures 115, 116, 117, and 118 are part of layer N 131. A layer, such as layer N 131 and/or layer N+1 132, is a group of pictures that are all associated with a similar value of a characteristic, such as a similar size, quality, resolution, signal to noise ratio, capability, etc. In the example shown, layer N+1 132 is associated with a larger image size than layer N 131. Accordingly, pictures 111, 112, 113, and 114 in layer N+1 132 have a larger picture size (e.g., larger height and width and hence more samples) than pictures 115, 116, 117, and 118 in layer N 131 in this example. However, such pictures can be separated between layer N+1 132 and layer N 131 by other characteristics. While only two layers, layer N+1 132 and layer N 131, are shown, a set of pictures can be separated into any number of layers based on associated characteristics. Layer N+1 132 and layer N 131 may also be denoted by a layer ID. A layer ID is an item of data that is associated with a picture and denotes the picture is part of an indicated layer. Accordingly, each picture 111-118 may be associated with a corresponding layer ID to indicate which layer N+1 132 or layer N 131 includes the corresponding picture.

Pictures 111-118 in different layers 131-132 are configured to be displayed in the alternative. As such, pictures 111-118 in different layers 131-132 can share the same temporal identifier (ID) and can be included in the same access unit (AU) 106. As used herein, an AU is a set of one or more coded pictures associated with the same display time for output from a decoded picture buffer (DPB). For example, a decoder may decode and display picture 115 at a current display time if a smaller picture is desired or the decoder may decode and display picture 111 at the current display time if a larger picture is desired. As such, pictures 111-114 at higher layer N+1 132 contain substantially the same image data as corresponding pictures 115-118 at lower layer N 131 (notwithstanding the difference in picture size). Specifically, picture 111 contains substantially the same image data as picture 115, picture 112 contains substantially the same image data as picture 116, etc.

Pictures 111-118 can be coded by reference to other pictures 111-118 in the same layer N 131 or N+1 132. Coding a picture in reference to another picture in the same layer results in inter-prediction 123, which is compatible unidirectional inter-prediction and/or bidirectional inter-prediction. Inter-prediction 123 is depicted by solid line arrows. For example, picture 113 may be coded by employing inter-prediction 123 using one or two of pictures 111, 112, and/or 114 in layer N+1 132 as a reference, where one picture is referenced for unidirectional inter-prediction and/or two pictures are referenced for bidirectional inter-prediction. Further, picture 117 may be coded by employing inter-prediction 123 using one or two of pictures 115, 116, and/or 118 in layer N 131 as a reference, where one picture is referenced for unidirectional inter-prediction and/or two pictures are referenced for bidirectional inter-prediction. When a picture is used as a reference for another picture in the same layer when performing inter-prediction 123, the picture may be referred to as a reference picture. For example, picture 112 may be a reference picture used to code picture 113 according to inter-prediction 123. Inter-prediction 123 can also be referred to as intra-layer prediction in a multi-layer context. As such, inter-prediction 123 is a mechanism of coding samples of a current picture by reference to indicated samples in a reference picture that are different from the current picture where the reference picture and the current picture are in the same layer.

Pictures 111-118 can also be coded by reference to other pictures 111-118 in different layers. This process is known as inter-layer prediction 121, and is depicted by dashed arrows. Inter-layer prediction 121 is a mechanism of coding samples of a current picture by reference to indicated samples in a reference picture where the current picture and the reference picture are in different layers and hence have different layer IDs. For example, a picture in a lower layer N 131 can be used as a reference picture to code a corresponding picture at a higher layer N+1 132. As a specific example, picture 111 can be coded by reference to picture 115 according to inter-layer prediction 121. In such a case, the picture 115 is used as an inter-layer reference picture. An inter-layer reference picture is a reference picture used for inter-layer prediction 121. In most cases, inter-layer prediction 121 is constrained such that a current picture, such as picture 111, can only use inter-layer reference picture(s) that are included in the same AU 106 and that are at a lower layer, such as picture 115. When multiple layers (e.g., more than two) are available, inter-layer prediction 121 can encode/decode a current picture based on multiple inter-layer reference picture(s) at lower levels than the current picture.

A video encoder can employ layer based prediction 100 to encode pictures 111-118 via many different combinations and/or permutations of inter-prediction 123 and inter-layer prediction 121. For example, picture 115 may be coded according to intra-prediction. Pictures 116-118 can then be coded according to inter-prediction 123 by using picture 115 as a reference picture. Further, picture 111 may be coded according to inter-layer prediction 121 by using picture 115 as an inter-layer reference picture. Pictures 112-114 can then be coded according to inter-prediction 123 by using picture 111 as a reference picture. As such, a reference picture can serve as both a single layer reference picture and an inter-layer reference picture for different coding mechanisms. By coding higher layer N+1 132 pictures based on lower layer N 131 pictures, the higher layer N+1 132 can avoid employing intra-prediction, which has much lower coding efficiency than inter-prediction 123 and inter-layer prediction 121. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 106 in FIG. 1 may contain several pictures. For example, one AU 106 may contain pictures 111 and 115. Another AU 106 may contain pictures 112 and 116. Indeed, each AU 106 is a set of one or more coded pictures associated with the same display time (e.g., the same temporal ID) for output from a decoded picture buffer (DPB) (e.g., for display to a user). Each access unit delimiter (AUD) 108 is an indicator or data structure used to indicate the start of an AU (e.g., AU 108) or the boundary between AUs.

Previous H.26x video coding families have provided support for scalability in separate profile(s) from the profile (s) for single-layer coding. Scalable video coding (SVC) is the scalable extension of the AVC/H.264 that provides support for spatial, temporal, and quality scalabilities. For SVC, a flag is signaled in each macroblock (MB) in enhancement layer (EL) pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides support for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same AU and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 2:
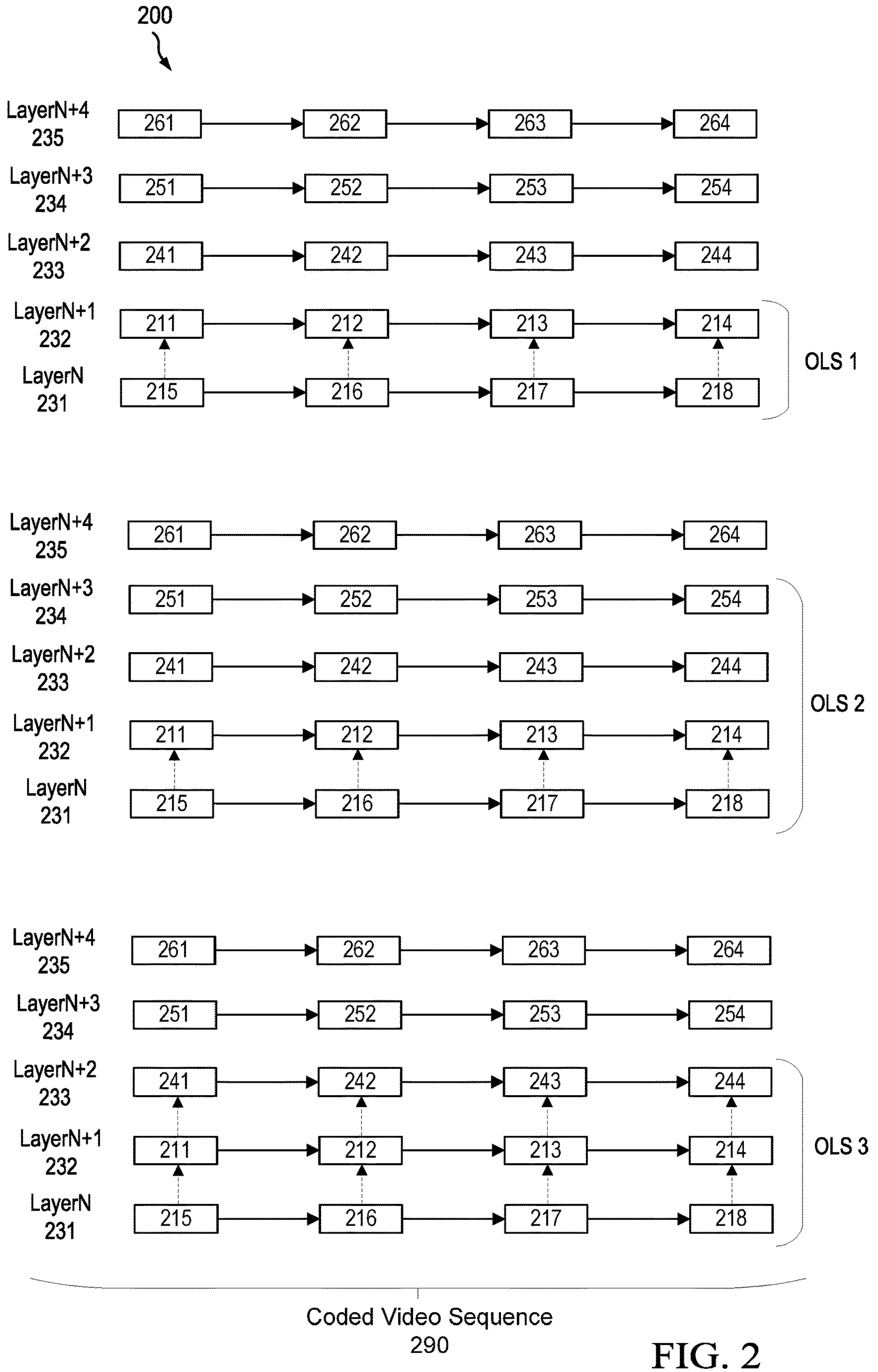
FIG. 2 illustrates an example of multi-layer coding using output layer sets (OLSs).

FIG. 2 illustrates an example of layer based prediction 200 utilizing output layer sets (OLSs). Layer based prediction 100 is compatible with unidirectional inter-prediction and/or bidirectional inter-prediction, but is also performed between pictures in different layers. The layer based prediction of FIG. 2 is similar to that of FIG. 1. Therefore, for the sake of brevity, a full description of layer based prediction is not repeated.

Some of the layers in the coded video sequence (CVS) 290 of FIG. 2 are included in an OLS. An OLS is a set of layers for which one or more layers are specified as the output layers. An output layer is a layer of an OLS that is output. FIG. 2 depicts three different OLS s, namely OLS 1, OLS 2, and OLS 3. As shown, OLS 1 includes Layer N 231 and Layer N+1 232. Layer N 231 includes pictures 215, 216, 217 and 218, and Layer N+1 232 includes pictures 211, 212, 213, and 214. OLS 2 includes Layer N 231, Layer N+1 232, Layer N+2 233, and Layer N+3 234. Layer N+2 233 includes pictures 241, 242, 243, and 244, and Layer N+3 234 includes pictures 251, 252, 253, and 254. OLS 3 includes Layer N 231, Layer N+1 232, and Layer N+2 233. Despite three OLSs being shown, a different number of OLSs may be used in practical applications. In the illustrated embodiment, none of the OLSs include Layer N+4 235, which contains pictures 261, 262, 263, and 264.

Each of the different OLSs may contain any number of layers. The different OLSs are generated in an effort to accommodate the coding capabilities of a variety of different devices having varying coding capabilities. For example, OLS 1, which contains only two layers, may be generated to accommodate a mobile phone with relatively limited coding capabilities. On the other hand, OLS 2, which contains four layers, may be generated to accommodate a big screen television, which is able to decode higher layers than the mobile phone. OLS 3, which contains three layers, may be generated to accommodate a personal computer, laptop computer, or a tablet computer, which may be able to decode higher layers than the mobile phone but cannot decode the highest layers like the big screen television.

The layers in FIG. 2 can be all independent from each other. That is, each layer can be coded without using inter-layer prediction (ILP). In this case, the layers are referred to as simulcast layers. One or more of the layers in FIG. 2 may also be coded using ILP. Whether the layers are simulcast layers or whether some of the layers are coded using ILP may be signaled by a flag in a video parameter set (VPS). When some layers use ILP, the layer dependency relationship among layers is also signaled in the VPS.

In an embodiment, when the layers are simulcast layers, only one layer is selected for decoding and output. In an embodiment, when some layers use ILP, all of the layers (e.g., the entire bitstream) are specified to be decoded, and certain layers among the layers are specified to be output layers. The output layer or layers may be, for example, 1) only the highest layer, 2) all the layers, or 3) the highest layer plus a set of indicated lower layers. For example, when the highest layer plus a set of indicated lower layers are designated for output by a flag in the VPS, Layer N+3 234 (which is the highest layer) and Layers N 231 and N+1 232 (which are lower layers) from OLS 2 are output.

Some layers in FIG. 2 may be referred to as primary layers, while other layers may be referred to as auxiliary layers. For example, Layer N 231 and Layer N+1 232 may be referred to as primary layers, and Layer N+2 233 and Layer N+3 234 may be referred to as auxiliary layers. The auxiliary layers may be referred to as an alpha auxiliary layer or a depth auxiliary layer. A primary layer may be associated with an auxiliary layer when auxiliary information is present in the bitstream.

Unfortunately, existing standards have drawbacks. 1. Currently, the syntax element sdi_view_id_len is coded as u(4), and the value is required to be in the range of 0 to 15, inclusive. This value specifies the length in bits of the sdi_view_id_val[i] syntax element, specifying the view ID of the i-th layer in the bitstream. However, the length of sdi_view_id_val[i] shall not be equal to 0, while this is currently allowed.

2. When some auxiliary information is present in the bitstream, e.g., as indicated by the SDI SEI message (a.k.a., the scalability dimension SEI message), and the depth representation information SEI message or the alpha channel information SEI message, it is unknown which non-auxiliary or primary layers the auxiliary information applies to.

3. It does not make sense to have a multiview acquisition information SEI message, or depth representation information SEI message, or alpha channel information SEI message present in the bitstream but the scalability dimension information SEI message is not present in the bitstream.

4. The multiview acquisition information SEI message contains information for all views present in the bitstream. Therefore, it's meaningless for it to be scalable-nested while this is currently allowed.

Disclosed herein are techniques that solve one or more of the foregoing problems. For example, the present disclosure provides techniques that utilize a scalability dimension information (SDI) supplemental enhancement information (SEI) message to identify which primary (or non-auxiliary) layers are associated with an auxiliary layer when auxiliary information is present in the bitstream.

Figure 3:
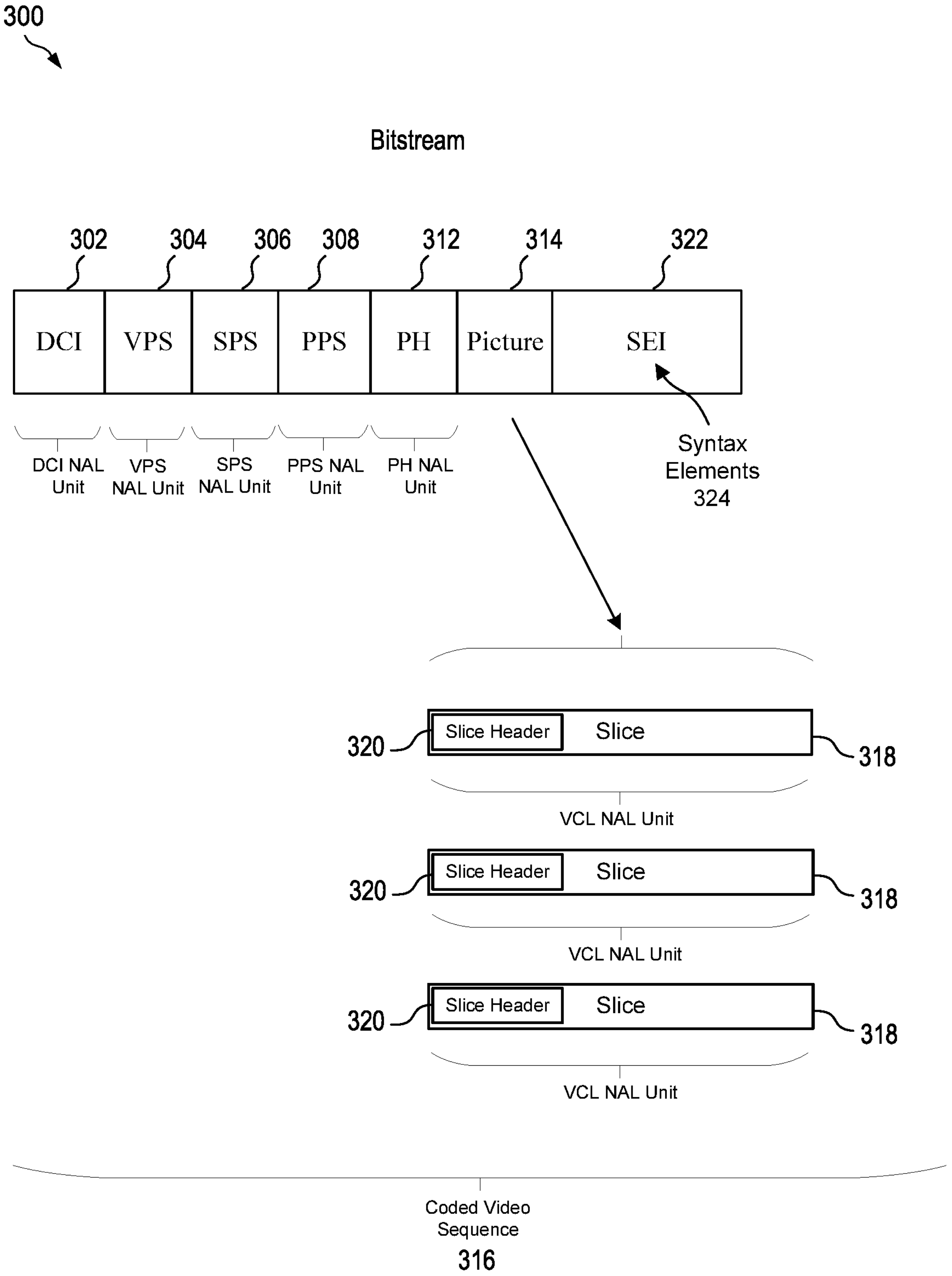
FIG. 3 illustrates an embodiment of a video bitstream.

FIG. 3 illustrates an embodiment of a video bitstream 300. As used herein the video bitstream 300 may also be referred to as a coded video bitstream, a bitstream, or variations thereof. As shown in FIG. 3, the bitstream 300 comprises one or more of the following: decoding capability information (DCI) 302, a video parameter set (VPS) 304, a sequence parameter set (SPS) 306, a picture parameter set (PPS) 308, a picture header (PH) 312, a picture 314, and an SEI message 322. Each of the DCI 302, the VPS 304, the SPS 306, and the PPS 308 may be generically referred to as a parameter set. In an embodiment, other parameter sets not shown in FIG. 3 may also be included in the bitstream 300 such as, for example, an adaption parameter set (APS), which is a syntax structure containing syntax elements that apply to zero or more slices as determined by zero or more syntax elements found in slice headers.

The DCI 302, which may also be referred to a decoding parameter set (DPS) or decoder parameter set, is a syntax structure containing syntax elements that apply to the entire bitstream. The DCI 302 includes parameters that stay constant for the lifetime of the video bitstream (e.g., bitstream 300), which can translate to the lifetime of a session. The DCI 302 can include profile, level, and sub-profile information to determine a maximum complexity interop point that is guaranteed to be never exceeded, even if splicing of video sequences occurs within a session. It further optionally includes constraint flags, which indicate that the video bitstream will be constraint of the use of certain features as indicated by the values of those flags. With this, a bitstream can be labelled as not using certain tools, which allows among other things for resource allocation in a decoder implementation Like all parameter sets, the DCI 302 is present when first referenced, and referenced by the very first picture in a video sequence, implying that it has to be sent among the first network abstraction layer (NAL) units in the bitstream. While multiple DCIs 302 can be in the bitstream, the value of the syntax elements therein cannot be inconsistent when being referenced.

The VPS 304 includes decoding dependency or information for reference picture set construction of enhancement layers. The VPS 304 provides an overall perspective or view of a scalable sequence, including what types of operation points are provided, the profile, tier, and level of the operation points, and some other high-level properties of the bitstream that can be used as the basis for session negotiation and content selection, etc.

In an embodiment, when it is indicated that some of the layers use ILP, the VPS 304 indicates that a total number of OLSs specified by the VPS is equal to the number of layers, indicates that the i-th OLS includes the layers with layer indices from 0 to i, inclusive, and indicates that for each OLS only the highest layer in the OLS is output.

The SPS 306 contains data that is common to all the pictures in a sequence of pictures (SOP). The SPS 306 is a syntax structure containing syntax elements that apply to zero or more entire CLVSs as determined by the content of a syntax element found in the PPS referred to by a syntax element found in each picture header. In contrast, the PPS 308 contains data that is common to the entire picture. The PPS 308 is a syntax structure containing syntax elements that apply to zero or more entire coded pictures as determined by a syntax element found in each picture header (e.g., PH 312).

The DCI 302, the VPS 304, the SPS 306, and the PPS 308 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 302 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 304 is contained in a non-VCL NAL unit designated as a VPS NAL unit. Therefore, the VPS NAL unit has a VPS NUT. In an embodiment, the SPS 306 is a non-VCL NAL unit designated as a SPS NAL unit. Therefore, the SPS NAL unit has an SPS NUT. In an embodiment, the PPS 308 is contained in a non-VCL NAL unit designated as a PPS NAL unit. Therefore, the PPS NAL unit has a PPS NUT.

The PH 312 is a syntax structure containing syntax elements that apply to all slices (e.g., slices 318) of a coded picture (e.g., picture 314). In an embodiment, the PH 312 is in a type of non-VCL NAL unit designated a PH NAL unit. Therefore, the PH NAL unit has a PH NUT (e.g., PH_NUT).

In an embodiment, the PH NAL unit associated with the PH 312 has a temporal ID and a layer ID. The temporal ID identifier indicates the position of the PH NAL unit, in time, relative to the other PH NAL units in the bitstream (e.g., bitstream 300). The layer ID indicates the layer (e.g., layer 131 or layer 132) that contains the PH NAL unit. In an embodiment, the temporal ID is similar to, but different from, the picture order count (POC). The POC uniquely identifies each picture in order. In a single layer bitstream, temporal ID and POC would be the same. In a multi-layer bitstream (e.g., see FIG. 1), pictures in the same AU would have different POCs, but the same temporal ID.

In an embodiment, the PH NAL unit precedes the VCL NAL unit containing the first slice 318 of the associated picture 314. This establishes the association between the PH 312 and the slices 318 of the picture 314 associated with the PH 312 without the need to have a picture header ID signaled in the PH 312 and referred to from the slice header 320. Consequently, it can be inferred that all VCL NAL units between two PHs 312 belong to the same picture 314 and that the picture 314 is associated with the first PH 312 between the two PHs 312. In an embodiment, the first VCL NAL unit that follows a PH 312 contains the first slice 318 of the picture 314 associated with the PH 312.

In an embodiment, the PH NAL unit follows picture level parameter sets (e.g., the PPS) or higher level parameter sets such as the DCI (a.k.a., the DPS), the VPS, the SPS, the PPS, etc., having both a temporal ID and a layer ID less than the temporal ID and layer ID of the PH NAL unit, respectively. Consequently, those parameter sets are not repeated within a picture or an access unit. Because of this ordering, the PH 312 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI (a.k.a., the DPS), the VPS, the SPS, the PPS, the APS, the SEI message, etc.

The picture 314 is an array of luma samples in monochrome format or an array of luma samples and two corresponding arrays of chroma samples in 4:2:0, 4:2:2, and 4:4:4 color format.

The picture 314 may be either a frame or a field. However, in one CVS 316, either all pictures 314 are frames or all pictures 314 are fields. The CVS 316 is a coded video sequence for every coded layer video sequence (CLVS) in the video bitstream 300. Notably, the CVS 316 and the CLVS are the same when the video bitstream 300 includes a single layer. The CVS 316 and the CLVS are only different when the video bitstream 300 includes multiple layers (e.g., as shown in FIGS. 1 and 2).

Each picture 314 contains one or more slices 318. A slice 318 is an integer number of complete tiles or an integer number of consecutive complete coding tree unit (CTU) rows within a tile of a picture (e.g., picture 314). Each slice 318 is exclusively contained in a single NAL unit (e.g., a VCL NAL unit). A tile (not shown) is a rectangular region of CTUs within a particular tile column and a particular tile row in a picture (e.g., picture 314). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 318 contains a slice header 320. A slice header 320 is the part of the coded slice 318 containing the data elements pertaining to all tiles or CTU rows within a tile represented in the slice 318. That is, the slice header 320 contains information about the slice 318 such as, for example, the slice type, which of the reference pictures will be used, and so on.

The pictures 314 and their slices 318 comprise data associated with the images or video being encoded or decoded. Thus, the pictures 314 and their slices 318 may be simply referred to as the payload or data being carried in the bitstream 300.

The bitstream 300 also contains one or more SEI messages, such as SEI message 322, which contain supplemental enhancement information. SEI messages can contain various types of data that indicate the timing of the video pictures or describe various properties of the coded video or how the coded video can be used or enhanced. SEI messages are also defined that can contain arbitrary user-defined data. SEI messages do not affect the core decoding process, but can indicate how the video is recommended to be post-processed or displayed. Some other high-level properties of the video content are conveyed in video usability information (VUI), such as the indication of the color space for interpretation of the video content. As new color spaces have been developed, such as for high dynamic range and wide color gamut video, additional VUI identifiers have been added to indicate them.

In an embodiment, the SEI message 322 may be an SDI SEI message. The SDI SEI message may be used to indicate which primary layers are associated with an auxiliary layer when auxiliary information is present in a bitstream. For example, the SDI SEI message may include one or more syntax elements 324 to indicate which primary layers are associated with the auxiliary layer when the auxiliary information is present in the bitstream. A discussion of various SEI messages and the syntax elements included in those SEI messages is provided below.

Those skilled in the art will appreciate that the bitstream 300 may contain other parameters and information in practical applications.

To solve the above problems, methods as summarized below are disclosed. The techniques should be considered as examples to explain the general concepts and should not be interpreted in a narrow way. Furthermore, these techniques can be applied individually or combined in any manner.

Example 1

1) To solve problem 1, in one example, instead of signaling the length of view ID syntax elements, e.g., via the syntax element sdi_view_id_len, the value of the length minus L (e.g., L=1) is signaled, e.g., via the syntax element sdi_view_id_len_minusL.

a. In one example, furthermore, the syntax element may be coded as an unsigned integer using N bits.

i. In one example, N may be equal to 4.

ii. Alternatively, the syntax may be coded as a fixed-pattern bit string using N bits, or signed integer using N bits, or truncated binary, or a signed integer K-th (e.g., K=0) order Exp-Golomb-coded syntax element, or an unsigned integer M-th (e.g., M=0) order Exp-Golomb-coded syntax element.

b. In one example, alternatively, still signal the length, e.g., via the syntax element sdi_view_id_len, but it is constrained that the value of syntax element shall not be equal to 0.

Example 2

2) To solve problem 2, it is proposed that an auxiliary layer (i.e., a layer having the corresponding sdi_aux_id[i] equal to 1 or 2) may be applied to one or more associated layers.

a. In one example, one or more syntax elements indicating the associated layers for each auxiliary layer may be signaled in the scalability dimension information SEI message.

i. In one example, the associated layers are specified by layer IDs.

ii. In another example, the associated layers are specified by layer indices.

iii. In another example, the indication whether the auxiliary layer is applied to one or more associated layers may be specified by one or more syntax elements for the associated layers.

1. In one example, a syntax element may be used to indicate whether the auxiliary layer is applied to all the associated layers.

2. In one example, a syntax element may be used to indicate whether the auxiliary layer is applied to a specific associated layer.

a. In one example, one or more primary layers are indicated by the syntax elements.

i. In one example, all the primary layers may be indicated by the syntax elements.

ii. In one example, only the primary layers of which the layer index is smaller than the layer index of the auxiliary layer may be indicated by the syntax elements.

iii. In one example, only the primary layers of which the layer index is larger than the layer index of the auxiliary layer may be indicated by the syntax elements.

b. In one example, the syntax element is coded as a flag.

b. Alternatively, it is proposed that the associated one or more layers for each auxiliary layer may be derived without being explicitly signaled.

i. In one example, the associated layers for each auxiliary layer may be the layer having nuh_layer_id equal to the nuh_layer_id of the auxiliary layer plus N1, N2, . . . , and Nk, respectively, where k is an integer and Ni !=Nj for any i, j (i !=j) in the range of 1 to k, inclusive.

1. In one example, k is equal to 1 and N1 may be equal to 1, or 2, or −1, or −2.

2. In one example, k is greater than 1.

a. In one example, k is equal to 2 and N1=1, N2=2.

ii. In one example, the associated layers for each auxiliary layer may be the layer having layer index equal to the layer index of the auxiliary layer plus N1, N2, . . . , and Nk, respectively, where k is an integer and Ni !=Nj for any i, j (i !=j) in the range of 1 to k, inclusive.

1. In one example, k is equal to 1 and N1 may be equal to 1, or 2, or −1, or −2.

2. In one example, k is greater than 1.

a. In one example, k is equal to 2 and N1=1, N2=2.

c. Alternatively, indications of the associated layers of each auxiliary layer may be explicitly signaled as one or a group of syntax elements in the scalability dimension information SEI message.

d. Alternatively, indications of the associated layers of an auxiliary information SEI message (e.g., depth representation information or alpha channel information) may be explicitly signaled by one or more syntax elements in the auxiliary information SEI message.

i. In one example, the auxiliary information SEI message may refer to the depth representation information SEI message or the alpha channel information SEI message.

ii. In one example, the one or more syntax elements may indicate layer ID values of the associated layers.

1. In one example, the layer IDs indicated by the syntax elements may be required to be less than or equal to the maximum layer ID value, i.e., vps_layer_id[vps_max_layers_minus1] or vps_layer_id[sdi_max_layers_minus1].

iii. In one example, the one or more syntax elements may indicate layer index values of the associated layers.

1. In one example, the layer indices indicated by the syntax elements may be required to be less than the maximum number of layers in the bitstream (e.g., sdi_max_layers_minus1 plus 1 or vps_max_layers_minus1 plus 1).

iv. In one example, indication of whether one or multiple layers are associated with auxiliary layers may be signaled.

1. In one example, one syntax element may be used to specify whether an auxiliary information SEI message applies to all layers.

a. In one example, auxiliary_all_layer_flag equal to X (X being 1 or 0) may specify that the auxiliary information SEI message is applied to all associated primary layers.

2. In one example, one or more syntax elements may be used to specify whether the auxiliary information SEI message is applied to one or more layers.

a. In one example, N syntax element may be used to specify whether the auxiliary information SEI message is applied to N layers, wherein each syntax element is used for each layer.

i. In one example, the syntax element may be coded as a flag using 1 bit.

b. In one example, one syntax element may be used to specify whether the auxiliary information SEI message is applied to one or more layers.

i. In one example, the syntax element may be K-th (e.g., K=0) Exp-Golomb coded.

ii. In one example, the syntax element equal to 5 specifies that the auxiliary information SEI message is applied to 0-th and 2nd layer but not applied to 1st layer.

1. Alternatively, denote N as the number of the layers. the syntax element equal to 5 specifies that the auxiliary information SEI message is applied to (N−1)-th and (N−3)-nd layer but not applied to (N−2)-th layer.

c. The above syntax elements may be conditionally signaled, e.g., only when the auxiliary information SEI message is not applied to all layers, e. In one example, indication of number of associated layers of auxiliary pictures for one layer may be signaled in the bitstream.

f. In one example, the above syntax elements may be signaled using unsigned integer using N bits, or, fixed-pattern bit string using N bits, or signed integer using N bits, or truncated binary, or signed integer K-th (e.g., K=0) order Exp-Golomb-coded syntax element, or unsigned integer M-th (e.g., M=0) order Exp-Golomb-coded syntax element.

g. In one example, indications of number of associated layers of auxiliary pictures and/or associated layers of auxiliary pictures may be conditionally signaled, e.g., only when the i-th layer in bitstreamInScope contains auxiliary pictures (e.g., sdi_aux_id[i]>0). The bitstreamInScope (a.k.a., bitstream in scope) is defined as a sequence of AUs that consists, in decoding order, of an initial AU containing an SDI SEI message followed by zero or more subsequent AUs up to, but not including, any subsequent AU that contains another SDI SEI message.

Example 3

3) To solve problem 3, a requirement of bitstream conformance is added that multiview or auxiliary information SEI message shall not be present in a CVS that does not have a scalability dimension information SEI message.

a. Furthermore, the multiview information SEI message may refer to the multiview acquisition information SEI message.

b. Furthermore, the auxiliary information SEI message may refer to the depth representation information SEI message or the alpha channel information SEI message.

c. Alternatively, a requirement of bitstream conformance is added that when the multiview or auxiliary information SEI message is present in the bitstream, at least one of sdi_multiview_info_flag and sdi_auxiliary_info_flag of the scalability dimension information SEI message is required to be equal to 1.

Example 4

4) To solve problem 4, in one example, a requirement of bitstream conformance is added that the multiview acquisition information SEI message shall not be scalable-nested.

a. Alternatively, it is specified that an SEI message that has payloadType equal to 179 (multiview acquisition) shall not be contained in a scalable nesting SEI message.

Below are some example embodiments for some of the examples summarized above. Each embodiment can be applied to VVC. Most relevant parts that have been added or modified are depicted in a bold italic font, and some of the deleted parts are depicted in an italic font. There may be some other changes that are editorial in nature and thus not highlighted.

Each scalability dimension SEI message syntax described below includes one or more syntax elements. A syntax element may be, for example, one or more values, flags, variables, phrases, indications, indices, mappings, data elements, or a combination thereof included in the scalability dimension SEI message syntax disclosed herein. In an embodiment, the syntax elements may be organized into a group of values, flags, variables, phrases, indications, indices, mappings, and/or data elements.

Embodiment 1

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \| \| sdi_auxiliary_info_flag ) { | |
| if( sdi_multiview_info_flag ) | |
| **sdi_view_id_len*_minus1*** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) | |
| **sdi_aux_id**[ i ] | u(8) |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len_minus1 plus 1 specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len_minus1+1 bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi_aux_id[ i ] to the type of auxiliary pictures | | |
|---|---|---|
| sdi_aux_id[ i ] | Name | Type of auxiliary pictures |
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Embodiment 2

Scalability Dimension SEI Message Syntax

```
                                                               Descriptor
scalability_dimension( payloadSize ) {
  sdi_max_layers_minus1                                        u(6)
  sdi_multiview_info_flag                                      u(1)
  sdi_auxiliary_info_flag                                      u(1)
  if( sdi_multiview_info_flag | | sdi_auxiliary_info_flag ) {
    if( sdi_multiview_info_flag )
      sdi_view_id_len_minus1                                   u(4)
    for( i = 0; i <= sdi_max_layers_minus1; i++ ) {
      if( sdi_multiview_info_flag )
        sdi_view_id_val[ i ]                                   u(v)
      if( sdi_auxiliary_info_flag )
        sdi_aux_id[ i ]                                        u(8)
    }
  }
  if( sdi_auxiliary_info_flag ) {
    for( i = 0; i <= sdi_max _layers_minus1; I++ ) {
      sdi_aux_id[ i ]
    }
  }
}
```

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len_minus1 plus 1 specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len_minus1+1 bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi_aux_id[ i ] to the type of auxiliary pictures | | |
|---|---|---|
| sdi_aux_id[ i ] | Name | Type of auxiliary pictures |
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Embodiment 3

Scalability Dimension SEI Message Syntax

```
                                                               Descriptor
scalability_dimension( payloadSize ) {
  sdi_max_layers_minus1                                        u(6)
  sdi_multiview_info_flag                                      u(1)
  sdi_auxiliary_info_flag                                      u(1)
  if( sdi_multiview_info_flag || sdi_auxiliary_info_flag ) {
    if( sdi_multiview_info_flag )
      sdi_view_id_len                                          u(4)
    for( i = 0; i <= sdi_max_layers_minus1; i++ ) {
      if( sdi_multiview_info_flag )
        sdi_view_id_val[ i ]                                   u(v)
      if( sdi_auxiliary_info_flag )
        sdi_aux_id[ i ]                                        u(8)
    }
  }
}
```

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element. When present, sdi_view_id_len shall not be equal to 0.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi_aux_id[ i ] to the type of auxiliary pictures | | |
|---|---|---|
| sdi_aux_id[ i ] | Name | Type of auxiliary pictures |
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Embodiment 4

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \|\| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) *{* | |
| **sdi_aux_id**[ i ] | u(8) |
| ***if (sdi_aux_id[ i ] >0 ) {*** | |
| ***sdi_associated_primary_id[ i ]*** | ***u(6)*** |
| ***}*** | |
| ***}*** | |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

Alternatively, the following applies:

sdi_view_id_len specifies the length, in bits, of the sdi_view_id_val[i] syntax element. When present, sdi_view_id_len shall not be equal to 0.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_ aux_id[i] greater than 0 indicates the type of auxiliary pictures in the i-th layer in bitstreamInScope as specified in Table 1.

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*sdi_associated _primary_id[ i ] specifies the layer ID of the associated primary layer of the i-th layer, which is an auxiliary layer.*

Embodiment 5

Scalability Dimension SEI Message Syntax

```
scalability_dimension( payloadSize ) {                              Descriptor
  sdi_max_layers_minus1                                             u(6)
  sdi_multiview_info_flag                                           u(1)
  sdi_auxiliary_info_flag                                           u(1)
  if( sdi_multiview_info_flag || sdi_auxiliary_info_flag ) {
    if( sdi_multiview_info_flag )
      sdi_view_id_len                                               u(4)
    for( i = 0; i <= sdi_max_layers_minus1; i++ ) {
      if( sdi_multiview_info_flag )
        sdi_view_id_val[ i ]                                        u(v)
      if( sdi_auxiliary_info_flag ) {
        sdi_aux_id[ i ]                                             u(8)
       if ( sdi_aux_id[ i ] > 0 ) {
         sdi_associated_primary_idx[ i ]                            u(6)
       }
      }
    }
  }
}
```

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*sdi_associated_ primary_idx[ i ] specifies the layer index of the associated primary layer of the i-th layer, which is an auxiliary layer. The value of sdi_aux_id[ sdi _associated _primary_layer _idx[ i ] ] shall be equal to 0.*

*NOTE 2 – An auxiliary layer describes a property of and applies to its associated primary layers.*

Embodiment 6

Scalability Dimension SEI Message Syntax

```
scalability_dimension( payloadSize ) {                              Descriptor
  sdi_max_layers_minus1                                             u(6)
  sdi_multiview_info_flag                                           u(1)
  sdi_auxiliary_info_flag                                           u(1)
```

-continued

| | Descriptor |
|---|---|
| if( sdi_multiview_info_flag \|\| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) *{* | |
| **sdi_aux_id**[ i ] | u(8) |
| ***if ( sdi_aux_id[ i ] > 0 ) {*** | |
| ***sdi_num_associated_primary_layers_minus1[ i ]*** | ***u(6)*** |
| ***for (j = 0; j<= sdi_num_associated_primary_layers_minus1[ i ]; j++) {*** | |
| ***sdi_associated_primary_layer_id[ i ][ j ]*** | ***u(6)*** |
| ***}*** | |
| ***}*** | |
| ***}*** | |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*If sdi_aux_id[ i ] is equal to 0, the i-th layer is referred to as a primary layer. Otherwise, the i-th layer is referred to as an auxiliary layer. When sdi_aux_id[ i ] is equal to 1, the i-th layer is also referred to as an alpha auxiliary layer. When sdi_aux_id[ i ] is equal to 2, the i-th layer is also referred to as a depth auxiliary layer.*

*sdi_num_associated _primary_layers _minus1[ i ] plus 1 indicates the number of associated primary layers of the i-th layer, which is an auxiliary layer. The value of sdi_num_associated _primary_layers_ _minus1[ i ] shall be less than the total number of primary layers.*

*sdi_associated _primary_layer _id[ i ][ j ] indicates the layer ID of the associated layer of the i-th layer, which is an auxiliary layer.*

Embodiment 7

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \|\| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) *{* | |
| **sdi_aux_id**[ i ] | u(8) |
| ***if ( sdi_aux_id[ i ]>0 ) {*** | |
| ***sdi_num_associated_primary_layers_minus1[ i ]*** | ***u(6)*** |
| ***for (j = 0; j<= sdi_num_associated_primary_layers_minus1[ i ]; j++) {*** | |
| ***sdi_associated_primary_layer_idx[ i ][ j ]*** | ***u(6)*** |
| ***}*** | |
| ***}*** | |
| ***}*** | |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*If sdi_aux_id[ i ] is equal to 0, the i-th layer is referred to as a primary layer. Otherwise, the i-th layer is referred to as an auxiliary layer. When sdi_aux_id[ i ] is equal to 1, the i-th layer is also referred to as an alpha auxiliary layer. When sdi_aux_id [ i ] is equal to 2, the i-th layer is also referred to as a depth auxiliary layer.*

*sdi_num_associated _primary_layers _minus1[ i ] plus 1 indicates the number of associated primary layers of the i-th layer, which is an auxiliary layer. The value of sdi_num_associated _primary_layers _minus1[ i ] shall be less than the total number of primary layers.*

*sdi_associated _primary_layer _idx[ i ][ j ] specifies the layer index of the j-th associated primary layer of the i-th layer, which is an auxiliary layer. The value of sdi_aux_id[ sdi _associated_primary _layer_idx[ i ][ j ] ] shall be equal to 0.*

*NOTE 2 An auxiliary layer describes a property of and applies to its associated primary layers.*

Embodiment 8

Scalability Dimension SEI Message Syntax

```
                                                              Descriptor
scalability_dimension( payloadSize ) {
  sdi_max_layers_minus1                                       u(6)
  sdi_multiview_info_flag                                     u(1)
  sdi_auxiliary_info_flag                                     u(1)
  if( sdi_multiview_info_flag || sdi_auxiliary_info_flag ) {
    if( sdi_multiview_info_flag )
      sdi_view_id_len                                         u(4)
    for( i = 0; i <= sdi_max_layers_minus1; i++ ) {
      if( sdi_multiview_info_flag )
        sdi_view_id_val[ i ]                                  u(v)
      if( sdi_auxiliary_info_flag ) {
        sdi_aux_id[ i ]                                       u(8)
       if ( sdi_aux_id[ i ] > 0 ) {
         for (j = 0;j <= i -1;j++) {
           if ( sdi_aux_id[ j ] = = 0 ) {
             sdi_associated_primary_layer_flag[ I ][ j ]      u(6)
           }
         }
       }
      }
    }
  }
}
```

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi_aux_id[ i ] to the type of auxiliary pictures | | |
|---|---|---|
| sdi_aux_id[ i ] | Name | Type of auxiliary pictures |
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*If sdi_aux_id[ i ] is equal to 0, the i-th layer is referred to as a primary layer. Otherwise, the i-th layer is referred to as an auxiliary layer. When sdi_aux_id[ i ] is equal to 1, the i-th layer is also referred to as an alpha auxiliary layer. When sdi_aux_id [ i ] is equal to 2, the i-th layer is also referred to as a depth auxiliary layer.*

*sdi_associated _primary_layer _flag[ i ][ j ] equal to 1 specifies the j-th layer is the associated primary layer of the i-th layer, which is an auxiliary layer.*

*Note 2 – An auxiliary layer describes a property of and applies to its associated primary layers.*

Embodiment 9

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \|\| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) ***{*** | |
| **sdi_aux_id**[ i ] | u(8) |
| ***if ( sdi_aux_id[ i ] > 0 ) {*** | |
| ***for (j = 0; j = sdi_max_layers_minus1; j++ ) {*** | |
| ***if ( sdi_aux_id[ j ] = = 0 ) {*** | |
| ***sdi_associated_primary_layer_flag[ I ][ j ]*** | ***u(6)*** |
| ***}*** | |
| ***}*** | |
| ***}*** | |
| ***}*** | |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi__aux__id[ i ] to the type of auxiliary pictures | | |
|---|---|---|
| sdi__aux__id[ i ] | Name | Type of auxiliary pictures |
| 1 | AUX__ALPHA | Alpha plane |
| 2 | AUX__DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*If sdi_aux_id[ i ] is equal to 0, the i-th layer is referred to as a primary layer. Otherwise, the i-th layer is referred to as an auxiliary layer. When sdi_aux _id[ i ] is equal to 1, the i-th layer is also referred to as an alpha auxiliary layer. When sdi_aux _id[ i ] is equal to 2, the i-th layer is also referred to as a depth auxiliary layer.*

*sdi_associated _primary_layer _flag[ i ][ j ] equal to 1 specifies the j-th layer is the associated primary layer of the i-th layer, which is an auxiliary layer.*

*NOTE 2 – An auxiliary layer describes a property of and applies to its associatedprimary layers.*

Embodiment 10

Scalability Dimension SEI Message Syntax

```
                                                                  Descriptor
scalability__dimension( payloadSize ) {
  sdi__max__layers__minus1                                        u(6)
  sdi__multiview__info__flag                                      u(1)
  sdi__auxiliary__info__flag                                      u(1)
  if( sdi__multiview__info__flag || sdi__auxiliary__info__flag ) {
    if( sdi__multiview__info__flag )
      sdi__view__id__len                                          u(4)
    for( i = 0; i <= sdi__max__layers__minus1; i++ ) {
      if( sdi__multiview__info__flag )
        sdi__view__id__val[ i ]                                   u(v)
      if( sdi__auxiliary__info__flag ) {
        sdi__aux__id[ i ]                                         u(8)
       if ( sdi_aux_id[ i ]>0 ) {
         sdi_all_associated_primary_layers_flag[ i ]              u(1)
         if (sdi_all_associated_primary_layers_flag = = 0) {
           for (j = 0;j <= sdi_max_layers_minus1; j++) {
             if ( sdi_aux_id[ j ] = = 0 ) {
               sdi_associated_primary_layer_flag[ i ][ j ]        u(6)
             }
           }
         }
       }
      }
    }
  }
}
```

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

| Mapping of sdi__aux__id[ i ] to the type of auxiliary pictures | | |
|---|---|---|
| sdi__aux__id[ i ] | Name | Type of auxiliary pictures |
| 1 | AUX__ALPHA | Alpha plane |
| 2 | AUX__DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

*If sdi_aux_id[ i ] is equal to 0, the i-th layer is referred to as a primary layer. Otherwise, the i-th layer is referred to as an auxiliary layer. When_sdi_aux_ id[ i ] is equal to 1, the i-th layer is also referred to as an alpha auxiliary layer.*

*When sdi_aux _id[ i ] is equal to 2, the i-th layer is also referred to as a depth auxiliary layer.*

*sdi_all_associated _primary_layers_flag [ i ] equal to 1 specifies the i-th layer, which is an auxiliary layer, is applied to all the primary layers. sdi_all_associated _primary_layers _flag[i] equal to 0 specifies the i-th layer, which is an auxiliary layer, is applied to one or more primary layers.*

*sdi_associated_ primary_layer_ flag[ i ][ j ] equal to 1 specifies the j-th layer is the associated primary layer of the i-th layer, which is an auxiliary layer. sdi_associated_primary _layer_flag[ i ][ j ] equal to 0 specifies the i-th layer, which is an auxiliary layer, in not applied to the j-th primary layer. When sdi_all_associated _primary_layers_flag[ i ] equal to 1, sdi_associated_ primary_layer_flag [ i ][ j ] is inferred to be 1.*

*NOTE 2 – An auxiliary layer describes a property of and applies to its associated primary layers.*

Embodiment 11

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \| \| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) | |
| **sdi_aux_id**[ i ] | u(8) |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1. *the associated layer for each auxiliary layer (i.e., sdi_aux_id[ i ] equal to 1 or 2) is the layer having nuh_layer_id equal to the nuh_layer_id of the auxiliary layer plus 1.*

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Embodiment 12

Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \| \| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) | |
| **sdi_aux_id**[ i ] | u(8) |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

*When sdi_aux_id[ i ] is equal to 1 or 2, let nuhLayer be the value of the nuh_layer_id of the i-th layer, the following applies:*

*The i-th layer is referred to as an alpha auxiliary layer or a depth auxiliary layer, respectively.*

*The value of sdi _aux_id[ GeneralLayerIdx[ nuhLayerId + 1 ] ] shall be equal to 0, and the layer with nuh_layer_id equal to nuhLayerId + 1 is referred to as the primary layer associated with the i-th layer.*

*NOTE 1–An alpha auxiliary layer or a depth auxiliary layer applies to its associted primary layer that is not an auxiliary layer.*

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Embodiment 13

Depth Representation Information SEI Message

Depth Representation Information SEI Message Syntax

| | Descriptor |
|---|---|
| depth_representation_info( payloadSize ) { | |
| ***depth_representation_primary_layer_id*** | ***u(6)*** |
| **z_near_flag** | u(1) |
| **z_far_flag** | u(1) |
| **d_min_flag** | u(1) |
| **d_max_flag** | u(1) |
| **depth_representation_type** | ue(v) |
| if( d_min_flag \| \| d_max_flag ) | |
| **disparity_ref_view_id** | ue(v) |
| if( z_near_flag ) | |
| depth_rep_info_element( ZNearSign, ZNearExp, ZNearMantissa, ZNearManLen ) | |
| if( z_far_flag ) | |
| depth_rep_info_element( ZFarSign, ZFarExp, ZFarMantissa, ZFarManLen ) | |
| if( d_min_flag ) | |
| depth_rep_info_element( DMinSign, DMinExp, DMinMantissa, DMinManLen ) | |
| if( d_max_flag ) | |
| depth_rep_info_element( DMaxSign, DMaxExp, DMaxMantissa, DMaxManLen ) | |
| if( depth_representation_type = = 3 ) { | |
| **depth_nonlinear_representation_num_minus1** | ue(v) |
| for( i = 1; i <= depth_nonlinear_representation_num_minus1 + 1; i++ ) | |
| **depth_nonlinear_representation_model**[ i ] | |
| } | |

-continued

| | Descriptor |
|---|---|
| } | |
| depth_rep_info_element( OutSign, OutExp, OutMantissa, OutManLen ) { | |
| e | u(1) |
| **da_exponent** | u(7) |
| **da_mantissa_len_minus1** | u(5) |
| **da_mantissa** | u(v) |
| } | |

Depth Representation Information SEI Message Semantics

The syntax elements in the depth representation information SEI message specify various parameters for auxiliary pictures of type AUX_DEPTH for the purpose of processing decoded primary and auxiliary pictures prior to rendering on a 3D display, such as view synthesis. Specifically, depth or disparity ranges for depth pictures are specified.

When present, the depth representation information SEI message shall be associated with one or more layers with sdi_aux_id value equal to AUX_DEPTH. The following semantics apply separately to each nuh_layer_id targetLayerId among the nuh_layer_id values to which the depth representation information SEI message applies.

When present, the depth representation information SEI message may be included in any access unit. It is recommended that, when present, the SEI message is included for the purpose of random access in an access unit in which the coded picture with nuh_layer_id equal to targetLayerId is an Intra Random Access Picture (IRAP) picture.

For an auxiliary picture with sdi_aux_id[targetLayerId] equal to AUX_DEPTH, an associated primary picture, if any, is a picture in the same access unit having sdi_aux_id [nuhLayerIdB] equal to 0 such that ScalabilityId[LayerIdxInVps[targetLayerId]][j] is equal to ScalabilityId[LayerIdxInVps[nuhLayerIdB]][j] for all values of j in the range of 0 to 2, inclusive, and 4 to 15, inclusive.

The information indicated in the SEI message applies to all the pictures with nuh_layer_id equal to targetLayerId from the access unit containing the SEI message up to but excluding the next picture, in decoding order, associated with a depth representation information SEI message applicable to targetLayerId or to the end of the CLVS of the nuh_layer_id equal to targetLayerId, whichever is earlier in decoding order.

*depth_representation _primary_layer_id specifies the nuh _layer_id value of the associated primary layer to which the depth representation information SEI message applies.* z_near_flag equal to 0 specifies that the syntax elements specifying the nearest depth value are not present in the syntax structure. z_near_flag equal to 1 specifies that the syntax elements specifying the nearest depth value are present in the syntax structure.

z_far_flag equal to 0 specifies that the syntax elements specifying the farthest depth value are not present in the syntax structure. z_far_flag equal to 1 specifies that the syntax elements specifying the farthest depth value are present in the syntax structure.

d_min_flag equal to 0 specifies that the syntax elements specifying the minimum disparity value are not present in the syntax structure. d_min_flag equal to 1 specifies that the syntax elements specifying the minimum disparity value are present in the syntax structure.

d_max_flag equal to 0 specifies that the syntax elements specifying the maximum disparity value are not present in the syntax structure. d_max_flag equal to 1 specifies that the syntax elements specifying the maximum disparity value are present in the syntax structure.

depth_representation_type specifies the representation definition of decoded luma samples of auxiliary pictures as specified in Table Y1. In Table Y1, disparity specifies the horizontal displacement between two texture views and Z value specifies the distance from a camera.

The variable maxVal is set equal to (1<<(8+sps_bitdepth_minus8))−1, where sps_bitdepth_minus8 is the value included in or inferred for the active SPS of the layer with nuh_layer_id equal to targetLayerId.

TABLE Y1

Definition of depth_representation_type

| depth_representation_type | Interpretation |
|---|---|
| 0 | Each decoded luma sample value of an auxiliary picture represents an inverse of Z value that is uniformly quantized into the range of 0 to maxVal, inclusive.<br>When z_far_flag is equal to 1, the luma sample value equal to 0 represents the inverse of ZFar (specified below). When z_near_flag is equal to 1, the luma sample value equal to maxVal represents the inverse of ZNear (specified below). |
| 1 | Each decoded luma sample value of an auxiliary picture represents disparity that is uniformly quantized into the range of 0 to maxVal, inclusive.<br>When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive.<br>When z_far_flag is equal to 1, the luma sample value equal to 0 corresponds to ZFar (specified below). When z_near_flag is equal to 1, |

TABLE Y1-continued

| Definition of depth_representation_type | |
|---|---|
| depth_representation_type | Interpretation |
| | the luma sample value equal to max Val represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i ]. When d_min_flag is equal to 1, the luma sample value equal to 0 represents DMin (specified below). When d_max_flag is equal to 1, the luma sample value equal to maxVal represents DMax (specified below). |
| Other values | Reserved for future use |

disparity_ref_view_id specifies the ViewId value against which the disparity values are derived.

NOTE 1—disparity_ref_view_id is present only if d_min_flag is equal to 1 or d_max_flag is equal to 1 and is useful for depth_representation_type values equal to 1 and 3.

The variables in the x column of Table Y2 are derived from the respective variables in the s, e, n and v columns of Table Y2 as follows:

If the value of e is in the range of 0 to 127, exclusive, x is set equal to $(-1)^s*2^{e-31}*(1+n\div 2^v)$.

Otherwise (e is equal to 0), x is set equal to $(-1)^s*2^{-(30+v)}*n$.

NOTE 1—The above specification is similar to that found in IEC 60559:1989.

TABLE Y2

| Association between depth parameter variables and syntax elements | | | | |
|---|---|---|---|---|
| x | s | e | n | v |
| ZNear | ZNearSign | ZNearExp | ZNearMantissa | ZNearManLen |
| ZFar | ZFarSign | ZFarExp | ZFarMantissa | ZFarManLen |
| DMax | DMaxSign | DMaxExp | DMaxMantissa | DMaxManLen |
| DMin | DMinSign | DMinExp | DMinMantissa | DMinManLen |

depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The values of depth_nonlinear_representation_model[0] and depth_nonlinear_representation_model[depth_nonlinear_representation_num_minus1+2] are both inferred to be equal to 0.

NOTE 2—When depth_representation_type is equal to 3, an auxiliary picture contains nonlinearly transformed depth samples. The variable DepthLUT[i], as specified below, is used to transform decoded depth sample values from the nonlinear representation to the linear representation, i.e., uniformly quantized disparity values. The shape of this transform is defined by means of line-segment approximation in two-dimensional linear-disparity-to-nonlinear-disparity space. The first (0, 0) and the last (maxVal, maxVal) nodes of the curve are predefined. Positions of additional nodes are transmitted in form of deviations (depth_nonlinear_representation_model[i]) from the straight-line curve. These deviations are uniformly distributed along the whole range of 0 to maxVal, inclusive, with spacing depending on the value of nonlinear_depth_representation_num_minus1.

The variable DepthLUT[i] for i in the range of 0 to maxVal, inclusive, is specified as follows:

```
for( k = 0; k <= depth_nonlinear_representation_num_minus1 + 1; k++ ) {
   pos1 = ( maxVal * k ) / (depth_nonlinear_representation_num_minus1 + 2 )
   dev1 = depth_nonlinear_representation_model[ k ]
   pos2 = ( maxVal * ( k + 1 ) ) / (depth_nonlinear_representation_num_minus1 + 2 )
   dev2 = depth_nonlinear_representation_model[ k + 1 ]   (X)
   x1 = pos1 − dev1
   y1 = pos1 + dev1
   x2 = pos2 − dev2
   y2 = pos2 + dev2
   for( x = Max( x1, 0 ); x <= Min( x2, maxVal ); x++ )
      DepthLUT[ x ] = Clip3( 0, maxVal, Round( ( ( x − x1 ) * ( y2 − y1 ) ) ÷ ( x2 −
x1 ) + y1 ) )
}
```

The DMin and DMax values, when present, are specified in units of a luma sample width of the coded picture with ViewId equal to ViewId of the auxiliary picture.

The units for the ZNear and ZFar values, when present, are identical but unspecified.

depth_nonlinear_representation_num_minus1 plus 2 specifies the number of piece-wise linear segments for mapping of depth values to a scale that is uniformly quantized in terms of disparity.

When depth_representation_type is equal to 3, DepthLUT [dS] for all decoded luma sample values dS of an auxiliary picture in the range of 0 to maxVal, inclusive, represents disparity that is uniformly quantized into the range of 0 to maxVal, inclusive.

The syntax structure specifies the value of an element in the depth representation information SEI message.

The syntax structure sets the values of the OutSign, OutExp, OutMantissa and OutManLen variables that represent a floating-point value. When the syntax structure is included in another syntax structure, the variable names OutSign, OutExp, OutMantissa and OutManLen are to be interpreted as being replaced by the variable names used when the syntax structure is included.

da_sign_flag equal to 0 indicates that the sign of the floating-point value is positive. da_sign_flag equal to 1 indicates that the sign is negative. The variable OutSign is set equal to da_sign_flag.

da_exponent specifies the exponent of the floating-point value. The value of da_exponent shall be in the range of 0 to $2^7-2$, inclusive. The value $2^7-1$ is reserved for future use by ITU-T|ISO/IEC. Decoders shall treat the value $2^7-1$ as indicating an unspecified value. The variable OutExp is set equal to da_exponent.

da_mantissa_len_minus1 plus 1 specifies the number of bits in the da_mantissa syntax element. The value of da_mantissa_len_minus1 shall be in the range of 0 to 31, inclusive. The variable OutManLen is set equal to da_mantissa_len_minus1+1.

da_mantissa specifies the mantissa of the floating-point value. The variable OutMantissa is set equal to da_mantissa.

Embodiment 14

Depth Representation Information SEI Message

Depth Representation Information SEI Message Syntax

| | Descriptor |
|---|---|
| depth_representation_info( payloadSize ) { | |
| ***depth_representation_primary_layer_num*** | ***u(6)*** |
| ***for (i = 0; i < depth_representation_primary_layer_num; i++ ) {*** | |
| ***depth_representation_primary_layer_id[ i ]*** | ***u(6)*** |
| ***}*** | |
| **z_near_flag** | u(1) |
| **z_far_flag** | u(1) |
| **d_min_flag** | u(1) |
| **d_max_flag** | u(1) |
| **depth_representation_type** | ue(v) |
| if( d_min_flag \| \| d_max_flag ) | |
| **disparity_ref_view_id** | ue(v) |
| if( z_near_flag ) | |
| depth_rep_info_element( ZNearSign, ZNearExp, ZNearMantissa, ZNearManLen ) | |
| if( z_far_flag ) | |
| depth_rep_info_element( ZFarSign, ZFarExp, ZFarMantissa, ZFarManLen ) | |
| if( d_min_flag ) | |
| depth_rep_info_element( DMinSign, DMinExp, DMinMantissa, DMinManLen ) | |
| if( d_max_flag ) | |
| depth_rep_info_element( DMaxSign, DMaxExp, DMaxMantissa, DMaxManLen ) | |
| if( depth_representation_type = = 3 ) { | |
| **depth_nonlinear_representation_num_minus1** | ue(v) |
| for( i = 1; i <= depth_nonlinear_representation_num_minus1 + 1; i++ ) | |
| **depth_nonlinear_representation_model**[ i ] | |
| } | |
| } | |

| | Descriptor |
|---|---|
| depth_rep_info_element( OutSign, OutExp, OutMantissa, OutManLen ) { | |
| **da_sign_flag** | u(1) |
| **da_exponent** | u(7) |
| **da_mantissa_len_minus1** | u(5) |
| **da_mantissa** | u(v) |
| } | |

Depth Representation Information SEI Message Semantics

The syntax elements in the depth representation information SEI message specify various parameters for auxiliary pictures of type AUX_DEPTH for the purpose of processing decoded primary and auxiliary pictures prior to rendering on a 3D display, such as view synthesis. Specifically, depth or disparity ranges for depth pictures are specified.

When present, the depth representation information SEI message shall be associated with one or more layers with sdi_aux_id value equal to AUX_DEPTH. The following semantics apply separately to each nuh_layer_id targetLayerId among the nuh_layer_id values to which the depth representation information SEI message applies.

When present, the depth representation information SEI message may be included in any access unit. It is recommended that, when present, the SEI message is included for the purpose of random access in an access unit in which the coded picture with nuh_layer_id equal to targetLayerId is an TRAP picture.

For an auxiliary picture with sdi_aux_id[targetLayerId] equal to AUX_DEPTH, an associated primary picture, if any, is a picture in the same access unit having sdi_aux_id [nuhLayerIdB] equal to 0 such that ScalabilityId[LayerIdxInVps[targetLayerId]][j] is equal to ScalabilityId[LayerIdxInVps[nuhLayerIdB]][j] for all values of j in the range of 0 to 2, inclusive, and 4 to 15, inclusive.

The information indicated in the SEI message applies to all the pictures with nuh_layer_id equal to targetLayerId from the access unit containing the SEI message up to but excluding the next picture, in decoding order, associated with a depth representation information SEI message applicable to targetLayerId or to the end of the CLVS of the nuh_layer_id equal to targetLayerId, whichever is earlier in decoding order.

*depth_representation _primary_layer_num specifies the number of the associated primary layers to which the depth representation information SEI message applies.*

*depth_representation _primary_layer_id[ i ] specifies the nuh _layer_id value of the i-th associated primary layer to which the depth representation information SEI message applies.* d_max_flag equal to 0 specifies that the syntax elements specifying the maximum disparity value are not present in the syntax structure. d_max_flag equal to 1 specifies that the syntax elements specifying the maximum disparity value are present in the syntax structure.

depth_representation_type specifies the representation definition of decoded luma samples of auxiliary pictures as specified in Table Y1. In Table Y1, disparity specifies the horizontal displacement between two texture views and Z value specifies the distance from a camera.

The variable maxVal is set equal to (1<<<(8+sps_bitdepth_minus8))−1, where sps_bitdepth_minus8 is the value included in or inferred for the active SPS of the layer with nuh_layer_id equal to targetLayerId.

TABLE Y1

Definition of depth_representation_type

| depth_representation_type | Interpretation |
|---|---|
| 0 | Each decoded luma sample value of an auxiliary picture represents an inverse of Z value that is uniformly quantized into the range of 0 to maxVal, inclusive.<br>When z_far_flag is equal to 1, the luma sample value equal to 0 represents the inverse of ZFar (specified below). When z_near_flag is equal to 1, the luma sample value equal to max Val represents the inverse of ZNear (specified below). |
| 1 | Each decoded luma sample value of an auxiliary picture represents disparity that is uniformly quantized into the range of 0 to maxVal, inclusive.<br>When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive.<br>When z_far_flag is equal to 1, the luma sample value equal to 0 corresponds to ZFar (specified below). When z_near_flag is equal to 1, the luma sample value equal to max Val represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i ].<br>When d_min_flag is equal to 1, the luma sample value equal to 0 represents DMin (specified below). When d_max_flag is equal to 1, the luma sample value equal to maxVal represents DMax (specified below). |
| Other values | Reserved for future use |

z_near_flag equal to 0 specifies that the syntax elements specifying the nearest depth value are not present in the syntax structure. z_near_flag equal to 1 specifies that the syntax elements specifying the nearest depth value are present in the syntax structure.

z_far_flag equal to 0 specifies that the syntax elements specifying the farthest depth value are not present in the syntax structure. z_far_flag equal to 1 specifies that the syntax elements specifying the farthest depth value are present in the syntax structure.

d_min_flag equal to 0 specifies that the syntax elements specifying the minimum disparity value are not present in the syntax structure. d_min_flag equal to 1 specifies that the syntax elements specifying the minimum disparity value are present in the syntax structure.

disparity_ref_view_id specifies the ViewId value against which the disparity values are derived.

NOTE 1—disparity_ref_view_id is present only if d_min_flag is equal to 1 or d_max_flag is equal to 1 and is useful for depth_representation_type values equal to 1 and 3.

The variables in the x column of Table Y2 are derived from the respective variables in the s, e, n and v columns of Table Y2 as follows:

If the value of e is in the range of 0 to 127, exclusive, x is set equal to $(-1)^s * 2^{e-31} * (1+n \div 2^v)$.

Otherwise (e is equal to 0), x is set equal to $(-1)^s * 2^{-(30+v)} * n$.

NOTE 1—The above specification is similar to that found in IEC 60559:1989.

TABLE Y2

| Association between depth parameter variables and syntax elements | | | | |
|---|---|---|---|---|
| x | s | e | n | v |
| ZNear | ZNearSign | ZNearExp | ZNearMantissa | ZNearManLen |
| ZFar | ZFarSign | ZFarExp | ZFarMantissa | ZFarManLen |
| DMax | DMaxSign | DMaxExp | DMaxMantissa | DMaxManLen |
| DMin | DMinSign | DMinExp | DMinMantissa | DMinManLen |

The DMin and DMax values, when present, are specified in units of a luma sample width of the coded picture with ViewId equal to ViewId of the auxiliary picture.

The units for the ZNear and ZFar values, when present, are identical but unspecified.

depth_nonlinear_representation_num_minus1 plus 2 specifies the number of piece-wise linear segments for mapping of depth values to a scale that is uniformly quantized in terms of disparity.

depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The values of depth_nonlinear_representation_model[0] and depth_nonlinear_representation_model[depth_nonlinear_representation_num_minus1+2] are both inferred to be equal to 0.

NOTE 2—When depth_representation_type is equal to 3, an auxiliary picture contains nonlinearly transformed depth samples. The variable DepthLUT[i], as specified below, is used to transform decoded depth sample values from the nonlinear representation to the linear representation, i.e., uniformly quantized disparity values. The shape of this transform is defined by means of line-segment approximation in two-dimensional linear-disparity-to-nonlinear-disparity space. The first (0, 0) and the last (maxVal, maxVal) nodes of the curve are predefined. Positions of additional nodes are transmitted in form of deviations (depth_nonlinear_representation_model[i]) from the straight-line curve. These deviations are uniformly distributed along the whole range of 0 to maxVal, inclusive, with spacing depending on the value of nonlinear_depth_representation_num_minus1.

The variable DepthLUT[i] for i in the range of 0 to maxVal, inclusive, is specified as follows:

```
for( k = 0; k <= depth_nonlinear_representation_num_minus1 + 1; k++ ) {
   pos1 = ( maxVal * k ) / (depth_nonlinear_representation_num_minus1 + 2 )
   dev1 = depth_nonlinear_representation_model[ k ]
   pos2 = ( maxVal * ( k + 1 ) ) / (depth_nonlinear_representation_num_minus1 + 2 )
   dev2 = depth_nonlinear_representation_model[ k + 1 ]                    (X)
   x1 = pos1 − dev1
   y1 = pos1 + dev1
   x2 = pos2 − dev2
   y2 = pos2 + dev2
   for( x = Max( x1, 0 ); x <= Min( x2, maxVal ); x++ )
      DepthLUT[ x ] = Clip3( 0, maxVal, Round( ( ( x − x1 ) * ( y2 − y1 ) ) ÷ ( x2 − x1
)
+ y1 ) )
}
```

When depth_representation_type is equal to 3, DepthLUT [dS] for all decoded luma sample values dS of an auxiliary picture in the range of 0 to maxVal, inclusive, represents disparity that is uniformly quantized into the range of 0 to maxVal, inclusive.

The syntax structure specifies the value of an element in the depth representation information SEI message.

The syntax structure sets the values of the OutSign, OutExp, OutMantissa and OutManLen variables that represent a floating-point value. When the syntax structure is included in another syntax structure, the variable names OutSign, OutExp, OutMantissa and OutManLen are to be interpreted as being replaced by the variable names used when the syntax structure is included.

da_sign_flag equal to 0 indicates that the sign of the floating-point value is positive. da_sign_flag equal to 1 indicates that the sign is negative. The variable OutSign is set equal to da_sign_flag.

da_exponent specifies the exponent of the floating-point value. The value of da_exponent shall be in the range of 0 to $2^7-2$, inclusive. The value $2^7-1$ is reserved for future use by ITU-T|ISO/IEC. Decoders shall treat the value $2^7-1$ as indicating an unspecified value. The variable OutExp is set equal to da_exponent.

da_mantissa_len_minus1 plus 1 specifies the number of bits in the da_mantissa syntax element. The value of da_mantissa_len_minus1 shall be in the range of 0 to 31, inclusive. The variable OutManLen is set equal to da_mantissa_len_minus1+1.

da_mantissa specifies the mantissa of the floating-point value. The variable OutMantissa is set equal to da_mantissa.

Embodiment 15

Alpha Channel Information SEI Message
Alpha Channel Information SEI Message Syntax

| | Descriptor |
|---|---|
| alpha_channel_info( payloadSize ) { | |
| ***alpha_channel_primary_layer_id*** | ***u(6)*** |
| **alpha_channel_cancel_flag** | u(1) |
| if( !alpha_channel_cancel_flag ) { | |
| **alpha_channel_use_idc** | u(3) |
| **alpha_channel_bit_depth_minus8** | u(3) |
| **alpha_transparent_value** | u(v) |
| **alpha_opaque_value** | u(v) |
| **alpha_channel_incr_flag** | u(1) |
| **alpha_channel_clip_flag** | u(1) |
| if( alpha_channel_clip_flag ) | |
| **alpha_channel_clip_type_flag** | u(1) |
| } | |
| } | |

Alpha Channel Information SEI Message Semantics

The alpha channel information SEI message provides information about alpha channel sample values and post-processing applied to the decoded alpha planes coded in auxiliary pictures of type AUX_ALPHA and one or more associated primary pictures.

For an auxiliary picture with nuh_layer_id equal to nuhLayerIdA and sdi_aux_id[nuhLayerIdA] equal to AUX_ALPHA, an associated primary picture, if any, is a picture in the same access unit having sdi_aux_id[nuhLayerIdB] equal to 0 such that ScalabilityId[LayerIdxInVps[nuhLayerIdA]][j] is equal to ScalabilityId[LayerIdxInVps[nuhLayerIdB]][j] for all values of j in the range of 0 to 2, inclusive, and 4 to 15, inclusive.

When an access unit contains an auxiliary picture picA with nuh_layer_id equal to nuhLayerIdA and sdi_aux_id[nuhLayerIdA] equal to AUX_ALPHA, the alpha channel sample values of picA persist in output order until one or more of the following conditions are true:

The next picture, in output order, with nuh_layer_id equal to nuhLayerIdA is output.

A CLVS containing the auxiliary picture picA ends.

The bitstream ends.

A CLVS of any associated primary layer of the auxiliary picture layer with nuh_layer_id equal to nuhLayerIdA ends.

The following semantics apply separately to each nuh_layer_id targetLayerId among the nuh_layer_id values to which the alpha channel information SEI message applies.

alpha_channel_primary_layer_id specifies the nuh_layer_id value of the associated primary layer to which the alpha channel information SEI applies to.

alpha_channel_cancel_flag equal to 1 indicates that the alpha channel information SEI message cancels the persistence of any previous alpha channel information SEI message in output order that applies to the current layer. alpha_channel_cancel_flag equal to 0 indicates that alpha channel information follows.

Let currPic be the picture that the alpha channel information SEI message is associated with. The semantics of alpha channel information SEI message persist for the current layer in output order until one or more of the following conditions are true:

A new CLVS of the current layer begins.

The bitstream ends.

A picture picB with nuh_layer_id equal to targetLayerId in an access unit containing an alpha channel information SEI message with nuh_layer_id equal to targetLayerId is output having PicOrderCnt(picB) greater than PicOrderCnt(currPic), where PicOrderCnt(picB) and PicOrderCnt(currPic) are the PicOrderCntVal values of picB and currPic, respectively, immediately after the invocation of the decoding process for picture order count for picB.

alpha_channel_use_idc equal to 0 indicates that for alpha blending purposes the decoded samples of the associated primary picture should be multiplied by the interpretation sample values of the auxiliary coded picture in the display process after output from the decoding process. alpha_channel_use_idc equal to 1 indicates that for alpha blending purposes the decoded samples of the associated primary picture should not be multiplied by the interpretation sample values of the auxiliary coded picture in the display process after output from the decoding process. alpha_channel_use_idc equal to 2 indicates that the usage of the auxiliary picture is unspecified. Values greater than 2 for alpha_channel_use_idc are reserved for future use by ITU-T|ISO/IEC. When not present, the value of alpha_channel_use_idc is inferred to be equal to 2.

alpha_channel_bit_depth_minus8 plus 8 specifies the bit depth of the samples of the luma sample array of the auxiliary picture. alpha_channel_bit_depth_minus8 shall be in the range 0 to 7 inclusive. alpha_channel_bit_depth_minus8 shall be equal to bit_depth_luma_minus8 of the associated primary picture.

alpha_transparent_value specifies the interpretation sample value of an auxiliary coded picture luma sample for which the associated luma and chroma samples of the primary coded picture are considered transparent for purposes of alpha blending. The number of bits used for the representation of the alpha_transparent_value syntax element is alpha_channel_bit_depth_minus8+9.

alpha_opaque_value specifies the interpretation sample value of an auxiliary coded picture luma sample for which the associated luma and chroma samples of the primary coded picture are considered opaque for purposes of alpha blending. The number of bits used for the representation of the alpha_opaque_value syntax element is alpha_channel_bit_depth_minus8+9.

alpha_channel_incr_flag equal to 0 indicates that the interpretation sample value for each decoded auxiliary picture luma sample value is equal to the decoded auxiliary picture sample value for purposes of alpha blending. alpha_channel_incr_flag equal to 1 indicates that, for purposes of alpha blending, after decoding the auxiliary picture samples, any auxiliary picture luma sample value that is greater than Min(alpha_opaque_value, alpha_transparent_value) should be increased by one to obtain the interpretation sample value for the auxiliary picture sample and any auxiliary picture luma sample value that is less than or equal to Min(alpha_opaque_value, alpha_transparent_value) should be used, without alteration, as the interpretation sample value for the decoded auxiliary picture sample value. When not present, the value of alpha_channel_incr_flag is inferred to be equal to 0.

alpha_channel_clip_flag equal to 0 indicates that no clipping operation is applied to obtain the interpretation sample values of the decoded auxiliary picture. alpha_channel_clip_flag equal to 1 indicates that the interpretation sample values of the decoded auxiliary picture are altered according to the clipping process described by the alpha_channel_clip_type_flag syntax element. When not present, the value of alpha_channel_clip_flag is inferred to be equal to 0.

alpha_channel_clip_type_flag equal to 0 indicates that, for purposes of alpha blending, after decoding the auxiliary picture samples, any auxiliary picture luma sample that is greater than (alpha_opaque_value−alpha_transparent_value)/2 is set equal to alpha_opaque_value to obtain the interpretation sample value for the auxiliary picture luma sample and any auxiliary picture luma sample that is less or equal than (alpha_opaque_value−alpha_transparent_value)/2 is set equal to alpha_transparent_value to obtain the interpretation sample value for the auxiliary picture luma sample. alpha_channel_clip_type_flag equal to 1 indicates that, for purposes of alpha blending, after decoding the auxiliary picture samples, any auxiliary picture luma sample that is greater than alpha_opaque_value is set equal to alpha_opaque_value to obtain the interpretation sample value for the auxiliary picture luma sample and any auxiliary picture luma sample that is less than or equal to alpha_transparent_value is set equal to alpha_transparent_value to obtain the interpretation sample value for the auxiliary picture luma sample.

NOTE—When both alpha_channel_incr_flag and alpha_channel_clip_flag are equal to one, the clipping operation specified by alpha_channel_clip_type_flag should be applied first followed by the alteration specified by alpha_channel_incr_flag to obtain the interpretation sample value for the auxiliary picture luma sample.

Embodiment 16

Alpha Channel Information SEI Message
Alpha Channel Information SEI Message Syntax

| | Descriptor |
|---|---|
| alpha_channel_info( payloadSize ) { | |
| **alpha_channel_cancel_flag** | u(1) |
| if( !alpha_channel_cancel_flag ) { | |
| ***alpha_channel_primary_layer_num*** | ***u(6)*** |
| ***for (i = 0; i < alpha_channel_primary _layer_num; i++ ) {*** | |
| ***alpha_channel_primary_layer_id*** | ***u(6)*** |
| ***}*** | |
| **alpha_channel_use_idc** | u(3) |
| **alpha_channel_bit_depth_minus8** | u(3) |
| **alpha_transparent_value** | u(v) |
| **alpha_opaque_value** | u(v) |
| **alpha_channel_incr_flag** | u(1) |
| **alpha_channel_clip_flag** | u(1) |
| if( alpha_channel_clip_flag ) | |
| **alpha_channel_clip_type_flag** | u(1) |
| } | |
| } | |

Alpha Channel Information SEI Message Semantics

The alpha channel information SEI message provides information about alpha channel sample values and post-processing applied to the decoded alpha planes coded in auxiliary pictures of type AUX_ALPHA and one or more associated primary pictures.

For an auxiliary picture with nuh_layer_id equal to nuhLayerIdA and sdi_aux_id[nuhLayerIdA] equal to AUX_ALPHA, an associated primary picture, if any, is a picture in the same access unit having sdi_aux_id[nuhLayerIdB] equal to 0 such that ScalabilityId[LayerIdxInVps[nuhLayerIdA]][j] is equal to ScalabilityId[LayerIdxInVps[nuhLayerIdB]][j] for all values of j in the range of 0 to 2, inclusive, and 4 to 15, inclusive.

When an access unit contains an auxiliary picture picA with nuh_layer_id equal to nuhLayerIdA and sdi_aux_id[nuhLayerIdA] equal to AUX_ALPHA, the alpha channel sample values of picA persist in output order until one or more of the following conditions are true:

The next picture, in output order, with nuh_layer_id equal to nuhLayerIdA is output.

A CLVS containing the auxiliary picture picA ends.

The bitstream ends.

A CLVS of any associated primary layer of the auxiliary picture layer with nuh_layer_id equal to nuhLayerIdA ends.

The following semantics apply separately to each nuh_layer_id targetLayerId among the nuh_layer_id values to which the alpha channel information SEI message applies.

alpha_channel_cancel_flag equal to 1 indicates that the alpha channel information SEI message cancels the persistence of any previous alpha channel information SEI message in output order that applies to the current layer. alpha_channel_cancel_flag equal to 0 indicates that alpha channel information follows.

Let currPic be the picture that the alpha channel information SEI message is associated with. The semantics of alpha channel information SEI message persist for the current layer in output order until one or more of the following conditions are true:

A new CLVS of the current layer begins.

The bitstream ends.

A picture picB with nuh_layer_id equal to targetLayerId in an access unit containing an alpha channel information SEI message with nuh_layer_id equal to targetLayerId is output having PicOrderCnt(picB) greater than PicOrderCnt(currPic), where PicOrderCnt(picB) and PicOrderCnt(currPic) are the PicOrderCntVal values of picB and currPic, respectively, immediately after the invocation of the decoding process for picture order count for picB.

*alpha_channel _primary_layer _num specifies the number of the associated primary layers to which the alpha channel information SEI message applies.*

*alpha_channel _primary_layer_id[ i ] specifies the nuh _layer_id value of the i-th associated primary layer to which the alpha channel information SEI message applies.* alpha_channel_use_idc equal to 0 indicates that for alpha blending purposes the decoded samples of the associated primary picture should be multiplied by the interpretation sample values of the auxiliary coded picture in the display process after output from the decoding process. alpha_channel_use_idc equal to 1 indicates that for alpha blending purposes the decoded samples of the associated primary picture should not be multiplied by the interpretation sample values of the auxiliary coded picture in the display process after output from the decoding process. alpha_channel_use_idc equal to 2 indicates that the usage of the auxiliary picture is unspecified. Values greater than 2 for alpha_channel_use_idc are reserved for future use by ITU-T|ISO/IEC. When not present, the value of alpha_channel_use_idc is inferred to be equal to 2.

alpha_channel_bit_depth_minus8 plus 8 specifies the bit depth of the samples of the luma sample array of the auxiliary picture. alpha_channel_bit_depth_minus8 shall be in the range 0 to 7 inclusive. alpha_channel_bit_depth_minus8 shall be equal to bit_depth_luma_minus8 of the associated primary picture.

alpha_transparent_value specifies the interpretation sample value of an auxiliary coded picture luma sample for which the associated luma and chroma samples of the primary coded picture are considered transparent for purposes of alpha blending. The number of bits used for the representation of the alpha_transparent_value syntax element is alpha_channel_bit_depth_minus8+9.

alpha_opaque_value specifies the interpretation sample value of an auxiliary coded picture luma sample for which the associated luma and chroma samples of the primary coded picture are considered opaque for purposes of alpha blending. The number of bits used for the representation of the alpha_opaque_value syntax element is alpha_channel_bit_depth_minus8+9.

alpha_channel_incr_flag equal to 0 indicates that the interpretation sample value for each decoded auxiliary picture luma sample value is equal to the decoded auxiliary picture sample value for purposes of alpha blending. alpha_channel_incr_flag equal to 1 indicates that, for purposes of alpha blending, after decoding the auxiliary picture samples, any auxiliary picture luma sample value that is greater than Min(alpha_opaque_value, alpha_transparent_value) should be increased by one to obtain the interpretation sample value for the auxiliary picture sample and any auxiliary picture luma sample value that is less than or equal to Min(alpha_opaque_value, alpha_transparent_value) should be used, without alteration, as the interpretation sample value for the decoded auxiliary picture sample value. When not present, the value of alpha_channel_incr_flag is inferred to be equal to 0.

alpha_channel_clip_flag equal to 0 indicates that no clipping operation is applied to obtain the interpretation sample values of the decoded auxiliary picture. alpha_channel_clip_flag equal to 1 indicates that the interpretation sample values of the decoded auxiliary picture are altered according to the clipping process described by the alpha_channel_clip_type_flag syntax element. When not present, the value of alpha_channel_clip_flag is inferred to be equal to 0.

alpha_channel_clip_type_flag equal to 0 indicates that, for purposes of alpha blending, after decoding the auxiliary picture samples, any auxiliary picture luma sample that is greater than (alpha_opaque_value−alpha_transparent_value)/2 is set equal to alpha_opaque_value to obtain the interpretation sample value for the auxiliary picture luma sample and any auxiliary picture luma sample that is less or equal than (alpha_opaque_value−alpha_transparent_value)/2 is set equal to alpha_transparent_value to obtain the interpretation sample value for the auxiliary picture luma sample. alpha_channel_clip_type_flag equal to 1 indicates that, for purposes of alpha blending, after decoding the auxiliary picture samples, any auxiliary picture luma sample that is greater than alpha_opaque_value is set equal to alpha_opaque_value to obtain the interpretation sample value for the auxiliary picture luma sample and any auxiliary picture luma sample that is less than or equal to alpha_transparent_value is set equal to alpha_transparent_value to obtain the interpretation sample value for the auxiliary picture luma sample.

NOTE—When both alpha_channel_incr_flag and alpha_channel_clip_flag are equal to one, the clipping operation specified by alpha_channel_clip_type_flag should be applied first followed by the alteration specified by alpha_channel_incr_flag to obtain the interpretation sample value for the auxiliary picture luma sample.

Embodiment 17

Multiview Acquisition Information SEI Message

Multiview Acquisition Information SEI Message Syntax

| | Descriptor |
|---|---|
| multiview_acquisition_info( payloadSize ) { | |
| **intrinsic_param_flag** | u(1) |
| **extrinsic_param_flag** | u(1) |
| if( intrinsic_param_flag ) { | |
| **intrinsic_params_equal_flag** | u(1) |
| **prec_focal_length** | ue(v) |
| **prec_principal_point** | ue(v) |
| **prec_skew_factor** | ue(v) |
| for( i = 0; i <= intrinsic_params_equal_flag ? 0 : num ViewsMinus1; i++ ) { | |
| **sign_focal_length_x**[ i ] | u(1) |
| **exponent_focal_length_x**[ i ] | u(6) |
| **mantissa_focal_length_x**[ i ] | u(v) |
| **sign_focal_length_y**[ i ] | u(1) |
| **exponent_focal_length_y**[ i ] | u(6) |
| **mantissa_focal_length_y**[ i ] | u(v) |
| **sign_principal_point_x**[ i ] | u(1) |
| **exponent_principal_point_x**[ i ] | u(6) |
| **mantissa_principal_point_x**[ i ] | u(v) |
| **sign_principal_point_y**[ i ] | u(1) |
| **exponent_principal_point_y**[ i ] | u(6) |
| **mantissa_principal_point_y**[ i ] | u(v) |
| **sign_skew_factor**[ i ] | u(1) |
| **exponent_skew_factor**[ i ] | u(6) |
| **mantissa_skew_factor**[ i ] | u(v) |
| } | |
| } | |
| if( extrinsic_param_flag ) { | |
| **prec_rotation_param** | ue(v) |
| **prec_translation_param** | ue(v) |
| for( i = 0; i <= numViewsMinus1; i++ ) | |
| for( j = 0; j < 3; j++ ) { /* row */ | |
| for( k = 0; k < 3; k++ ) { /* column */ | |
| **sign_r**[ i ][ j ][ k ] | u(1) |
| **exponent_r**[ i ][ j ][ k ] | u(6) |
| **mantissa_r**[ i ][ j ][ k ] | u(v) |
| } | |
| **sign_t**[ i ][ j ] | u(1) |
| **exponent_t**[ i ][ j ] | u(6) |
| **mantissa_t**[ i ][ j ] | u(v) |
| } | |
| } | |
| } | |

Multiview Acquisition Information SEI Message Semantics

The multiview acquisition information (MAI) SEI message specifies various parameters of the acquisition environment. Specifically, intrinsic and extrinsic camera parameters are specified. These parameters could be used for processing the decoded views prior to rendering on a 3D display.

The following semantics apply separately to each nuh_layer_id targetLayerId among the nuh_layer_id values to which the multiview acquisition information SEI message applies.

When present, the multiview acquisition information SEI message that applies to the current layer shall be included in an access unit that contains an TRAP picture that is the first picture of a CLVS of the current layer. The information signalled in the SEI message applies to the CLVS.

An MAI SEI message that has payloadType equal to 179 (multiview acquisition) shall not be contained in a scalable nesting SEI message.

Let the current AU be the AU containing the current MAI SEI message, and the current CVS be the CVS containing the current AU.

When a CVS does not contain an SDI SEI message, the CVS shall not contain an MAI SEI message.

When an AU contains both an SDI SEI message and an MAI SEI message, the SDI SEI message shall precede the MAI SEI message in decoding order.

When the multiview acquisition information SEI message is contained in a scalable nesting SEI message, the syntax elements sn_ols_flag and sn_all_layers_flag in the scalable nesting SEI message shall be equal to 0.

The variable numViewsMinus1 is derived as follows:

If the multiview acquisition information SEI message is not included in a scalable nesting SEI message, numViewsMinus1 is set equal to 0.

Otherwise (the multiview acquisition information SEI message is included in a scalable nesting SEI message), numViewsMinus1 is set equal to sn_num_layers_minus1.

Some of the views for which the multiview acquisition information is included in a multiview acquisition information SEI message may not be present.

In the semantics below, index i refers to the syntax elements and variables that apply to the layer with nuh_layer_id equal to NestingLayerId[i].

The extrinsic camera parameters are specified according to a right-handed coordinate system, where the upper left corner of the image is the origin, i.e., the (0, 0) coordinate, with the other corners of the image having non-negative coordinates. With these specifications, a 3-dimensional world point, wP=[x y z] is mapped to a 2-dimensional camera point, cP[i]=[u v 1], for the i-th camera according to:

$$s*cP[i]=A[i]*R^{-1}[i]*(wP-T[i]) \quad \text{(X)}$$

where A[i] denotes the intrinsic camera parameter matrix, $R^{-1}$[i] denotes the inverse of the rotation matrix R[i], T[i] denotes the translation vector and s (a scalar value) is an arbitrary scale factor chosen to make the third coordinate of cP[i] equal to 1. The elements of A[i], R[i] and T[i] are determined according to the syntax elements signalled in this SEI message and as specified below.

intrinsic_param_flag equal to 1 indicates the presence of intrinsic camera parameters. intrinsic_param_flag equal to 0 indicates the absence of intrinsic camera parameters.

extrinsic_param_flag equal to 1 indicates the presence of extrinsic camera parameters. extrinsic_param_flag equal to 0 indicates the absence of extrinsic camera parameters.

intrinsic_params_equal_flag equal to 1 indicates that the intrinsic camera parameters are equal for all cameras and only one set of intrinsic camera parameters are present. intrinsic_params_equal_flag equal to 0 indicates that the intrinsic camera parameters are different for each camera and that a set of intrinsic camera parameters are present for each camera.

prec_focal_length specifies the exponent of the maximum allowable truncation error for focal_length_x[i] and focal_length_y[i] as given by $2^{-prec\_focal\_length}$. The value of prec_focal_length shall be in the range of 0 to 31, inclusive.

prec_principal_point specifies the exponent of the maximum allowable truncation error for principal_point_x[i] and principal_point_y[i] as given by $2^{-prec\_principal\_point}$. The value of prec_principal_point shall be in the range of 0 to 31, inclusive.

prec_skew_factor specifies the exponent of the maximum allowable truncation error for skew factor as given by $2^{-prec\_skew\_factor}$. The value of prec_skew_factor shall be in the range of 0 to 31, inclusive.

sign_focal_length_x[i] equal to 0 indicates that the sign of the focal length of the i-th camera in the horizontal direction is positive. sign_focal_length_x[i] equal to 1 indicates that the sign is negative.

exponent_focal_length_x[i] specifies the exponent part of the focal length of the i-th camera in the horizontal direction. The value of exponent_focal_length_x[i] shall be in the range of 0 to 62, inclusive. The value 63 is reserved for future use by ITU-T|ISO/IEC. Decoders shall treat the value 63 as indicating an unspecified focal length.

mantissa_focal_length_x[i] specifies the mantissa part of the focal length of the i-th camera in the horizontal direction. The length of the mantissa_focal_length_x[i] syntax element is variable and determined as follows:

If exponent_focal_length_x[i] is equal to 0, the length is Max(0, prec_focal_length−30).

Otherwise (exponent_focal_length_x[i] is in the range of 0 to 63, exclusive), the length is Max(0, exponent_focal_length_x[i]+prec_focal_length−31). sign_focal_length_y[i] equal to 0 indicates that the sign of the focal length of the i-th camera in the vertical direction is positive. sign_focal_length_y[i] equal to 1 indicates that the sign is negative.

exponent_focal_length_y[i] specifies the exponent part of the focal length of the i-th camera in the vertical direction. The value of exponent_focal_length_y[i] shall be in the range of 0 to 62, inclusive. The value 63 is reserved for future use by ITU-T|ISO/IEC. Decoders shall treat the value 63 as indicating an unspecified focal length.

mantissa_focal_length_y[i] specifies the mantissa part of the focal length of the i-th camera in the vertical direction.

The length of the mantissa_focal_length_y[i] syntax element is variable and determined as follows:

If exponent_focal_length_y[i] is equal to 0, the length is Max(0, prec_focal_length−30).

Otherwise (exponent_focal_length_y[i] is in the range of 0 to 63, exclusive), the length is Max(0, exponent_focal_length_y[i]+prec_focal_length−31).

sign_principal_point_x[i] equal to 0 indicates that the sign of the principal point of the i-th camera in the horizontal direction is positive. sign_principal_point_x[i] equal to 1 indicates that the sign is negative.

exponent_principal_point_x[i] specifies the exponent part of the principal point of the i-th camera in the horizontal direction. The value of exponent_principal_point_x[i] shall be in the range of 0 to 62, inclusive. The value 63 is reserved for future use by ITU-T|ISO/IEC. Decoders shall treat the value 63 as indicating an unspecified principal point.

mantissa_principal_point_x[i] specifies the mantissa part of the principal point of the i-th camera in the horizontal direction. The length of the mantissa_principal_point_x[i] syntax element in units of bits is variable and is determined as follows:

If exponent_principal_point_x[i] is equal to 0, the length is Max(0, prec_principal_point−30).

Otherwise (exponent_principal_point_x[i] is in the range of 0 to 63, exclusive), the length is Max(0, exponent_principal_point_x[i]+prec_principal_point−31).

sign_principal_point_y[i] equal to 0 indicates that the sign of the principal point of the i-th camera in the vertical direction is positive. sign_principal_point_y[i] equal to 1 indicates that the sign is negative.

exponent_principal_point_y[i] specifies the exponent part of the principal point of the i-th camera in the vertical direction. The value of exponent_principal_point_y[i] shall be in the range of 0 to 62, inclusive. The value 63 is reserved for future use by ITU-T|ISO/IEC. Decoders shall treat the value 63 as indicating an unspecified principal point.

mantissa_principal_point_y[i] specifies the mantissa part of the principal point of the i-th camera in the vertical direction. The length of the mantissa_principal_point_y[i] syntax element in units of bits is variable and is determined as follows:

If exponent_principal_point_y[i] is equal to 0, the length is Max(0, prec_principal_point−30).

Otherwise (exponent_principal_point_y[i] is in the range of 0 to 63, exclusive), the length is Max(0, exponent_principal_point_y[i]+prec_principal_point−31).

sign_skew_factor[i] equal to 0 indicates that the sign of the skew factor of the i-th camera is positive.

sign_skew_factor[i] equal to 1 indicates that the sign is negative.

exponent_skew_factor[i] specifies the exponent part of the skew factor of the i-th camera. The value of exponent_skew_factor[i] shall be in the range of 0 to 62, inclusive. The value 63 is reserved for future use by ITU-T|ISO/IEC. Decoders shall treat the value 63 as indicating an unspecified skew factor.

mantissa_skew_factor[i] specifies the mantissa part of the skew factor of the i-th camera. The length of the mantissa_skew_factor[i] syntax element is variable and determined as follows:

If exponent_skew_factor[i] is equal to 0, the length is Max(0, prec_skew_factor−30).

Otherwise (exponent_skew_factor[i] is in the range of 0 to 63, exclusive), the length is Max(0, exponent_skew_f actor[i]+prec_skew_factor−31).

The intrinsic matrix A[i] for i-th camera is represented by $$\begin{bmatrix} \text{focal Length } X[i] & \text{skew Factor}[i] & \text{principal Point } X[i] \\ 0 & \text{focal Length } Y[i] & \text{principal Point } Y[i] \\ 0 & 0 & 1 \end{bmatrix} \quad \text{(X)}$$

prec_rotation_param specifies the exponent of the maximum allowable truncation error for r[i][j][k] as given by $2^{-prec\_rotation\_param}$. The value of prec_rotation_param shall be in the range of 0 to 31, inclusive.

prec_translation_param specifies the exponent of the maximum allowable truncation error for t[i][j] as given by $2^{-prec\_translation\_param}$. The value of prec_translation_param shall be in the range of 0 to 31, inclusive.

sign_r[i][j][k] equal to 0 indicates that the sign of (j, k) component of the rotation matrix for the i-th camera is positive. sign_r[i][j][k] equal to 1 indicates that the sign is negative.

exponent_r[i][j][k] specifies the exponent part of (j, k) component of the rotation matrix for the i-th camera. The value of exponent_r[i][j][k] shall be in the range of 0 to 62, inclusive. The value 63 is reserved for future use by ITU-T|ISO/IEC. Decoders shall treat the value 63 as indicating an unspecified rotation matrix.

mantissa_r[i][j][k] specifies the mantissa part of (j, k) component of the rotation matrix for the i-th camera. The length of the mantissa_r[i][j][k] syntax element in units of bits is variable and determined as follows:

If exponent_r[i] is equal to 0, the length is Max(0, prec_rotation_param−30).

Otherwise (exponent_r[i] is in the range of 0 to 63, exclusive), the length is Max(0, exponent_r[i]+prec_rotation_param−31).

The rotation matrix R[i] for i-th camera is represented as follows:

$$\begin{bmatrix} rE[i][0][0] & rE[i][0][1] & rE[i][0][2] \\ rE[i][1][0] & rE[i][1][1] & rE[i][1][2] \\ rE[i][2][0] & rE[i][2][1] & rE[i][2][2] \end{bmatrix} \quad \text{(X)}$$

sign_t[i][j] equal to 0 indicates that the sign of the j-th component of the translation vector for the i-th camera is positive. sign_t[i][j] equal to 1 indicates that the sign is negative.

exponent_t[i][j] specifies the exponent part of the j-th component of the translation vector for the i-th camera. The value of exponent_t[i][j] shall be in the range of 0 to 62, inclusive. The value 63 is reserved for future use by ITU-T|ISO/IEC. Decoders shall treat the value 63 as indicating an unspecified translation vector.

mantissa_t[i][ j] specifies the mantissa part of the j-th component of the translation vector for the i-th camera. The length v of the mantissa_t[i][j] syntax element in units of bits is variable and is determined as follows:

If exponent_t[i] is equal to 0, the length v is set equal to Max(0, prec_translation_param−30).

Otherwise (0<exponent_t[i]<63), the length v is set equal to Max(0, exponent_t[i]+prec_translation_param−31).

The translation vector T[i] for the i-th camera is represented by:

$$\begin{bmatrix} tE[i][0] \\ tE[i][1] \\ tE[i][2] \end{bmatrix} \quad \text{(X)}$$

The association between the camera parameter variables and corresponding syntax elements is specified by Table ZZ. Each component of the intrinsic and rotation matrices and the translation vector is obtained from the variables specified in Table ZZ as the variable x computed as follows:

If e is in the range of 0 to 63, exclusive, x is set equal to $(-1)^s*2^{e-31}*(1+n\div 2^v)$.

Otherwise (e is equal to 0), x is set equal to $(-1)^s*2^{-(30+v)}*n$.

NOTE—The above specification is similar to that found in IEC 60559:1989.

TABLE ZZ

Association between camera parameter variables and syntax elements.

| x | s | e | n |
|---|---|---|---|
| **focalLengthX**[ i ] | sign_focal_length_x[ i ] | exponent_focal_length_x[ i ] | mantissa_focal_length_x[ i ] |
| **focalLengthY**[ i ] | sign_focal_length_y[ i ] | exponent_focal_length_y[ i ] | mantissa_focal_length_y[ i ] |
| **principalPointX**[ i ] | sign_principal_point_x[ i ] | exponent_principal_point_x[ i ] | mantissa_principal_point_x[ i ] |
| **principalPointY**[ i ] | sign_principal_point_y[ i ] | exponent_principal_point_y[ i ] | mantissa_principal_point_y[ i ] |
| **skewFactor**[ i ] | sign_skew_factor[ i ] | exponent_skew_factor[ i ] | mantissa_skew_factor[ i ] |
| **rE**[ i ][ j ][ k ] | sign_r[ i ][ j ][ k ] | exponent_r[ i ][ j ][ k ] | mantissa_r[ i ][ j ][ k ] |
| **tE**[ i ][ j ] | sign_t[ i ][ j ] | exponent_t[ i ][ j ] | mantissa_t[ i ][ j ] |

Embodiment 18

Depth Representation Information SEI Message

Depth Representation Information SEI Message Syntax

| | Descriptor |
|---|---|
| depth_representation_info( payloadSize ) { | |
| **z_near_flag** | u(1) |
| **z_far_flag** | u(1) |
| **d_min_flag** | u(1) |
| **d_max_flag** | u(1) |
| **depth_representation_type** | ue(v) |
| if( d_min_flag \| \| d_max_flag ) | |
| **disparity_ref_view_id** | ue(v) |
| if( z_near_flag ) | |
| depth_rep_info_element( ZNearSign, ZNearExp, ZNearMantissa, ZNearManLen ) | |
| if( z_far_flag ) | |
| depth_rep_info_element( ZFarSign, ZFarExp, ZFarMantissa, ZFarManLen ) | |
| if( d_min_flag ) | |
| depth_rep_info_element( DMinSign, DMinExp, DMinMantissa, DMinManLen ) | |
| if( d_max_flag ) | |
| depth_rep_info_element( DMaxSign, DMaxExp, DMaxMantissa, DMaxManLen ) | |
| if( depth_representation_type = = 3 ) { | |
| **depth_nonlinear_representation_num_minus1** | ue(v) |
| for( i = 1; i <= depth_nonlinear_representation_num_minus1 + 1; i++ ) | |
| **depth_nonlinear_representation_model**[ i ] | |
| } | |
| } | |

| | Descriptor |
|---|---|
| depth_rep_info_element( OutSign, OutExp, OutMantissa, OutManLen ) { | |
| **da_sign_flag** | u(1) |
| **da_exponent** | u(7) |
| **da_mantissa_len_minus1** | u(5) |
| **da_mantissa** | u(v) |
| } | |

Depth Representation Information SEI Message Semantics

The syntax elements in the depth representation information SEI message specify various parameters for auxiliary pictures of type AUX_DEPTH for the purpose of processing decoded primary and auxiliary pictures prior to rendering on a 3D display, such as view synthesis. Specifically, depth or disparity ranges for depth pictures are specified.

When present, the depth representation information SEI message shall be associated with one or more layers with sdi_aux_id value equal to AUX_DEPTH. The following semantics apply separately to each nuh_layer_id targetLayerId among the nuh_layer_id values to which the depth representation information SEI message applies.

When present, the depth representation information SEI message may be included in any access unit. It is recommended that, when present, the SEI message is included for the purpose of random access in an access unit in which the coded picture with nuh_layer_id equal to targetLayerId is an TRAP picture.

It is a requirement of bitstream conformance that the depth representation information SEI message shall not be present in the bitstream in which the scalability dimension information SEI message is not present.

For an auxiliary picture with sdi_aux_id[targetLayerId] equal to AUX_DEPTH, an associated primary picture, if any, is a picture in the same access unit having sdi_aux_id [nuhLayerIdB] equal to 0 such that ScalabilityId[LayerIdx-InVps[targetLayerId]][j] is equal to ScalabilityId[LayerIdx-InVps[nuhLayerIdB]][j] for all values of j in the range of 0 to 2, inclusive, and 4 to 15, inclusive.

The information indicated in the SEI message applies to all the pictures with nuh_layer_id equal to targetLayerId from the access unit containing the SEI message up to but excluding the next picture, in decoding order, associated with a depth representation information SEI message applicable to targetLayerId or to the end of the CLVS of the nuh_layer_id equal to targetLayerId, whichever is earlier in decoding order.

z_near_flag equal to 0 specifies that the syntax elements specifying the nearest depth value are not present in the syntax structure. z_near_flag equal to 1 specifies that the syntax elements specifying the nearest depth value are present in the syntax structure.

z_far_flag equal to 0 specifies that the syntax elements specifying the farthest depth value are not present in the syntax structure. z_far_flag equal to 1 specifies that the syntax elements specifying the farthest depth value are present in the syntax structure.

d_min_flag equal to 0 specifies that the syntax elements specifying the minimum disparity value are not present in the syntax structure. d_min_flag equal to 1 specifies that the syntax elements specifying the minimum disparity value are present in the syntax structure.

d_max_flag equal to 0 specifies that the syntax elements specifying the maximum disparity value are not present in the syntax structure. d_max_flag equal to 1 specifies that the syntax elements specifying the maximum disparity value are present in the syntax structure.

depth_representation_type specifies the representation definition of decoded luma samples of auxiliary pictures as specified in Table Y1. In Table Y1, disparity specifies the horizontal displacement between two texture views and Z value specifies the distance from a camera.

The variable maxVal is set equal to (1<<<(8+sps_bitdepth_minus8))−1, where sps_bitdepth_minus8 is the value included in or inferred for the active SPS of the layer with nuh_layer_id equal to targetLayerId.

TABLE Y1

Definition of depth_representation_type

| depth_representation_type | Interpretation |
|---|---|
| 0 | Each decoded luma sample value of an auxiliary picture represents an inverse of Z value that is uniformly quantized into the range of 0 to maxVal, inclusive.<br>When z_far_flag is equal to 1, the luma sample value equal to 0 represents the inverse of ZFar (specified below). When z_near_flag is equal to 1, the luma sample value equal to maxVal represents the inverse of ZNear (specified below). |
| 1 | Each decoded luma sample value of an auxiliary picture represents disparity that is uniformly quantized into the range of 0 to maxVal, inclusive.<br>When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive.<br>When z_far_flag is equal to 1, the luma sample value equal to 0 corresponds to ZFar (specified below). When z_near_flag is equal to 1, the luma sample value equal to maxVal represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i ].<br>When d_min_flag is equal to 1, the luma sample value equal to 0 represents DMin (specified below). When d_max_flag is equal to 1, the luma sample value equal to maxVal represents DMax (specified below). |
| Other values | Reserved for future use |

disparity_ref_view_id specifies the ViewId value against which the disparity values are derived.

NOTE 1—disparity_ref_view_id is present only if d_min_flag is equal to 1 or d_max_flag is equal to 1 and is useful for depth_representation_type values equal to 1 and 3.

The variables in the x column of Table Y2 are derived from the respective variables in the s, e, n and v columns of Table Y2 as follows:

If the value of e is in the range of 0 to 127, exclusive, x is set equal to $(-1)^{s}*2^{e-31}*(1+n\div 2^{v})$.

Otherwise (e is equal to 0), x is set equal to $(-1)^{s}*2^{-(30+v)}*n$.

NOTE 1—The above specification is similar to that found in IEC 60559:1989.

TABLE Y2

| Association between depth parameter variables and syntax elements | | | | |
|---|---|---|---|---|
| x | s | e | n | v |
| ZNear | ZNearSign | ZNearExp | ZNearMantissa | ZNearManLen |
| ZFar | ZFarSign | ZFarExp | ZFarMantissa | ZFarManLen |
| DMax | DMaxSign | DMaxExp | DMaxMantissa | DMaxManLen |
| DMin | DMinSign | DMinExp | DMinMantissa | DMinManLen |

The DMin and DMax values, when present, are specified in units of a luma sample width of the coded picture with ViewId equal to ViewId of the auxiliary picture.

The units for the ZNear and ZFar values, when present, are identical but unspecified.

depth_nonlinear_representation_num_minus1 plus 2 specifies the number of piece-wise linear segments for mapping of depth values to a scale that is uniformly quantized in terms of disparity.

depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The values of depth_nonlinear_representation_model[0] and depth_nonlinear_representation_model[depth_nonlinear_representation_num_minus1+2] are both inferred to be equal to 0.

NOTE 2—When depth_representation_type is equal to 3, an auxiliary picture contains nonlinearly transformed depth samples. The variable DepthLUT[i], as specified below, is used to transform decoded depth sample values from the nonlinear representation to the linear representation, i.e., uniformly quantized disparity values. The shape of this transform is defined by means of line-segment approximation in two-dimensional linear-disparity-to-nonlinear-disparity space. The first (0, 0) and the last (maxVal, maxVal) nodes of the curve are predefined. Positions of additional nodes are transmitted in form of deviations (depth_nonlinear_representation_model[i]) from the straight-line curve. These deviations are uniformly distributed along the whole range of 0 to maxVal, inclusive, with spacing depending on the value of nonlinear_depth_representation_num_minus1.

The variable DepthLUT[i] for i in the range of 0 to maxVal, inclusive, is specified as follows:

```
for( k = 0; k <= depth_nonlinear_representation_num_minus1 + 1; k++ ) {
   pos1 = ( maxVal * k) / (depth_nonlinear_representation_num_minus1 + 2 )
   dev1 = depth_nonlinear_representation_model[ k ]
   pos2 = (maxVal * ( k + 1 ) ) / (depth_nonlinear_representation_num_minus1 + 2 )
   dev2 = depth_nonlinear_representation_model[ k + 1]    (X)
   x1 = pos1 − dev1
   y1 = pos1 + dev1
   x2 = pos2 − dev2
   y2 = pos2 + dev2
   for( x = Max( x1, 0 ); x <= Min( x2, maxVal ); x++ )
      DepthLUT[ x ] = Clip3( 0, maxVal, Round( ( ( x − x1 ) * ( y2 − y1 ) ) ÷
x2 − x1 ) + y1 ) )
}
```

When depth_representation_type is equal to 3, DepthLUT [dS] for all decoded luma sample values dS of an auxiliary picture in the range of 0 to maxVal, inclusive, represents disparity that is uniformly quantized into the range of 0 to maxVal, inclusive.

The syntax structure specifies the value of an element in the depth representation information SEI message.

The syntax structure sets the values of the OutSign, OutExp, OutMantissa and OutManLen variables that represent a floating-point value. When the syntax structure is included in another syntax structure, the variable names OutSign, OutExp, OutMantissa and OutManLen are to be interpreted as being replaced by the variable names used when the syntax structure is included.

da_sign_flag equal to 0 indicates that the sign of the floating-point value is positive. da_sign_flag equal to 1 indicates that the sign is negative. The variable OutSign is set equal to da_sign_flag.

da_exponent specifies the exponent of the floating-point value. The value of da_exponent shall be in the range of 0 to $2^7-2$, inclusive. The value $2^7-1$ is reserved for future use by ITU-T|ISO/IEC. Decoders shall treat the value $2^7-1$ as indicating an unspecified value. The variable OutExp is set equal to da_exponent.

da_mantissa_len_minus1 plus 1 specifies the number of bits in the da_mantissa syntax element. The value of da_mantissa_len_minus1 shall be in the range of 0 to 31, inclusive. The variable OutManLen is set equal to da_mantissa_len_minus1+1.

da_mantissa specifies the mantissa of the floating-point value. The variable OutMantissa is set equal to da_mantissa.

Embodiment 19

Depth Representation Information SEI Message

Depth Representation Information SEI Message Syntax

| | Descriptor |
|---|---|
| depth_representation_info( payloadSize ) { | |
| **z_near_flag** | u(1) |
| **z_far_flag** | u(1) |
| **d_min_flag** | u(1) |
| **d_max_flag** | u(1) |
| **depth_representation_type** | ue(v) |
| if( d_min_flag \| \| d_max_flag ) | |
| **disparity_ref_view_id** | ue(v) |
| if( z_near_flag ) | |
| depth_rep_info_element( ZNearSign, ZNearExp, ZNearMantissa, ZNearManLen ) | |
| if( z_far_flag ) | |
| depth_rep_info_element( ZFarSign, ZFarExp, ZFarMantissa, ZFarManLen ) | |
| if( d_min_flag ) | |
| depth_rep_info_element( DMinSign, DMinExp, DMinMantissa, DMinManLen ) | |
| if( d_max_flag ) | |
| depth_rep_info_element( DMaxSign, DMaxExp, DMaxMantissa, DMaxManLen ) | |
| if( depth_representation_type = = 3 ) { | |
| **depth_nonlinear_representation_num_minus1** | ue(v) |
| for( i = 1; i <= depth_nonlinear_representation_num_minus1 + 1; i++ ) | |
| **depth_nonlinear_representation_model**[ i ] | |
| } | |
| } | |

| | Descriptor |
|---|---|
| depth_rep_info_element( OutSign, OutExp, OutMantissa, OutManLen ) { | |
| **da_sign_flag** | u(1) |
| Add space | u(7) |
| **da_mantissa_len_minus1** | u(5) |
| **da_mantissa** | u(v) |
| } | |

Depth Representation Information SEI Message Semantics

The syntax elements in the depth representation information (DRI) SEI message specify various parameters for auxiliary pictures of type AUX_DEPTH for the purpose of processing decoded primary and auxiliary pictures prior to rendering on a 3D display, such as view synthesis. Specifically, depth or disparity ranges for depth pictures are specified.

When a CVS does not contain an SDI SEI message with sdi_aux_id[i] equal to 2 for at least one value of i, no picture in the CVS shall be associated with a DRI SEI message.

When an AU contains both an SDI SEI message with sdi_aux_id[i] equal to 2 for at least one value of i and a DRI SEI message, the SDI SEI message shall precede the DRI SEI message in decoding order.

When present, the depth representation information SEI message shall be associated with one or more layers that are indicated as depth auxiliary layers by an SDI SEI message with sdi_aux_id value equal to AUX_DEPTH. The following semantics apply separately to each nuh_layer_id targetLayerId among the nuh_layer_id values to which the depth representation information SEI message applies.

When present, the depth representation information SEI message may be included in any access unit. It is recommended that, when present, the SEI message is included for the purpose of random access in an access unit in which the coded picture with nuh_layer_id equal to targetLayerId is an TRAP picture.

For an auxiliary picture with sdi_aux_id[targetLayerId] equal to AUX_DEPTH, an associated primary picture, if any, is a picture in the same access unit having sdi_aux_id[nuhLayerIdB] equal to 0 such that ScalabilityId[LayerIdxInVps[targetLayerId]][j] is equal to ScalabilityId[LayerIdxInVps[nuhLayerIdB]][j] for all values of j in the range of 0 to 2, inclusive, and 4 to 15, inclusive.

The information indicated in the SEI message applies to all the pictures with nuh_layer_id equal to targetLayerId from the access unit containing the SEI message up to but excluding the next picture, in decoding order, associated with a depth representation information SEI message applicable to targetLayerId or to the end of the CLVS of the nuh_layer_id equal to targetLayerId, whichever is earlier in decoding order.

z_near_flag equal to 0 specifies that the syntax elements specifying the nearest depth value are not present in the syntax structure. z_near_flag equal to 1 specifies that the syntax elements specifying the nearest depth value are present in the syntax structure.

z_far_flag equal to 0 specifies that the syntax elements specifying the farthest depth value are not present in the syntax structure. z_far_flag equal to 1 specifies that the syntax elements specifying the farthest depth value are present in the syntax structure.

d_min_flag equal to 0 specifies that the syntax elements specifying the minimum disparity value are not present in the syntax structure. d_min_flag equal to 1 specifies that the syntax elements specifying the minimum disparity value are present in the syntax structure.

d_max_flag equal to 0 specifies that the syntax elements specifying the maximum disparity value are not present in the syntax structure. d_max_flag equal to 1 specifies that the syntax elements specifying the maximum disparity value are present in the syntax structure.

depth_representation_type specifies the representation definition of decoded luma samples of auxiliary pictures as specified in Table Y1. In Table Y1, disparity specifies the horizontal displacement between two texture views and Z value specifies the distance from a camera.

The variable maxVal is set equal to (1<<<(8+sps_bitdepth_minus8))−1, where sps_bitdepth_minus8 is the value included in or inferred for the active SPS of the layer with nuh_layer_id equal to targetLayerId.

TABLE Y1

Definition of depth_representation_type

| depth_representation_type | Interpretation |
|---|---|
| 0 | Each decoded luma sample value of an auxiliary picture represents an inverse of Z value that is uniformly quantized into the range of 0 to maxVal, inclusive. When z_far_flag is equal to 1, the luma sample value equal to 0 represents the inverse of ZFar (specified below). When z_near_flag is equal to 1, the luma sample value equal to maxVal represents the inverse of ZNear (specified below). |
| 1 | Each decoded luma sample value of an auxiliary picture represents disparity that is uniformly quantized into the range of 0 to maxVal, inclusive. When d_min_flag is equal to 1, the luma sample value equal to 0 represents DMin (specified below). When d_max_flag is equal to 1, the luma sample value equal to maxVal represents DMax (specified below). |
| 2 | Each decoded luma sample value of an auxiliary picture represents a Z value uniformly quantized into the range of 0 to maxVal, inclusive. When z_far_flag is equal to 1, the luma sample value equal to 0 corresponds to ZFar (specified below). When z_near_flag is equal to 1, the luma sample value equal to maxVal represents ZNear (specified below). |
| 3 | Each decoded luma sample value of an auxiliary picture represents a nonlinearly mapped disparity, normalized in range from 0 to maxVal, as specified by depth_nonlinear_representation_num_minus1 and depth_nonlinear_representation_model[ i]. When d_min_flag is equal to 1, the luma sample value equal to 0 represents DMin (specified below). When d_max_flag is equal to 1, the luma sample value equal to maxVal represents DMax (specified below). |
| Other values | Reserved for future use |

disparity_ref_view_id specifies the ViewId value against which the disparity values are derived.

NOTE 1—disparity_ref_view_id is present only if d_min_flag is equal to 1 or d_max_flag is equal to 1 and is useful for depth_representation_type values equal to 1 and 3.

The variables in the x column of Table Y2 are derived from the respective variables in the s, e, n and v columns of Table Y2 as follows:

If the value of e is in the range of 0 to 127, exclusive, x is set equal to $(-1)^s*2^{e-31}*(1+n\div 2^v)$.

Otherwise (e is equal to 0), x is set equal to $(-1)^s*2^{-(30+v)}*n$.

NOTE 1—The above specification is similar to that found in IEC 60559:1989.

TABLE Y2

Association between depth parameter variables and syntax elements

| x | s | e | n | v |
|---|---|---|---|---|
| ZNear | ZNearSign | ZNearExp | ZNearMantissa | ZNearManLen |
| ZFar | ZFarSign | ZFarExp | ZFarMantissa | ZFarManLen |

TABLE Y2-continued

Association between depth parameter variables and syntax elements

| x | s | e | n | v |
|---|---|---|---|---|
| DMax | DMaxSign | DMaxExp | DMaxMantissa | DMaxManLen |
| DMin | DMinSign | DMinExp | DMinMantissa | DMinManLen |

The DMin and DMax values, when present, are specified in units of a luma sample width of the coded picture with ViewId equal to ViewId of the auxiliary picture.

The units for the ZNear and ZFar values, when present, are identical but unspecified.

depth_nonlinear_representation_num_minus1 plus 2 specifies the number of piece-wise linear segments for mapping of depth values to a scale that is uniformly quantized in terms of disparity.

depth_nonlinear_representation_model[i] for i ranging from 0 to depth_nonlinear_representation_num_minus1+2, inclusive, specify the piece-wise linear segments for mapping of decoded luma sample values of an auxiliary picture to a scale that is uniformly quantized in terms of disparity. The values of depth_nonlinear_representation_model[0] and depth_nonlinear_representation_model[depth_nonlinear_representation_num_minus1+2] are both inferred to be equal to 0.

NOTE 2—When depth_representation_type is equal to 3, an auxiliary picture contains nonlinearly transformed depth samples. The variable DepthLUT[i], as specified below, is used to transform decoded depth sample values from the nonlinear representation to the linear representation, i.e., uniformly quantized disparity values. The shape of this transform is defined by means of line-segment approximation in two-dimensional linear-disparity-to-nonlinear-disparity space. The first (0, 0) and the last (maxVal, maxVal) nodes of the curve are predefined. Positions of additional nodes are transmitted in form of deviations (depth_nonlinear_representation_model[i]) from the straight-line curve. These deviations are uniformly distributed along the whole range of 0 to maxVal, inclusive, with spacing depending on the value of nonlinear_depth_representation_num_minus1.

The variable DepthLUT[i] for i in the range of 0 to maxVal, inclusive, is specified as follows:

```
for( k = 0; k <= depth_nonlinear_representation_num_minus1 + 1; k++ ) {
  pos1 = ( maxVal * k ) / (depth_nonlinear_representation_num_minus1 + 2 )
  dev1 = depth_nonlinear_representation_model[ k ]
  pos2 = ( maxVal * ( k + 1 ) ) / (depth_nonlinear_representation_num_minus1 + 2 )
  dev2 = depth_nonlinear_representation_model[ k + 1 ]   (X)
  x1 = pos1 − dev1
  y1 = pos1 + dev1
  x2 = pos2 − dev2
  y2 = pos2 + dev2
  for( x = Max( x1, 0 ); x <= Min( x2, maxVal ); x++ )
    DepthLUT[ x ] = Clip3( 0, maxVal, Round( ( ( x − x1 ) * ( y2 − y1 ) ) ÷
x2 − x1 ) + y1 ) )
}
```

When depth_representation_type is equal to 3, DepthLUT [dS] for all decoded luma sample values dS of an auxiliary picture in the range of 0 to maxVal, inclusive, represents disparity that is uniformly quantized into the range of 0 to maxVal, inclusive.

The syntax structure specifies the value of an element in the depth representation information SEI message.

The syntax structure sets the values of the OutSign, OutExp, OutMantissa and OutManLen variables that represent a floating-point value. When the syntax structure is included in another syntax structure, the variable names OutSign, OutExp, OutMantissa and OutManLen are to be interpreted as being replaced by the variable names used when the syntax structure is included.

da_sign_flag equal to 0 indicates that the sign of the floating-point value is positive. da_sign_flag equal to 1 indicates that the sign is negative. The variable OutSign is set equal to da_sign_flag.

da_exponent specifies the exponent of the floating-point value. The value of da_exponent shall be in the range of 0 to $2^7-2$, inclusive. The value $2^7-1$ is reserved for future use by ITU-T|ISO/IEC. Decoders shall treat the value $2^7-1$ as indicating an unspecified value. The variable OutExp is set equal to da_exponent.

da_mantissa_len_minus1 plus 1 specifies the number of bits in the da_mantissa syntax element. The value of da_mantissa_len_minus1 shall be in the range of 0 to 31, inclusive. The variable OutManLen is set equal to da_mantissa_len_minus1+1.

da_mantissa specifies the mantissa of the floating-point value. The variable OutMantissa is set equal to da_mantissa.

Embodiment 20

Alpha Channel Information SEI Message

Alpha Channel Information SEI Message Syntax

| | Descriptor |
|---|---|
| alpha_channel_info( payloadSize ) { | |
| **alpha_channel_cancel_flag** | u(1) |
| if( !alpha_channel_cancel_flag ) { | |
| **alpha_channel_use_idc** | u(3) |
| **alpha_channel_bit_depth_minus8** | u(3) |
| **alpha_transparent_value** | u(v) |
| **alpha_opaque_value** | u(v) |
| **alpha_channel_incr_flag** | u(1) |
| **alpha_channel_clip_flag** | u(1) |
| if( alpha_channel_clip_flag ) | |
| **alpha_channel_clip_type_flag** | u(1) |
| } | |
| } | |

Alpha Channel Information SEI Message Semantics

The alpha channel information SEI message provides information about alpha channel sample values and post-processing applied to the decoded alpha planes coded in auxiliary pictures of type AUX_ALPHA and one or more associated primary pictures.

For an auxiliary picture with nuh_layer_id equal to nuhLayerIdA and sdi_aux_id[nuhLayerIdA] equal to AUX_ALPHA, an associated primary picture, if any, is a picture in the same access unit having sdi_aux_id[nuhLayerIdB] equal to 0 such that ScalabilityId[LayerIdxInVps[nuhLayerIdA]][j] is equal to ScalabilityId[LayerIdxInVps[nuhLayerIdB]][j] for all values of j in the range of 0 to 2, inclusive, and 4 to 15, inclusive.

When an access unit contains an auxiliary picture picA with nuh_layer_id equal to nuhLayerIdA and sdi_aux_id[nuhLayerIdA] equal to AUX_ALPHA, the alpha channel sample values of picA persist in output order until one or more of the following conditions are true:

- The next picture, in output order, with nuh_layer_id equal to nuhLayerIdA is output.
- A CLVS containing the auxiliary picture picA ends.
- The bitstream ends.
- A CLVS of any associated primary layer of the auxiliary picture layer with nuh_layer_id equal to nuhLayerIdA ends.

*It is a requirement of bitstream conformance that the alpha channel information SEI message shall not be present in the bitstream in which the scalability dimension information SEI message is not present.*

The following semantics apply separately to each nuh_layer_id targetLayerId among the nuh_layer_id values to which the alpha channel information SEI message applies.

alpha_channel_cancel_flag equal to 1 indicates that the alpha channel information SEI message cancels the persistence of any previous alpha channel information SEI message in output order that applies to the current layer. alpha_channel_cancel_flag equal to 0 indicates that alpha channel information follows.

Let currPic be the picture that the alpha channel information SEI message is associated with. The semantics of alpha channel information SEI message persist for the current layer in output order until one or more of the following conditions are true:

A new CLVS of the current layer begins.

The bitstream ends.

A picture picB with nuh_layer_id equal to targetLayerId in an access unit containing an alpha channel information SEI message with nuh_layer_id equal to targetLayerId is output having PicOrderCnt(picB) greater than PicOrderCnt(currPic), where PicOrderCnt(picB) and PicOrderCnt(currPic) are the PicOrderCntVal values of picB and currPic, respectively, immediately after the invocation of the decoding process for picture order count for picB.

alpha_channel_use_idc equal to 0 indicates that for alpha blending purposes the decoded samples of the associated primary picture should be multiplied by the interpretation sample values of the auxiliary coded picture in the display process after output from the decoding process. alpha_channel_use_idc equal to 1 indicates that for alpha blending purposes the decoded samples of the associated primary picture should not be multiplied by the interpretation sample values of the auxiliary coded picture in the display process after output from the decoding process. alpha_channel_use_idc equal to 2 indicates that the usage of the auxiliary picture is unspecified. Values greater than 2 for alpha_channel_use_idc are reserved for future use by ITU-T|ISO/IEC. When not present, the value of alpha_channel_use_idc is inferred to be equal to 2.

alpha_channel_bit_depth_minus8 plus 8 specifies the bit depth of the samples of the luma sample array of the auxiliary picture. alpha_channel_bit_depth_minus8 shall be in the range 0 to 7 inclusive. alpha_channel_bit_depth_minus8 shall be equal to bit_depth_luma_minus8 of the associated primary picture.

alpha_transparent_value specifies the interpretation sample value of an auxiliary coded picture luma sample for which the associated luma and chroma samples of the primary coded picture are considered transparent for purposes of alpha blending. The number of bits used for the representation of the alpha_transparent_value syntax element is alpha_channel_bit_depth_minus8+9.

alpha_opaque_value specifies the interpretation sample value of an auxiliary coded picture luma sample for which the associated luma and chroma samples of the primary coded picture are considered opaque for purposes of alpha blending. The number of bits used for the representation of the alpha_opaque_value syntax element is alpha_channel_bit_depth_minus8+9.

alpha_channel_incr_flag equal to 0 indicates that the interpretation sample value for each decoded auxiliary picture luma sample value is equal to the decoded auxiliary picture sample value for purposes of alpha blending. alpha_channel_incr_flag equal to 1 indicates that, for purposes of alpha blending, after decoding the auxiliary picture samples, any auxiliary picture luma sample value that is greater than Min(alpha_opaque_value, alpha_transparent_value) should be increased by one to obtain the interpretation sample value for the auxiliary picture sample and any auxiliary picture luma sample value that is less than or equal to Min(alpha_opaque_value, alpha_transparent_value) should be used, without alteration, as the interpretation sample value for the decoded auxiliary picture sample value. When not present, the value of alpha_channel_incr_flag is inferred to be equal to 0.

alpha_channel_clip_flag equal to 0 indicates that no clipping operation is applied to obtain the interpretation sample values of the decoded auxiliary picture. alpha_channel_clip_flag equal to 1 indicates that the interpretation sample values of the decoded auxiliary picture are altered according to the clipping process described by the alpha_channel_clip_type_flag syntax element. When not present, the value of alpha_channel_clip_flag is inferred to be equal to 0.

alpha_channel_clip_type_flag equal to 0 indicates that, for purposes of alpha blending, after decoding the auxiliary picture samples, any auxiliary picture luma sample that is greater than (alpha_opaque_value−alpha_transparent_value)/2 is set equal to alpha_opaque_value to obtain the interpretation sample value for the auxiliary picture luma sample and any auxiliary picture luma sample that is less or equal than (alpha_opaque_value−alpha_transparent_value)/2 is set equal to alpha_transparent_value to obtain the interpretation sample value for the auxiliary picture luma sample. alpha_channel_clip_type_flag equal to 1 indicates that, for purposes of alpha blending, after decoding the auxiliary picture samples, any auxiliary picture luma sample that is greater than alpha_opaque_value is set equal to alpha_opaque_value to obtain the interpretation sample value for the auxiliary picture luma sample and any auxiliary picture luma sample that is less than or equal to alpha_transparent_value is set equal to alpha_transparent_value to obtain the interpretation sample value for the auxiliary picture luma sample.

NOTE—When both alpha_channel_incr_flag and alpha_channel_clip_flag are equal to one, the clipping operation specified by alpha_channel_clip_type_flag should be applied first followed by the alteration specified by alpha_channel_incr_flag to obtain the interpretation sample value for the auxiliary picture luma sample.

Embodiment 21

Alpha Channel Information SEI Message

Alpha Channel Information SEI Message Syntax

| | Descriptor |
|---|---|
| alpha_channel_info( payloadSize ) { | |
| **alpha_channel_cancel_flag** | u(1) |
| if( !alpha_channel_cancel_flag ) { | |
| **alpha_channel_use_idc** | u(3) |
| **alpha_channel_bit_depth_minus8** | u(3) |
| **alpha_transparent_value** | u(v) |
| **alpha_opaque_value** | u(v) |
| **alpha_channel_incr_flag** | u(1) |
| **alpha_channel_clip_flag** | u(1) |
| if( alpha_channel_clip_flag ) | |
| **alpha_channel_clip_type_flag** | u(1) |
| } | |
| } | |

Alpha Channel Information SEI Message Semantics

The alpha channel information (ACI) SEI message provides information about alpha channel sample values and post-processing applied to the decoded alpha planes coded in auxiliary pictures of type AUX_ALPHA and one or more associated primary pictures.

For an auxiliary picture with nuh_layer_id equal to nuhLayerIdA and sdi_aux_id[nuhLayerIdA] equal to AUX_ALPHA, an associated primary picture, if any, is a picture in the same access unit having sdi_aux_id[nuhLayerIdB] equal to 0 such that ScalabilityId[LayerIdxInVps[nuhLayerIdA]][j] is equal to ScalabilityId[LayerIdxInVps[nuhLayerIdB]][j] for all values of j in the range of 0 to 2, inclusive, and 4 to 15, inclusive.

When a CVS does not contain an SDI SEI message with sdi_aux_id[i] equal to 1 for at least one value of i, no picture in the CVS shall be associated with an ACI SEI message.

When an AU contains both an SDI SEI message with sdi_aux_id[i] equal to 1 for at least one value of i and an ACI SEI message, the SDI SEI message shall precede the ACI SEI message in decoding order.

When an access unit contains an auxiliary picture picA in a layer that is indicated as an alpha auxiliary layer by an SDI SEI message with nuh_layer_id equal to nuhLayerIdA and sdi_aux_id[nuhLayerIdA] equal to AUX_ALPHA, the alpha channel sample values of picA persist in output order until one or more of the following conditions are true:

The next picture, in output order, with nuh_layer_id equal to nuhLayerIdA is output.

A CLVS containing the auxiliary picture picA ends.

The bitstream ends.

A CLVS of any associated primary layer of the auxiliary picture layer with nuh_layer_id equal to nuhLayerIdA ends.

The following semantics apply separately to each nuh_layer_id targetLayerId among the nuh_layer_id values to which the alpha channel information SEI message applies.

alpha_channel_cancel_flag equal to 1 indicates that the alpha channel information SEI message cancels the persistence of any previous alpha channel information SEI message in output order that applies to the current layer. alpha_channel_cancel_flag equal to 0 indicates that alpha channel information follows.

Let currPic be the picture that the alpha channel information SEI message is associated with. The semantics of alpha channel information SEI message persist for the current layer in output order until one or more of the following conditions are true:

A new CLVS of the current layer begins.

The bitstream ends.

A picture *in the current layer in an AU associated with* picB with nuh_layer_id equal to targetLayerId in an access unit containing an alpha channel information SEI message *is output that follows the current picture in output order.* with nuh_layer_id equal to targetLayerId is output having PicOrderCnt(picB) greater than PicOrderCnt(currPic), where PicOrderCnt(picB) and PicOrderCnt(currPic) are the PicOrderCntVal values of picB and currPic, respectively, immediately after the invocation of the decoding process for picture order count for picB.

alpha_channel_use_idc equal to 0 indicates that for alpha blending purposes the decoded samples of the associated primary picture should be multiplied by the interpretation sample values of the auxiliary coded picture in the display process after output from the decoding process. alpha_channel_use_idc equal to 1 indicates that for alpha blending purposes the decoded samples of the associated primary picture should not be multiplied by the interpretation sample values of the auxiliary coded picture in the display process after output from the decoding process. alpha_channel_use_idc equal to 2 indicates that the usage of the auxiliary picture is unspecified. Values greater than 2 for alpha_channel_use_idc are reserved for future use by ITU-T|ISO/IEC. When not present, the value of alpha_channel_use_idc is inferred to be equal to 2.

alpha_channel_bit_depth_minus8 plus 8 specifies the bit depth of the samples of the luma sample array of the auxiliary picture. alpha_channel_bit_depth_minus8 shall be in the range 0 to 7 inclusive. alpha_channel_bit_depth_minus8 shall be equal to bit_depth_luma_minus8 of the associated primary picture.

alpha_transparent_value specifies the interpretation sample value of an auxiliary coded picture luma sample for which the associated luma and chroma samples of the primary coded picture are considered transparent for purposes of alpha blending. The number of bits used for the representation of the alpha_transparent_value syntax element is alpha_channel_bit_depth_minus8+9.

alpha_opaque_value specifies the interpretation sample value of an auxiliary coded picture luma sample for which the associated luma and chroma samples of the primary coded picture are considered opaque for purposes of alpha blending. The number of bits used for the representation of the alpha_opaque_value syntax element is alpha_channel_bit_depth_minus8+9.

alpha_channel_incr_flag equal to 0 indicates that the interpretation sample value for each decoded auxiliary picture luma sample value is equal to the decoded auxiliary picture sample value for purposes of alpha blending. alpha_channel_incr_flag equal to 1 indicates that, for purposes of alpha blending, after decoding the auxiliary picture samples, any auxiliary picture luma sample value that is greater than Min(alpha_opaque_value, alpha_transparent_value) should be increased by one to obtain the interpretation sample value for the auxiliary picture sample and any auxiliary picture luma sample value that is less than or equal to Min(alpha_opaque_value, alpha_transparent_value) should be used, without alteration, as the interpretation sample value for the decoded auxiliary picture sample value. When not present, the value of alpha_channel_incr_flag is inferred to be equal to 0.

alpha_channel_clip_flag equal to 0 indicates that no clipping operation is applied to obtain the interpretation sample values of the decoded auxiliary picture. alpha_channel_clip_flag equal to 1 indicates that the interpretation sample values of the decoded auxiliary picture are altered according to the clipping process described by the alpha_channel_clip_type_flag syntax element. When not present, the value of alpha_channel_clip_flag is inferred to be equal to 0.

alpha_channel_clip_type_flag equal to 0 indicates that, for purposes of alpha blending, after decoding the auxiliary picture samples, any auxiliary picture luma sample that is greater than (alpha_opaque_value−alpha_transparent_value)/2 is set equal to alpha_opaque_value to obtain the interpretation sample value for the auxiliary picture luma sample and any auxiliary picture luma sample that is less or equal than (alpha_opaque_value−alpha_transparent_value)/2 is set equal to alpha_transparent_value to obtain the interpretation sample value for the auxiliary picture luma sample. alpha_channel_clip_type_flag equal to 1 indicates that, for purposes of alpha blending, after decoding the auxiliary picture samples, any auxiliary picture luma sample that is greater than alpha_opaque_value is set equal to alpha_opaque_value to obtain the interpretation sample value for the auxiliary picture luma sample and any auxiliary picture luma sample that is less than or equal to alpha_transparent_value is set equal to alpha_transparent_value to obtain the interpretation sample value for the auxiliary picture luma sample.

NOTE—When both alpha_channel_incr_flag and alpha_channel_clip_flag are equal to one, the clipping operation specified by alpha_channel_clip_type_flag should be applied first followed by the alteration specified by alpha_channel_incr_flag to obtain the interpretation sample value for the auxiliary picture luma sample.

Embodiment 22

Scalability Dimension Information (SDI) SEI Message
Scalability Dimension SEI Message Syntax

| | Descriptor |
|---|---|
| scalability_dimension( payloadSize ) { | |
| **sdi_max_layers_minus1** | u(6) |
| **sdi_multiview_info_flag** | u(1) |
| **sdi_auxiliary_info_flag** | u(1) |
| if( sdi_multiview_info_flag \| \| sdi_auxiliary_info_flag ) { | |
| if( sdi_multiview_info_flag ) | |
| **sdi_view_id_len** | u(4) |
| for( i = 0; i <= sdi_max_layers_minus1; i++ ) { | |
| if( sdi_multiview_info_flag ) | |
| **sdi_view_id_val**[ i ] | u(v) |
| if( sdi_auxiliary_info_flag ) | |
| **sdi_aux_id**[ i ] | u(8) |
| } | |
| } | |
| } | |

Scalability Dimension SEI Message Semantics

The scalability dimension SEI message provides the scalability dimension information for each layer in bitstreamInScope (defined below), such as 1) when bitstreamInScope may be a multiview bitstream, the view ID of each layer; and 2) when there may be auxiliary information (such as depth or alpha) carried by one or more layers in bitstreamInScope, the auxiliary ID of each layer.

The bitstreamInScope is the sequence of AUs that consists, in decoding order, of the AU containing the current scalability dimension SEI message, followed by zero or more AUs, including all subsequent AUs up to but not including any subsequent AU that contains a scalability dimension SEI message.

sdi_max_layers_minus1 plus 1 indicates the maximum number of layers in bitstreamInScope.

sdi_multiview_info_flag equal to 1 indicates that bitstreamInScope may be a multiview bitstream and the sdi_view_id_val[ ] syntax elements are present in the scalability dimension SEI message. sdi_multiview_flag equal to 0 indicates that bitstreamInScope is not a multiview bitstream and the sdi_view_id_val[ ] syntax elements are not present in the scalability dimension SEI message.

sdi_auxiliary_info_flag equal to 1 indicates that there may be auxiliary information carried by one or more layers in bitstreamInScope and the sdi_aux_id[ ] syntax elements are present in the scalability dimension SEI message. sdi_auxiliary_info_flag equal to 0 indicates that there is no auxiliary information carried by one or more layers in bitstreamInScope and the sdi_aux_id[ ] syntax elements are not present in the scalability dimension SEI message.

sdi_view_id_len specifies the length, in bits, of the sdi_view_id_val[i] syntax element.

sdi_view_id_val[i] specifies the view ID of the i-th layer in bitstreamInScope. The length of the sdi_view_id_val[i] syntax element is sdi_view_id_len bits. When not present, the value of sdi_view_id_val[i] is inferred to be equal to 0.

The variable NumViews is derived as follows:

```
NumViews = 1
if ( sdi_multiview_info_flag ) {
  for ( i = 1; i <= sdi_max_layers_minus1; i++ ) {
    newViewFlag = 1
    for ( j = 0; j < i; j++ )   (X)
      if( sdi_view_id_val[ i ] == sdi_view_id_val[ j ] )
        newViewFlag = 0
    if( newViewFlag )
      NumViews++
```

-continued

```
  }
}
```

sdi_aux_id[i] equal to 0 indicates that the i-th layer in bitstreamInScope does not contain auxiliary pictures. sdi_aux_id[i] greater than 0 indicates the type of auxiliary pictures in the i-th layer in bitstreamInScope as specified in Table 1.

TABLE 1

Mapping of sdi_aux_id[ i ] to the type of auxiliary pictures

| sdi_aux_id[ i ] | Name | Type of auxiliary pictures |
|---|---|---|
| 1 | AUX_ALPHA | Alpha plane |
| 2 | AUX_DEPTH | Depth picture |
| 3 . . . 127 | | Reserved |
| 128 . . . 159 | | Unspecified |
| 160 . . . 255 | | Reserved |

NOTE 1—The interpretation of auxiliary pictures associated with sdi_aux_id in the range of 128 to 159, inclusive, is specified through means other than the sdi_aux_id value.

sdi_aux_id[i] shall be in the range of 0 to 2, inclusive, or 128 to 159, inclusive, for bitstreams conforming to this version of this Specification. Although the value of sdi_aux_id[i] shall be in the range of 0 to 2, inclusive, or 128 to 159, inclusive, in this version of this Specification, decoders shall allow values of sdi_aux_id[i] in the range of 0 to 255, inclusive.

Multiview Acquisition Information SEI Message

Multiview Acquisition Information SEI Message Syntax

| | Descriptor |
|---|---|
| multiview_acquisition_info( payloadSize ) { | |
| **intrinsic_param_flag** | u(1) |
| **extrinsic_param_flag** | u(1) |
| if( intrinsic_param_flag ) { | |
| **intrinsic_params_equal_flag** | u(1) |
| **prec_focal_length** | ue(v) |
| **prec_principal_point** | ue(v) |
| **prec_skew_factor** | ue(v) |
| for( i = 0; i <= intrinsic_params_equal_flag ? 0 : (*nNumViews − Minus1*); i++ ) { | |
| **sign_focal_length_x**[ i ] | u(1) |
| **exponent_focal_length_x**[ i ] | u(6) |
| **mantissa_focal_length_x**[ i ] | u(v) |
| **sign_focal_length_y**[ i ] | u(1) |
| **exponent_focal_length_y**[ i ] | u(6) |
| **mantissa_focal_length_y**[ i ] | u(v) |
| **sign_principal_point_x**[ i ] | u(1) |
| **exponent_principal_point_x**[ i ] | u(6) |
| **mantissa_principal_point_x**[ i ] | u(v) |
| **sign_principal_point_y**[ i ] | u(1) |
| **exponent_principal_point_y**[ i ] | u(6) |
| **mantissa_principal_point_y**[ i ] | u(v) |
| **sign_skew_factor**[ i ] | u(1) |
| **exponent_skew_factor**[ i ] | u(6) |
| **mantissa_skew_factor**[ i ] | u(v) |
| } | |
| } | |
| if( extrinsic_param_flag ) { | |
| **prec_rotation_param** | ue(v) |
| **prec_translation_param** | ue(v) |
| for( i = 0; i <= numViewsMinus1; i++ ) | |
| for( j = 0; j < 3; j++ ) { /* row */ | |
| for( k = 0; k < 3; k++ ) { /* column */ | |
| **sign_r**[ i ][ j ][ k ] | u(1) |
| **exponent_r**[ i ][ j ][ k ] | u(6) |
| **mantissa_r**[ i ][ j ][ k ] | u(v) |
| } | |
| **sign_t**[ i ][ j ] | u(1) |
| **exponent_t**[ i ][ j ] | u(6) |
| **mantissa_t**[ i ][ j ] | u(v) |
| } | |
| } | |
| } | |

Multiview Acquisition Information SEI Message Semantics

The multiview acquisition information (MAI) SEI message specifies various parameters of the acquisition environment. Specifically, intrinsic and extrinsic camera parameters are specified. These parameters could be used for processing the decoded views prior to rendering on a 3D display.

*An MAI SEI message that has payloadType equal to 179 (multiview acquisition) shall not be continued in a scalable nesting SEI message.*

*Let the current AU be the AU containing the current MAI SEI message, and the current CVS be the CVS containingthe current AU.*

*When a CVS does not contain an SDI SEI message, the CVS shall not contain an MAI SEI message.*

*When an AU contains both an SDI SEI message and an MAI SEI message, the SDI SEI message shall precede the MAI SEI message in decoding order.*

The following semantics apply separately to each nuh_layer_id targetLayerId among the nuh_layer_id values to which the multiview acquisition information SEI message applies.

When present, the multiview acquisition information SEI message that applies to the current layer shall be included in an access unit that contains an TRAP picture that is the first picture of a CLVS of the current layer. The information signalled in the SEI message applies to the CLVS.

When the multiview acquisition information SEI message is contained in a scalable nesting SEI message, the syntax elements sn_ols_flag and sn_all_layers_flag in the scalable nesting SEI message shall be equal to 0.

The variable numViewsMinus1 is derived as follows:

If the multiview acquisition information SEI message is not included in a scalable nesting SEI message, numViewsMinus1 is set equal to 0.

Otherwise (the multiview acquisition information SEI message is included in a scalable nesting SEI message), numViewsMinus1 is set equal to sn_num_layers_minus1.

Some of the views for which the multiview acquisition information is included in a multiview acquisition information SEI message may not be present.

In the semantics below, index i refers to the syntax elements and variables that apply to the layer with nuh_layer_id equal to NestingLayerId[i].

The extrinsic camera parameters are specified according to a right-handed coordinate system, where the upper left corner of the image is the origin, i.e., the (0, 0) coordinate, with the other corners of the image having non-negative coordinates. With these specifications, a 3-dimensional world point, wP=[x y z] is mapped to a 2-dimensional camera point, cP[i]=[u v 1], for the i-th camera according to:

$$s*cP[i]=A[i]*R^{-1}[i]*(wP-T[i]) \quad (X)$$

where A[i] denotes the intrinsic camera parameter matrix, $R^{-1}$[i] denotes the inverse of the rotation matrix R[i], T[i] denotes the translation vector and s (a scalar value) is an arbitrary scale factor chosen to make the third coordinate of cP[i] equal to 1. The elements of A[i], R[i] and T[i] are determined according to the syntax elements signalled in this SEI message and as specified below.

intrinsic_param_flag equal to 1 indicates the presence of intrinsic camera parameters. intrinsic_param_flag equal to 0 indicates the absence of intrinsic camera parameters.

extrinsic_param_flag equal to 1 indicates the presence of extrinsic camera parameters. extrinsic_param_flag equal to 0 indicates the absence of extrinsic camera parameters.

intrinsic_params_equal_flag equal to 1 indicates that the intrinsic camera parameters are equal for all cameras and only one set of intrinsic camera parameters are present. intrinsic_params_equal_flag equal to 0 indicates that the intrinsic camera parameters are different for each camera and that a set of intrinsic camera parameters are present for each camera.

prec_focal_length specifies the exponent of the maximum allowable truncation error for focal_length_x[i] and focal_length_y[i] as given by $2^{-prec\_focal\_length}$. The value of prec_focal_length shall be in the range of 0 to 31, inclusive.

prec_principal_point specifies the exponent of the maximum allowable truncation error for principal_point_x[i] and principal_point_y[i] as given by $2^{-prec\_principal\_point}$. The value of prec_principal_point shall be in the range of 0 to 31, inclusive.

prec_skew_factor specifies the exponent of the maximum allowable truncation error for skew factor as given by $2^{-prec\_skew\_factor}$. The value of prec_skew_factor shall be in the range of 0 to 31, inclusive.

sign_focal_length_x[i] equal to 0 indicates that the sign of the focal length of the i-th camera in the horizontal direction is positive. sign_focal_length_x[i] equal to 1 indicates that the sign is negative.

exponent_focal_length_x[i] specifies the exponent part of the focal length of the i-th camera in the horizontal direction. The value of exponent_focal_length_x[i] shall be in the range of 0 to 62, inclusive. The value 63 is reserved for future use by ITU-T|ISO/IEC. Decoders shall treat the value 63 as indicating an unspecified focal length.

mantissa_focal_length_x[i] specifies the mantissa part of the focal length of the i-th camera in the horizontal direction. The length of the mantissa_focal_length_x[i] syntax element is variable and determined as follows:

If exponent_focal_length_x[i] is equal to 0, the length is Max(0, prec_focal_length−30).

Otherwise (exponent_focal_length_x[i] is in the range of 0 to 63, exclusive), the length is Max(0, exponent_focal_length_x[i]+prec_focal_length−31).

sign_focal_length_y[i] equal to 0 indicates that the sign of the focal length of the i-th camera in the vertical direction is positive. sign_focal_length_y[i] equal to 1 indicates that the sign is negative.

exponent_focal_length_y[i] specifies the exponent part of the focal length of the i-th camera in the vertical direction. The value of exponent_focal_length_y[i] shall be in the range of 0 to 62, inclusive. The value 63 is reserved for future use by ITU-T|ISO/IEC. Decoders shall treat the value 63 as indicating an unspecified focal length.

mantissa_focal_length_y[i] specifies the mantissa part of the focal length of the i-th camera in the vertical direction.

The length of the mantissa_focal_length_y[i] syntax element is variable and determined as follows:

If exponent_focal_length_y[i] is equal to 0, the length is Max(0, prec_focal_length−30).

Otherwise (exponent_focal_length_y[i] is in the range of 0 to 63, exclusive), the length is Max(0, exponent_focal_length_y[i]+prec_focal_length−31).

sign_principal_point_x[i] equal to 0 indicates that the sign of the principal point of the i-th camera in the horizontal direction is positive. sign_principal_point_x[i] equal to 1 indicates that the sign is negative.

exponent_principal_point_x[i] specifies the exponent part of the principal point of the i-th camera in the horizontal direction. The value of exponent_principal_point_x[i] shall be in the range of 0 to 62, inclusive. The value 63 is reserved for future use by ITU-T|ISO/IEC. Decoders shall treat the value 63 as indicating an unspecified principal point.

mantissa_principal_point_x[i] specifies the mantissa part of the principal point of the i-th camera in the horizontal direction. The length of the mantissa_principal_point_x[i] syntax element in units of bits is variable and is determined as follows:

If exponent_principal_point_x[i] is equal to 0, the length is Max(0, prec_principal_point−30).

Otherwise (exponent_principal_point_x[i] is in the range of 0 to 63, exclusive), the length is Max(0, exponent_principal_point_x[i]+prec_principal_point−31).

sign_principal_point_y[i] equal to 0 indicates that the sign of the principal point of the i-th camera in the vertical direction is positive. sign_principal_point_y[i] equal to 1 indicates that the sign is negative.

exponent_principal_point_y[i] specifies the exponent part of the principal point of the i-th camera in the vertical direction. The value of exponent_principal_point_y[i] shall be in the range of 0 to 62, inclusive. The value 63 is reserved for future use by ITU-T|ISO/IEC. Decoders shall treat the value 63 as indicating an unspecified principal point.

mantissa_principal_point_y[i] specifies the mantissa part of the principal point of the i-th camera in the vertical direction. The length of the mantissa_principal_point_y[i] syntax element in units of bits is variable and is determined as follows:

If exponent_principal_point_y[i] is equal to 0, the length is Max(0, prec_principal_point−30).

Otherwise (exponent_principal_point_y[i] is in the range of 0 to 63, exclusive), the length is Max(0, exponent_principal_point_y[i]+prec_principal_point−31).

sign_skew_factor[i] equal to 0 indicates that the sign of the skew factor of the i-th camera is positive.

sign_skew_factor[i] equal to 1 indicates that the sign is negative.

exponent_skew_factor[i] specifies the exponent part of the skew factor of the i-th camera. The value of exponent_skew_factor[i] shall be in the range of 0 to 62, inclusive. The value 63 is reserved for future use by ITU-T|ISO/IEC. Decoders shall treat the value 63 as indicating an unspecified skew factor.

mantissa_skew_factor[i] specifies the mantissa part of the skew factor of the i-th camera. The length of the mantissa_skew_factor[i] syntax element is variable and determined as follows:

If exponent_skew_factor[i] is equal to 0, the length is Max(0, prec_skew_factor−30).

Otherwise (exponent_skew_factor[i] is in the range of 0 to 63, exclusive), the length is Max(0, exponent_skew_factor[i]+prec_skew_factor−31).

The intrinsic matrix A[i] for i-th camera is represented by:

$$\begin{bmatrix} \text{focal Length } X[i] & \text{skew Factor}[i] & \text{principal Point } X[i] \\ 0 & \text{focal Length } Y[i] & \text{principal Point } Y[i] \\ 0 & 0 & 1 \end{bmatrix} \quad (X)$$

prec_rotation_param specifies the exponent of the maximum allowable truncation error for r[i][j][k] as given by $2^{-prec\_rotation\_param}$. The value of prec_rotation_param shall be in the range of 0 to 31, inclusive.

prec_translation_param specifies the exponent of the maximum allowable truncation error for t[i][j] as given by $2^{-prec\_translation\_param}$. The value of prec_translation_param shall be in the range of 0 to 31, inclusive.

sign_r[i][j][k] equal to 0 indicates that the sign of (j, k) component of the rotation matrix for the i-th camera is positive. sign_r[i][j][k] equal to 1 indicates that the sign is negative.

exponent_r[i][j][k] specifies the exponent part of (j, k) component of the rotation matrix for the i-th camera. The value of exponent_r[i][j][k] shall be in the range of 0 to 62, inclusive. The value 63 is reserved for future use by ITU-T|ISO/IEC. Decoders shall treat the value 63 as indicating an unspecified rotation matrix.

mantissa_r[i][j][k] specifies the mantissa part of (j, k) component of the rotation matrix for the i-th camera. The length of the mantissa_r[i][j][k] syntax element in units of bits is variable and determined as follows:

If exponent_r[i] is equal to 0, the length is Max(0, prec_rotation_param−30).

Otherwise (exponent_r[i] is in the range of 0 to 63, exclusive), the length is Max(0, exponent_r[i]+prec_rotation_param−31).

The rotation matrix R[i] for i-th camera is represented as follows:

$$\begin{bmatrix} rE[i][0][0] & rE[i][0][1] & rE[i][0][2] \\ rE[i][1][0] & rE[i][1][1] & rE[i][1][2] \\ rE[i][2][0] & rE[i][2][1] & rE[i][2][2] \end{bmatrix} \quad (X)$$

sign_t[i][j] equal to 0 indicates that the sign of the j-th component of the translation vector for the i-th camera is positive. sign_t[i][j] equal to 1 indicates that the sign is negative.

exponent_t[i][j] specifies the exponent part of the j-th component of the translation vector for the i-th camera. The value of exponent_t[i][j] shall be in the range of 0 to 62, inclusive. The value 63 is reserved for future use by ITU-T|ISO/IEC. Decoders shall treat the value 63 as indicating an unspecified translation vector.

mantissa_t[i][ j] specifies the mantissa part of the j-th component of the translation vector for the i-th camera. The length v of the mantissa_t[i][j] syntax element in units of bits is variable and is determined as follows:

If exponent_t[i] is equal to 0, the length v is set equal to Max(0, prec_translation_param−30).

Otherwise (0<exponent_t[i]<63), the length v is set equal to Max(0, exponent_t[i]+prec_translation_param−31).

The translation vector T[i] for the i-th camera is represented by:

$$\begin{bmatrix} tE[i][0] \\ tE[i][1] \\ tE[i][2] \end{bmatrix} \quad (X)$$

The association between the camera parameter variables and corresponding syntax elements is specified by Table ZZ. Each component of the intrinsic and rotation matrices and the translation vector is obtained from the variables specified in Table ZZ as the variable x computed as follows:

If e is in the range of 0 to 63, exclusive, x is set equal to $(-1)^s*2^{e-31}*(1+n\div 2^v)$.

Otherwise (e is equal to 0), x is set equal to $(-1)^s*2^{-(30+v)}*n$.

NOTE—The above specification is similar to that found in IEC 60559:1989.

TABLE ZZ

Association between camera parameter variables and syntax elements.

| x | s | e | n |
|---|---|---|---|
| **focalLengthX**[ i ] | sign_focal_length_x[ i ] | exponent_focal_length_x[ i ] | mantissa_focal_length_x[ i ] |
| **focalLengthY**[ i ] | sign_focal_length_y[ i ] | exponent_focal_length_y[ i ] | mantissa_focal_length_y[ i ] |
| **principalPointX**[ i ] | sign_principal_point_x[ i ] | exponent_principal_point_x[ i ] | mantissa_principal_point_x[ i ] |
| **principalPointY**[ i ] | sign_principal_point_y[ i ] | exponent_principal_point_y[ i ] | mantissa_principal_point_y[ i ] |
| **skewFactor**[ i ] | sign_skew_factor[ i ] | exponent_skew_factor[ i ] | mantissa_skew_factor[ i ] |
| **rE**[ i ][ j ][ k ] | sign_r[ i ][ j ][ k ] | exponent_r[ i ][ j ][ k ] | mantissa_r[ i ][ j ][ k ] |
| **tE**[ i ][ j ] | sign_t[ i ][ j ] | exponent_t[ i ][ j ] | mantissa_t[ i ][ j ] |

Figure 4:
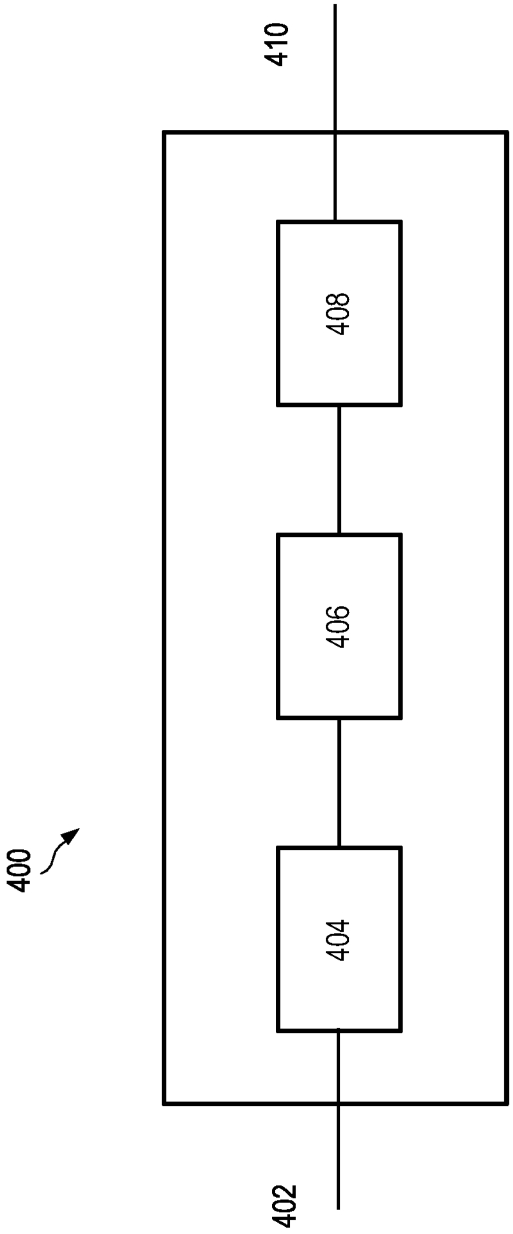
FIG. 4 is a block diagram showing an example video processing system.

FIG. 4 is a block diagram showing an example video processing system 400 in which various techniques disclosed herein may be implemented. Various implementations may include some or all of the components of the video processing system 400. The video processing system 400 may include input 402 for receiving video content. The video content may be received in a raw or uncompressed format, e.g., 8 or 10 bit multi-component pixel values, or may be in a compressed or encoded format. The input 402 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 400 may include a coding component 404 that may implement the various coding or encoding methods described in the present document. The coding component 404 may reduce the average bitrate of video from the input 402 to the output of the coding component 404 to produce a coded representation of the video. The coding techniques are therefore sometimes called video compression or video transcoding techniques. The output of the coding component 404 may be either stored, or transmitted via a communication connected, as represented by the component 406. The stored or communicated bitstream (or coded) representation of the video received at the input 402 may be used by the component 408 for generating pixel values or displayable video that is sent to a display interface 410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 5:
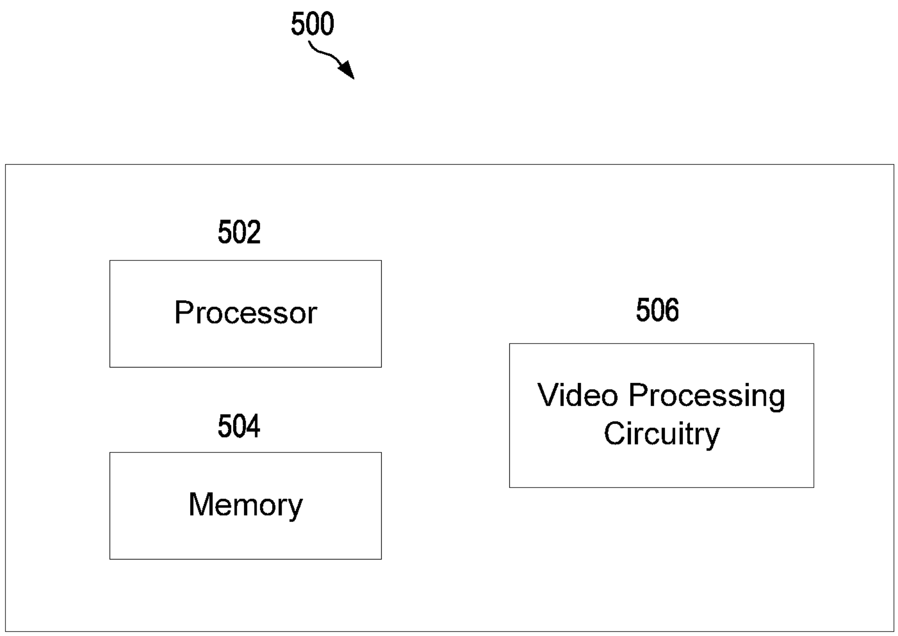
FIG. 5 is a block diagram of a video processing apparatus.

FIG. 5 is a block diagram of a video processing apparatus 500. The apparatus 500 may be used to implement one or more of the methods described herein. The apparatus 500 may be embodied in a smartphone, tablet, computer, Internet of Things (IoT) receiver, and so on. The apparatus 500 may include one or more processors 502, one or more memories 504 and video processing hardware 506 (a.k.a., video processing circuitry). The processor(s) 502 may be configured to implement one or more methods described in the present document. The memory (memories) 504 may be used for storing data and code used for implementing the methods and techniques described herein. The video processing hardware 506 may be used to implement, in hardware circuitry, some techniques described in the present document. In some embodiments, the hardware 506 may be partly or completely located within the processor 502, e.g., a graphics processor.

Figure 6:
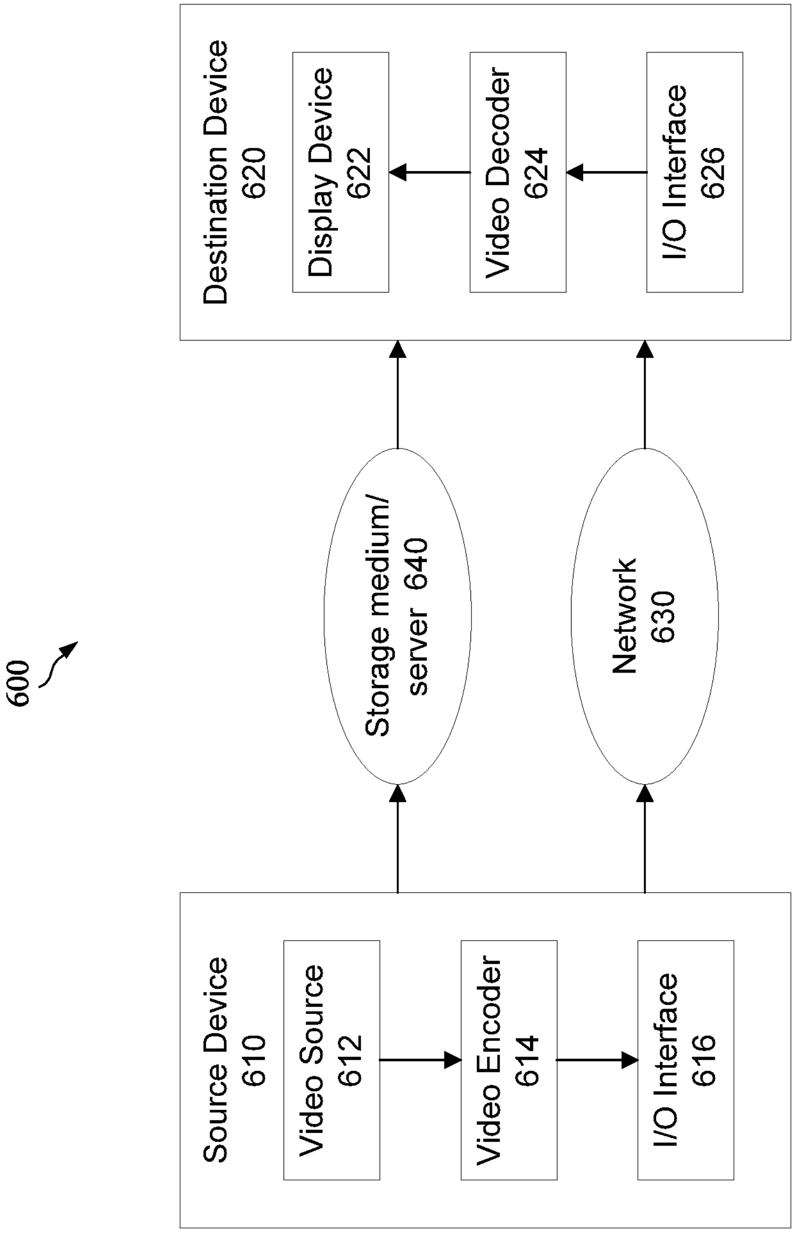
FIG. 6 is a block diagram that illustrates an example video coding system.

FIG. 6 is a block diagram that illustrates an example video coding system 600 that may utilize the techniques of this disclosure. As shown in FIG. 6, the video coding system 600 may include a source device 610 and a destination device 620. Source device 610 generates encoded video data which may be referred to as a video encoding device. Destination device 620 may decode the encoded video data generated by source device 610 which may be referred to as a video decoding device.

Source device 610 may include a video source 612, a video encoder 614, and an input/output (I/O) interface 616.

Video source 612 may include a source such as a video capture device, an interface to receive video data from a video content provider, and/or a computer graphics system for generating video data, or a combination of such sources. The video data may comprise one or more pictures. Video encoder 614 encodes the video data from video source 612 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 616 may include a modulator/demodulator (modem) and/or a transmitter. The encoded video data may be transmitted directly to destination device 620 via I/O interface 616 through network 630. The encoded video data may also be stored onto a storage medium/server 640 for access by destination device 620.

Destination device 620 may include an I/O interface 626, a video decoder 624, and a display device 622.

I/O interface 626 may include a receiver and/or a modem. I/O interface 626 may acquire encoded video data from the source device 610 or the storage medium/server 640. Video decoder 624 may decode the encoded video data. Display device 622 may display the decoded video data to a user. Display device 622 may be integrated with the destination device 620, or may be external to destination device 620 which may be configured to interface with an external display device.

Video encoder 614 and video decoder 624 may operate according to a video compression standard, such as the High Efficiency Video Coding (HEVC) standard, Versatile Video Coding (VVC) standard, and other current and/or further standards.

Figure 7:
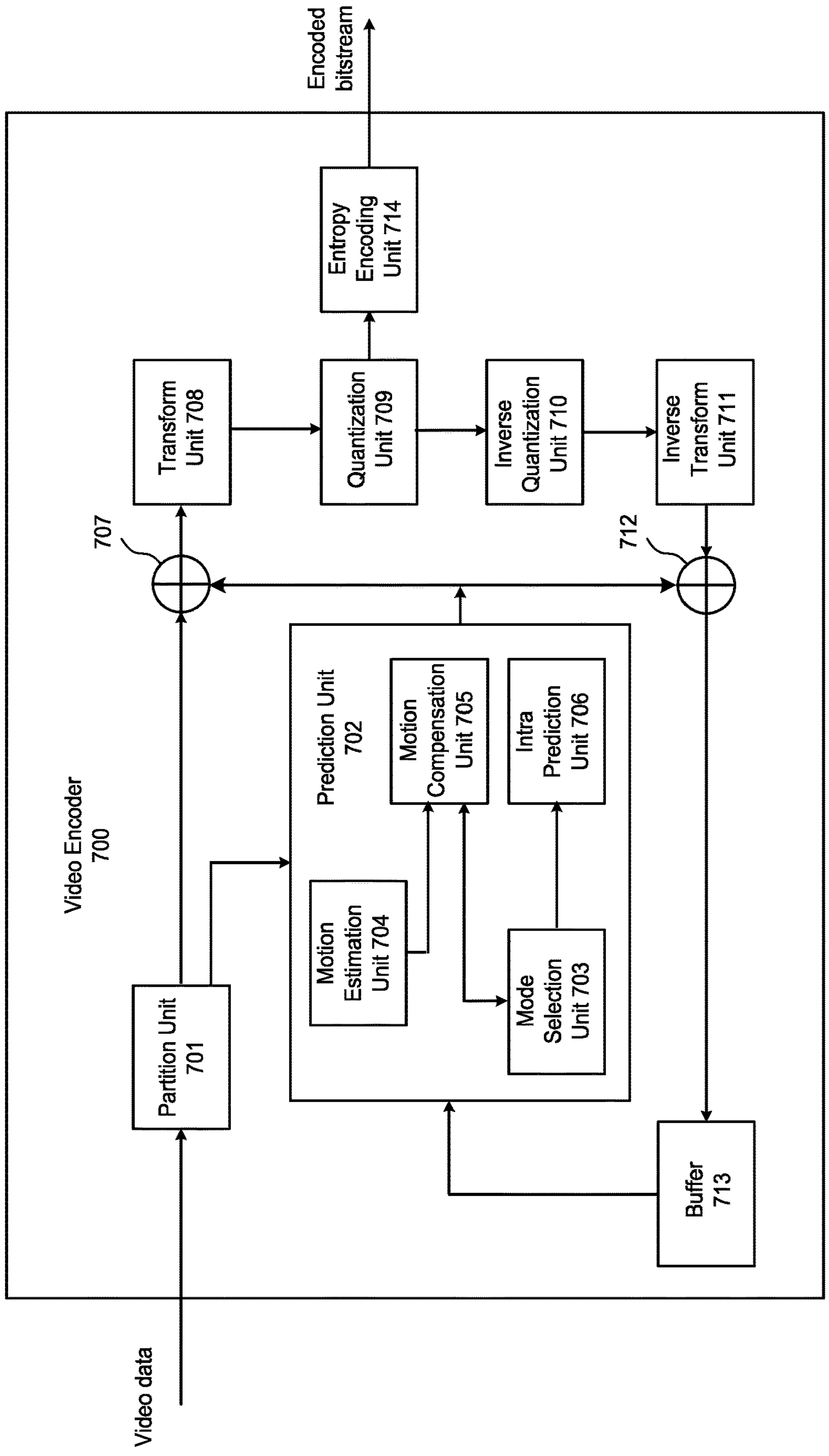
FIG. 7 is a block diagram illustrating an example of video encoder.

FIG. 7 is a block diagram illustrating an example of video encoder 700, which may be video encoder 614 in the video coding system 600 illustrated in FIG. 6.

Video encoder 700 may be configured to perform any or all of the techniques of this disclosure. In the example of FIG. 7, video encoder 700 includes a plurality of functional components. The techniques described in this disclosure may be shared among the various components of video encoder 700. In some examples, a processor may be configured to perform any or all of the techniques described in this disclosure.

The functional components of video encoder 700 may include a partition unit 701, a prediction unit 702 which may include a mode selection unit 703, a motion estimation unit 704, a motion compensation unit 705 and an intra prediction unit 706, a residual generation unit 707, a transform unit 708, a quantization unit 709, an inverse quantization unit 710, an inverse transform unit 711, a reconstruction unit 712, a buffer 713, and an entropy encoding unit 714.

In other examples, video encoder 700 may include more, fewer, or different functional components. In an example, prediction unit 702 may include an intra block copy (IBC) unit. The IBC unit may perform prediction in an IBC mode in which at least one reference picture is a picture where the current video block is located.

Furthermore, some components, such as motion estimation unit 704 and motion compensation unit 705 may be highly integrated, but are represented in the example of FIG. 7 separately for purposes of explanation.

Partition unit 701 may partition a picture into one or more video blocks. Video encoder 614 and video decoder 624 of FIG. 6 may support various video block sizes.

Mode selection unit 703 may select one of the coding modes, intra or inter, e.g., based on error results, and provide the resulting intra- or inter-coded block to a residual generation unit 707 to generate residual block data and to a reconstruction unit 712 to reconstruct the encoded block for use as a reference picture. In some examples, mode selection unit 703 may select a combination of intra and inter prediction (CLIP) mode in which the prediction is based on an inter prediction signal and an intra prediction signal. Mode selection unit 703 may also select a resolution for a motion vector (e.g., a sub-pixel or integer pixel precision) for the block in the case of inter-prediction.

To perform inter prediction on a current video block, motion estimation unit 704 may generate motion information for the current video block by comparing one or more reference frames from buffer 713 to the current video block. Motion compensation unit 705 may determine a predicted video block for the current video block based on the motion information and decoded samples of pictures from buffer 713 other than the picture associated with the current video block.

Motion estimation unit 704 and motion compensation unit 705 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 704 may perform uni-directional prediction for the current video block, and motion estimation unit 704 may search reference pictures of list 0 or list 1 for a reference video block for the current video block. Motion estimation unit 704 may then generate a reference index that indicates the reference picture in list 0 or list 1 that contains the reference video block and a motion vector that indicates a spatial displacement between the current video block and the reference video block. Motion estimation unit 704 may output the reference index, a prediction direction indicator, and the motion vector as the motion information of the current video block. Motion compensation unit 705 may generate the predicted video block of the current block based on the reference video block indicated by the motion information of the current video block.

In other examples, motion estimation unit 704 may perform bi-directional prediction for the current video block, motion estimation unit 704 may search the reference pictures in list 0 for a reference video block for the current video block and may also search the reference pictures in list 1 for another reference video block for the current video block. Motion estimation unit 704 may then generate reference indexes that indicate the reference pictures in list 0 and list 1 containing the reference video blocks and motion vectors that indicate spatial displacements between the reference video blocks and the current video block. Motion estimation unit 704 may output the reference indexes and the motion vectors of the current video block as the motion information of the current video block. Motion compensation unit 705 may generate the predicted video block of the current video block based on the reference video blocks indicated by the motion information of the current video block.

In some examples, motion estimation unit 704 may output a full set of motion information for decoding processing of a decoder.

In some examples, motion estimation unit 704 may not output a full set of motion information for the current video. Rather, motion estimation unit 704 may signal the motion information of the current video block with reference to the motion information of another video block. For example, motion estimation unit 704 may determine that the motion information of the current video block is sufficiently similar to the motion information of a neighboring video block.

In one example, motion estimation unit 704 may indicate, in a syntax structure associated with the current video block, a value that indicates to the video decoder 624 that the current video block has the same motion information as another video block.

In another example, motion estimation unit 704 may identify, in a syntax structure associated with the current video block, another video block and a motion vector difference (MVD). The motion vector difference indicates a difference between the motion vector of the current video block and the motion vector of the indicated video block. The video decoder 624 may use the motion vector of the indicated video block and the motion vector difference to determine the motion vector of the current video block.

As discussed above, video encoder 614 may predictively signal the motion vector. Two examples of predictive signaling techniques that may be implemented by video encoder 614 include advanced motion vector prediction (AMVP) and merge mode signaling.

Intra prediction unit 706 may perform intra prediction on the current video block. When intra prediction unit 706 performs intra prediction on the current video block, intra prediction unit 706 may generate prediction data for the current video block based on decoded samples of other video blocks in the same picture. The prediction data for the current video block may include a predicted video block and various syntax elements.

Residual generation unit 707 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 707 may not perform the subtracting operation.

Transform unit 708 may generate one or more transform coefficient video blocks for the current video block by applying one or more transforms to a residual video block associated with the current video block.

After transform unit 708 generates a transform coefficient video block associated with the current video block, quantization unit 709 may quantize the transform coefficient video block associated with the current video block based on one or more quantization parameter (QP) values associated with the current video block.

Inverse quantization unit 710 and inverse transform unit 711 may apply inverse quantization and inverse transforms to the transform coefficient video block, respectively, to reconstruct a residual video block from the transform coefficient video block. Reconstruction unit 712 may add the reconstructed residual video block to corresponding samples from one or more predicted video blocks generated by the prediction unit 702 to produce a reconstructed video block associated with the current block for storage in the buffer 713.

After reconstruction unit 712 reconstructs the video block, loop filtering operation may be performed to reduce video blocking artifacts in the video block.

Entropy encoding unit 714 may receive data from other functional components of the video encoder 700. When entropy encoding unit 714 receives the data, entropy encoding unit 714 may perform one or more entropy encoding operations to generate entropy encoded data and output a bitstream that includes the entropy encoded data.

Figure 8:
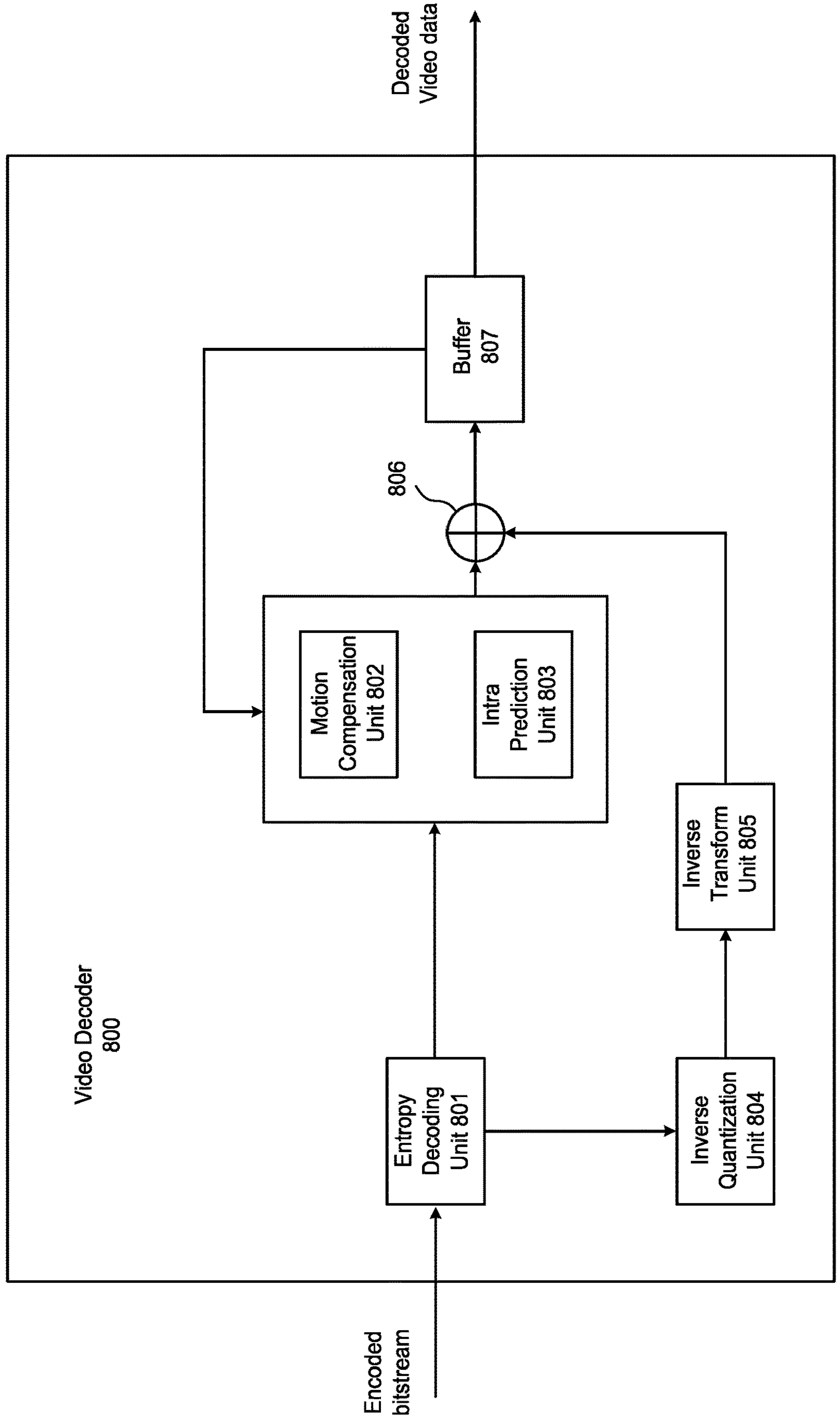
FIG. 8 is a block diagram illustrating an example of video decoder.

FIG. 8 is a block diagram illustrating an example of video decoder 800, which may be video decoder 624 in the video coding system 600 illustrated in FIG. 6.

The video decoder 800 may be configured to perform any or all of the techniques of this disclosure. In the example of FIG. 8, the video decoder 800 includes a plurality of functional components. The techniques described in this disclosure may be shared among the various components of the video decoder 800. In some examples, a processor may be configured to perform any or all of the techniques described in this disclosure.

In the example of FIG. 8, video decoder 800 includes an entropy decoding unit 801, a motion compensation unit 802, an intra prediction unit 803, an inverse quantization unit 804, an inverse transformation unit 805, a reconstruction unit 806, and a buffer 807. Video decoder 800 may, in some examples, perform a decoding pass generally reciprocal to the encoding pass described with respect to video encoder 614 (FIG. 6).

Entropy decoding unit 801 may retrieve an encoded bitstream. The encoded bitstream may include entropy coded video data (e.g., encoded blocks of video data). Entropy decoding unit 801 may decode the entropy coded video data, and from the entropy decoded video data, motion compensation unit 802 may determine motion information including motion vectors, motion vector precision, reference picture list indexes, and other motion information. Motion compensation unit 802 may, for example, determine such information by performing the AMVP and merge mode signaling.

Motion compensation unit 802 may produce motion compensated blocks, possibly performing interpolation based on interpolation filters. Identifiers for interpolation filters to be used with sub-pixel precision may be included in the syntax elements.

Motion compensation unit 802 may use interpolation filters as used by video encoder 614 during encoding of the video block to calculate interpolated values for sub-integer pixels of a reference block. Motion compensation unit 802 may determine the interpolation filters used by video encoder 614 according to received syntax information and use the interpolation filters to produce predictive blocks.

Motion compensation unit 802 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 803 may use intra prediction modes for example received in the bitstream to form a prediction block from spatially adjacent blocks. Inverse quantization unit 804 inverse quantizes, i.e., de-quantizes, the quantized video block coefficients provided in the bitstream and decoded by entropy decoding unit 801. Inverse transform unit 805 applies an inverse transform.

Reconstruction unit 806 may sum the residual blocks with the corresponding prediction blocks generated by motion compensation unit 802 or intra prediction unit 803 to form decoded blocks. If desired, a deblocking filter may also be applied to filter the decoded blocks in order to remove blockiness artifacts. The decoded video blocks are then stored in buffer 807, which provides reference blocks for subsequent motion compensation/intra prediction and also produces decoded video for presentation on a display device.

Figure 9:
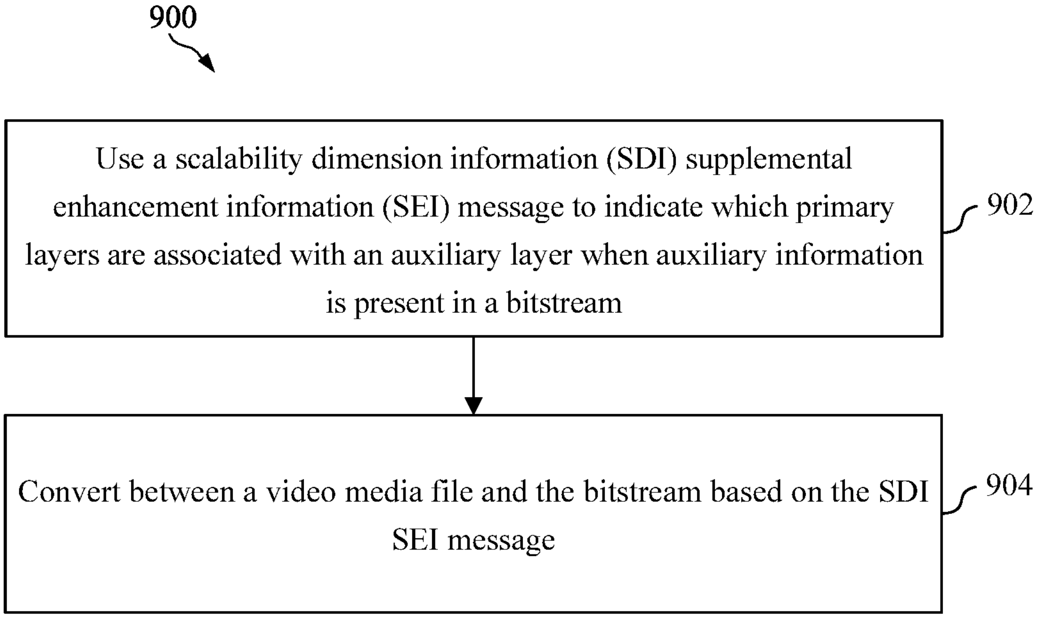
FIG. 9 is a method for coding video data according to an embodiment of the disclosure.

FIG. 9 is a method 900 for coding video data according to an embodiment of the disclosure. The method 900 may be performed by a coding apparatus (e.g., an encoder) having a processor and a memory. The method 900 may be implemented when determining which primary layers are associated with an auxiliary layer when auxiliary information is present in a bitstream.

In block 902, the coding apparatus uses a scalability dimension information (SDI) supplemental enhancement information (SEI) message to indicate which primary layers are associated with an auxiliary layer when auxiliary information is present in a bitstream. In an embodiment, a primary layer is associated with an auxiliary layer when the primary layer maps to, uses information from, or relates to the auxiliary layer.

The SDI SEI message is a type of SEI message like, for example, the SEI message in the bitstream 300 of FIG. 3. The SEI message, including the SDI SEI message, may carry any of the elements of syntax disclosed herein.

If sdi_aux_id[i] is equal to 0, the i-th layer is referred to as a primary layer. Otherwise, the i-th layer is referred to as an auxiliary layer. When sdi_aux_id[i] is equal to 1, the i-th layer is also referred to as an alpha auxiliary layer. When sdi_aux_id[i] is equal to 2, the i-th layer is also referred to as a depth auxiliary layer.

In block 904, the coding apparatus converts between a video media file and the bitstream based on the SDI SEI message.

When implemented in an encoder, converting includes receiving a media file (e.g., a video unit) and encoding an SEI message into a bitstream. When implemented in a decoder, converting includes receiving the bitstream including the SEI message, and decoding the SEI message in the bitstream to generate the video media file.

In an embodiment, one or more syntax elements in the SDI SEI message indicate which primary layers are associated with the auxiliary layer when the auxiliary information is present in the bitstream.

In an embodiment, the auxiliary layer has a layer identifier (ID) designated sdi_aux_id[i], where i is an integer (e.g., 1, 2, 3, etc.) corresponding to the auxiliary layer.

In an embodiment, layer indices are included in the SDI SEI message to indicate which primary layers are associated with the auxiliary layer when the auxiliary information is present in the bitstream. In an embodiment, each layer index includes an entry or value that correlates a primary layer to an auxiliary layer.

In an embodiment, one or more syntax elements for the primary layers indicate whether the auxiliary layer is applied to one or more of the primary layers.

In an embodiment, a syntax element indicates whether the auxiliary layer is applied to a specific primary layer from the primary layers. In an embodiment, a syntax element indicates whether the auxiliary layer is applied to one or more of the primary layers. In an embodiment, an auxiliary layer is applied to a primary layer when, for example, the primary layer uses or benefits from information carried in the auxiliary layer.

In an embodiment, the auxiliary layer is one of a plurality of auxiliary layers in the bitstream, and wherein one or a group of syntax elements are included in the SDI SEI message to indicate which primary layers are associated with each auxiliary layer in the plurality of auxiliary layers when the auxiliary information is present in the bitstream.

In an embodiment, an indication of a number of the primary layers associated with auxiliary pictures of the auxiliary layer is signaled in the bitstream.

In an embodiment, the indication of the number of the primary layers is designated sdi_num_associated_primary_layers_minus1.

In an embodiment, the sdi_num_associated_primary_layers_minus1 is signaled with an unsigned integer of six bits. By way of example, an unsigned integer is an integer (e.g., a whole number) that does not have a sign (e.g., positive or negative) associated therewith.

In an embodiment, an indication of a number of the primary layers associated the auxiliary layer or associated with auxiliary pictures of the auxiliary layer is conditionally signaled in the bitstream. In an embodiment, conditioning signaling refers to signaling certain information only when a condition has been met.

In an embodiment, the bitstream comprises a bitstream in scope, and wherein the conditional signaling comprises signaling the indication of the number of primary layers only when an i-th layer in the bitstream in scope contains the auxiliary pictures.

In an embodiment, the i-th layer in the bitstream in scope contains the auxiliary pictures when a layer identifier (ID) designated sdi_aux_id[i] is greater than zero.

In an embodiment, the bitstream comprises a bitstream in scope, and wherein the bitstream in scope is a sequence of access units (AUs) that consists, in decoding order, of an initial AU containing the SDI SEI message followed by zero or more subsequent AUs up to, but not including, any subsequent AU that contains another SDI SEI message.

In an embodiment, the SDI SEI message includes an auxiliary identifier (ID) of each layer when the auxiliary information is present in the bitstream or when the bitstream comprises a bitstream in scope and the bitstream in scope is a multiview bitstream. In an embodiment, the multilayer bitstream is a bitstream that includes a plurality of layers, as for example shown in FIG. 1.

In an embodiment, an i-th layer is referred to as a primary layer when a layer identifier (ID) designated sdi_aux_id[i] is equal to zero, otherwise the i-th layer is referred to as the auxiliary layer.

In an embodiment, an i-th layer is referred to as an alpha auxiliary layer when a layer identifier (ID) designated sdi_aux_id[i] is equal to one, and wherein the i-th layer is referred to as a depth auxiliary layer when the layer ID designated sdi_aux_id[i] is equal to two.

In an embodiment, the method 900 may utilize or incorporate one or more of the features or processes of the other methods disclosed herein.

A listing of solutions preferred by some embodiments is provided next.

The following solutions show example embodiments of techniques discussed in the present disclosure (e.g., Example 1).

1. A method of video processing, comprising: performing a conversion between a video and a bitstream of the video; wherein the bitstream conforms to a format rule; wherein the format rule specifies that a syntax element indicates a length of view identifier syntax elements minus L, where L is an integer.

2. The method of solution 1, wherein the syntax element is coded as an unsigned integer using N bits.

3. The method of any of solutions 1-2, wherein L is a positive integer.

4. The method of solution 1, wherein L=0, and wherein the syntax element is disallowed to have a zero value.

5. A method of video processing, comprising: performing a conversion between a video comprising multiple layers and a bitstream of the video, wherein the bitstream conforms to a format rule, wherein the format rule specifies that the bitstream includes an auxiliary layer that is associated with one or more associated layers of the video.

6. The method of solution 5, wherein the format rule further specifies whether or how the bitstream includes one or more syntax elements indicative of a relationship between the auxiliary layer and the one or more associated layers, wherein the one or more syntax elements are included in a scalability dimension supplemental enhancement information syntax structure.

7. The method of solution 6, wherein the format rule specifies that the one or more associated layers are indicated by corresponding layer identifiers (IDs).

8. The method of solution 6, wherein the format rule specifies that the one or more associated layers are indicated by corresponding layer indices.

9. The method of any of solutions 5-8, wherein the format rule specifies that the bitstream includes one or more syntax elements indicating whether the auxiliary layer is applicable to the one or more associated layers.

10. The method of solution 9, wherein the one or more syntax elements comprise a syntax element indicating that the auxiliary layer is applicable to all of the one or more associated layers.

11. The method of solution 9, wherein the format rule specifies that a syntax element is included for each associated layer indicating whether the auxiliary layer is applicable to a corresponding associated layer.

12. The method of solution 11, wherein the syntax element indicates all primary layers associated with the auxiliary layer.

13. The method of solution 11, wherein the syntax element indicates all primary layers associated with the auxiliary layer and having a layer index smaller than that of the auxiliary layer.

14. The method of solution 11, wherein the syntax element indicates all primary layers associated with the auxiliary layer and having a layer index greater than that of the auxiliary layer.

15. The method of any of solutions 11-14, wherein the syntax element is a flag.

16. The method of solution 6, wherein the format rule specifies that the bitstream does not include an explicit syntax element indicating applicability of the auxiliary layer to the one or more associated layers and the applicability is derived during the conversion.

17. The method of solution 16, wherein the format rule specifies that the associated layers for the auxiliary layers have a layer ID that is equal to a layer ID of the auxiliary layer plus N1, N2 . . . Nk, where k is an integer and no two Ni are equal to each other for i=1, k.

18. The method of solution 17, wherein k=1 and N1 is one of 1, −1, 2 or −2.

19. The method of solution 17, wherein k is greater than 1.

20. The method of solution 19, wherein k is equal to 2 and N1=1, N2=2.

21. The method of solution 5, wherein the format rule further specifies that the bitstream omits one or more syntax elements indicative of a relationship between the auxiliary layer and the one or more associated layers, and wherein the relationship is derived based on pre-determined rules.

22. The method of solution 5, wherein the format rule further specifies that the bitstream includes one or more syntax elements indicative of a relationship between the auxiliary layer and the one or more associated layers, wherein the one or more syntax elements are included in an auxiliary information supplemental enhancement information syntax structure.

23. The method of any of solutions 5-22, wherein the format rule specifies that a syntax element is included in the bitstream indicative of a number of associated layers of auxiliary pictures of a layer.

24. The method of any of solutions 5-22, wherein the format rule specifies that a syntax element is included in the bitstream indicative of a number of associated layers of auxiliary pictures of a layer or associated layers of auxiliary pictures in case that a condition is met.

25. The method of solution 24, wherein the condition comprises that an i-th layer in the bitstreamInScope includes auxiliary pictures.

26. A method of video processing, comprising: performing a conversion between a video comprising multiple video layers and a bitstream of the video, wherein the bitstream conforms to a format rule, wherein the format rule specifies that a coded video sequence of the bitstream included a multiview supplemental enhancement information (SEI) message or an auxiliary information SEI message responsive to whether a scalability dimension information SEI message is included in a coded video sequence.

27. The method of solution 26, wherein the format rule specifies that the multiview information SEI message refers to a multiview acquisition information SEI message.

28. The method of any of solutions 26-27, wherein the format rule specifies that the auxiliary information SEI message refers to a depth representation information SEI message or an alpha channel information SEI message.

29. A method of video processing, comprising: performing a conversion between a video comprising multiple video layers and a bitstream of the video, wherein the bitstream conforms to a format rule, wherein the format rule specifies that responsive to a multiview or an auxiliary information supplemental enhancement information (SEI) message being present in the bitstream, at least one of a first flag indicating a presence of multiview information or a second flag indicating presence of auxiliary information in a scalability dimension information SEI message is equal to 1.

30. A method of video processing, comprising: performing a conversion between a video comprising multiple video layers and a bitstream of the video, wherein the bitstream conforms to a format rule, wherein the format rule specifies that a multiview acquisition information supplemental enhancement information message included in the bitstream is not scalable nested or included in a scalable nesting supplemental enhancement information message.

31. The method of any of solutions 1-30, wherein the conversion comprises generating the video from the bitstream or generating the bitstream from the video.

32. A method of storing a bitstream on a computer-readable medium, comprising generating a bitstream according to a method recited in any one or more of solutions 1-31 and storing the bitstream on the computer-readable medium.

33. A computer-readable medium having a bitstream of a video stored thereon, the bitstream, when processed by a processor of a video decoder, causing the video decoder to generate the video, wherein the bitstream is generated according to a method recited in one or more of solutions 1-31.

34. A video decoding apparatus comprising a processor configured to implement a method recited in one or more of solutions 1 to 31.

35. A video encoding apparatus comprising a processor configured to implement a method recited in one or more of solutions 1 to 31.

36. A computer program product having computer code stored thereon, the code, when executed by a processor, causes the processor to implement a method recited in any of solutions 1 to 31.

37. A computer readable medium on which a bitstream complying to a bitstream format that is generated according to any of solutions 1 to 31.

38. A method, an apparatus, a bitstream generated according to a disclosed method or a system described in the present document.

The following documents may include additional details related to the techniques disclosed herein:

[1] ITU-T and ISO/IEC, "High efficiency video coding", Rec. ITU-T H.265 I ISO/IEC 23008-2 (in force edition).

[2] J. Chen, E. Alshina, G. J. Sullivan, J.-R. Ohm, J. Boyce, "Algorithm description of Joint Exploration Test Model 7 (JEM7)," JVET-G1001, August 2017.

[3] Rec. ITU-T H.266|ISO/IEC 23090-3, "Versatile Video Coding", 2020.

[4] B. Bross, J. Chen, S. Liu, Y.-K. Wang (editors), "Versatile Video Coding (Draft 10)," JVET-52001.

[5] Rec. ITU-T Rec. H.274|ISO/IEC 23002-7, "Versatile Supplemental Enhancement Information Messages for Coded Video Bitstreams", 2020.

[6] J. Boyce, V. Drugeon, G. Sullivan, Y.-K. Wang (editors), "Versatile supplemental enhancement information messages for coded video bitstreams (Draft 5)," JVET-S2007.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact ?disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, for a conversion between a video and a bitstream of the video, that a current auxiliary layer is applied to at least one associated primary layer; and performing the conversion based on the determining, wherein the at least one associated primary layer has a first syntax element equal to a first value, and the current auxiliary layer has the first syntax element greater than the first value, wherein the first syntax element is included in a scalability dimension information (SDI) supplemental enhancement information (SEI) message, and wherein at least one syntax element indicating at least one associated primary layer of each auxiliary layer is included in the SDI SEI message.

2. The method of claim 1, wherein a second syntax element of the at least one syntax element indicating the at least one associated primary layer of each auxiliary layer is explicitly signalled as one or a group of syntax elements in the SDI SEI message.

3. The method of claim 2, wherein the second syntax element in the SDI SEI message indicates a layer index of the at least one associated primary layer of each auxiliary layer.

4. The method of claim 1, wherein a third syntax element of the at least one syntax element indicates a number of the at least one associated primary layer of each auxiliary layer.

5. The method of claim 4, wherein the third syntax element is conditionally included in the bitstream, and in response to the value of the first syntax element being greater than zero, the third syntax element is included in the bitstream.

6. The method of claim 2, wherein the second syntax element is coded as an unsigned integer using N bits, and N is an integer.

7. The method of claim 6, wherein N=6.

8. The method of claim 4, wherein the third syntax element is coded as an unsigned integer using M bits, and M is an integer.

9. The method of claim 8, wherein M=6.

10. The method of claim 1, wherein the first syntax element equal to zero indicates that a current layer in the bitstream does not contain auxiliary pictures, and wherein the first syntax element greater than zero indicates a type of auxiliary pictures in the current layer in the bitstream.

11. The method of claim 1, wherein in a case where a value of the first syntax element is equal to zero, a current layer is referred to as a primary layer, otherwise the current layer is referred to as an auxiliary layer, in a case where the value of the first syntax element is equal to 1, the current layer is referred to as an alpha auxiliary layer, and in a case where the value of the first syntax element is equal to 2, the current layer is referred to as a depth auxiliary layer.

12. The method of claim 1, wherein the conversion includes encoding the video into the bitstream.

13. The method of claim 1, wherein the conversion includes decoding the video from the bitstream.

14. An apparatus for processing video data comprising a processor and a non-transitory memory with instructions thereon, wherein the instructions upon execution by the processor, cause the processor to:

determine, for a conversion between a video and a bitstream of the video, that a current auxiliary layer is applied to at least one associated primary layer; and perform the conversion based on the determining, wherein the at least one associated primary layer has a first syntax element equal to a first value, and the current auxiliary layer has the first syntax element greater than the first value, and wherein the first syntax element is included in a scalability dimension information (SDI) supplemental enhancement information (SEI) message, and wherein at least one syntax element indicating at least one associated primary layer of each auxiliary layer is included in the SDI SEI message.

15. The apparatus of claim 14, wherein a second syntax element of the at least one syntax element indicating the at least one associated primary layer of each auxiliary layer is explicitly signalled as one or a group of syntax elements in the SDI SEI message, wherein the second syntax element in the SDI SEI message indicates a layer index of the at least one associated primary layer of each auxiliary layer, and wherein a third syntax element of the at least one syntax element indicates a number of the at least one associated primary layer of each auxiliary layer.

16. A non-transitory computer-readable storage medium storing instructions that cause a processor to:

determine, for a conversion between a video and a bitstream of the video, that a current auxiliary layer is applied to at least one associated primary layer; and perform the conversion based on the determining, wherein the at least one associated primary layer has a first syntax element equal to a first value, and the current auxiliary layer has the first syntax element greater than the first value, and wherein the first syntax element is included in a scalability dimension information (SDI) supplemental enhancement information (SEI) message, and wherein at least one syntax element indicating at least one associated primary layer of each auxiliary layer is included in the SDI SEI message.

17. The non-transitory computer-readable storage medium of claim 16, wherein at least one syntax element indicating at least one associated primary layer of each auxiliary layer is included in the SDI SEI message, wherein a second syntax element of the at least one syntax element indicating the at least one associated primary layer of each auxiliary layer is explicitly signalled as one or a group of syntax elements in the SDI SEI message, wherein the second syntax element in the SDI SEI message indicates a layer index of the at least one associated primary layer of each auxiliary layer, and wherein a third syntax element of the at least one syntax element indicates a number of the at least one associated primary layer of each auxiliary layer.

18. A method for storing a bitstream of a video, comprising:

determining, that a current auxiliary layer is applied to at least one associated primary layer;

generating the bitstream of the video based on the determining; and storing the bitstream in a non-transitory computer-readable recording medium, wherein the at least one associated primary layer has a first syntax element equal to a first value, and the current auxiliary layer has the first syntax element greater than the first value, and wherein the first syntax element is included in a scalability dimension information (SDI) supplemental enhancement information (SEI) message, and wherein at least one syntax element indicating at least one associated primary layer of each auxiliary layer is included in the SDI SEI message.

19. The method of claim 18, wherein a second syntax element of the at least one syntax element indicating the at least one associated primary layer of each auxiliary layer is explicitly signalled as one or a group of syntax elements in the SDI SEI message, wherein the second syntax element in the SDI SEI message indicates a layer index of the at least one associated primary layer of each auxiliary layer, and wherein a third syntax element of the at least one syntax element indicates a number of the at least one associated primary layer of each auxiliary layer.

20. The apparatus of claim 15, wherein the third syntax element is conditionally included in the bitstream, and in response to the value of the first syntax element being greater than zero, the third syntax element is included in the bitstream.

* * * * *